US008621509B2

(12) United States Patent
Jeong et al.

(10) Patent No.: US 8,621,509 B2
(45) Date of Patent: Dec. 31, 2013

(54) IMAGE DISPLAY APPARATUS AND METHOD FOR OPERATING THE SAME

(75) Inventors: Youngho Jeong, Seoul (KR); Eunhee Ha, Seoul (KR); Myongwon Suh, Seoul (KR); Dohyung Park, Seoul (KR)

(73) Assignee: LG Electronics Inc., Seoul (KR)

( * ) Notice: Subject to any disclaimer, the term of this patent is extended or adjusted under 35 U.S.C. 154(b) by 272 days.

(21) Appl. No.: 12/972,324

(22) Filed: Dec. 17, 2010

(65) Prior Publication Data

US 2011/0265119 A1    Oct. 27, 2011

Related U.S. Application Data

(60) Provisional application No. 61/328,488, filed on Apr. 27, 2010, provisional application No. 61/368,192, filed on Jul. 27, 2010, provisional application No. 61/352,709, filed on Jun. 8, 2010.

(30) Foreign Application Priority Data

Apr. 27, 2010  (KR) ............... 10-2010-0038937
Apr. 27, 2010  (WO) ............... PCT/KR2010/002654
Jun. 8, 2010   (KR) ............... 10-2010-0053878

(51) Int. Cl.
  *G06F 3/00*    (2006.01)
  *G06F 13/00*   (2006.01)
  *H04N 5/445*   (2011.01)
  *H04N 7/173*   (2011.01)
  *G06F 3/048*   (2013.01)

(52) U.S. Cl.
  USPC ............ 725/38; 725/47; 725/54; 725/110; 725/118; 725/131; 725/139; 725/151; 725/51; 715/769; 715/763

(58) Field of Classification Search
  USPC ........... 725/38, 47, 54, 110, 112, 113, 118, 725/131, 139, 151, 114, 32, 51, 46; 715/769, 763; 382/305
  See application file for complete search history.

(56) References Cited

U.S. PATENT DOCUMENTS 5,883,621 A * 3/1999 Iwamura .................. 725/37
6,154,209 A   11/2000 Naughton et al.
(Continued)

FOREIGN PATENT DOCUMENTS

EP    1827016 A1    8/2007
EP    2151994 A1    2/2010
(Continued)

OTHER PUBLICATIONS

Hewlett-Packard Company, "HP Media Center PC User's Guide," User Guide Hewlett Packard, Jan. 2003, pp. 1-226.

*Primary Examiner* — Pinkal R Chokshi
(74) *Attorney, Agent, or Firm* — Birch, Stewart, Kolasch & Birch, LLP

(57) ABSTRACT

A method for operating an image display apparatus is discussed. The method according to an embodiment includes reproducing content, storing at least part of the reproduced content, upon receipt of a content save command, displaying a content object representing the stored content, displaying objects representing other users or electronic devices of a connected network or a network linked to the connected network, and transmitting, when the content object is dragged and dropped on an object selected from among the objects representing other users or electronic devices, the stored content to a selected user or electronic device represented by the selected object. The content is at least one of a broadcast image, an external input image, an audio file, a still image, a connected Web page, or a text file.

17 Claims, 70 Drawing Sheets

(56) References Cited

U.S. PATENT DOCUMENTS

| | | | |
|---|---|---|---|
| 6,670,971 B1* | 12/2003 | Oral | 715/769 |
| 7,386,193 B2* | 6/2008 | Yoshida et al. | 382/305 |
| 7,599,990 B1* | 10/2009 | Groves et al. | 709/204 |
| 7,603,683 B2* | 10/2009 | Reto | 725/34 |
| 7,869,907 B2* | 1/2011 | Kaneko | 701/2 |
| 8,056,104 B2* | 11/2011 | Stecyk et al. | 725/80 |
| 8,296,728 B1* | 10/2012 | Webster | 717/109 |
| 8,307,395 B2* | 11/2012 | Issa et al. | 725/46 |
| 8,316,405 B2* | 11/2012 | Ogasawara | 725/110 |
| 2003/0233650 A1* | 12/2003 | Zaner et al. | 725/32 |
| 2005/0267876 A1 | 12/2005 | Watanabe et al. | |
| 2006/0218501 A1* | 9/2006 | Wilson et al. | 715/769 |
| 2008/0234843 A1* | 9/2008 | Akaiwa et al. | 700/83 |
| 2008/0307324 A1* | 12/2008 | Westen et al. | 715/753 |
| 2009/0150947 A1* | 6/2009 | Soderstrom | 725/93 |
| 2009/0150956 A1* | 6/2009 | Van De Leur et al. | 725/114 |
| 2009/0265732 A1* | 10/2009 | Ide et al. | 725/32 |
| 2010/0037261 A1* | 2/2010 | Ohta et al. | 725/40 |
| 2010/0050205 A1* | 2/2010 | Davis et al. | 725/32 |
| 2010/0070899 A1* | 3/2010 | Hunt et al. | 715/769 |
| 2010/0122184 A1* | 5/2010 | Vonog et al. | 715/753 |
| 2010/0122197 A1* | 5/2010 | Fujioka | 715/769 |
| 2010/0241962 A1* | 9/2010 | Peterson et al. | 715/720 |
| 2010/0257473 A1* | 10/2010 | Kang | 715/769 |
| 2010/0274847 A1* | 10/2010 | Anderson et al. | 709/203 |
| 2011/0126104 A1* | 5/2011 | Woods et al. | 715/719 |

FOREIGN PATENT DOCUMENTS

| | | |
|---|---|---|
| JP | 2002-132618 A | 5/2002 |
| JP | 2005-346202 A | 12/2005 |
| WO | WO 01/99033 A2 | 12/2001 |

* cited by examiner

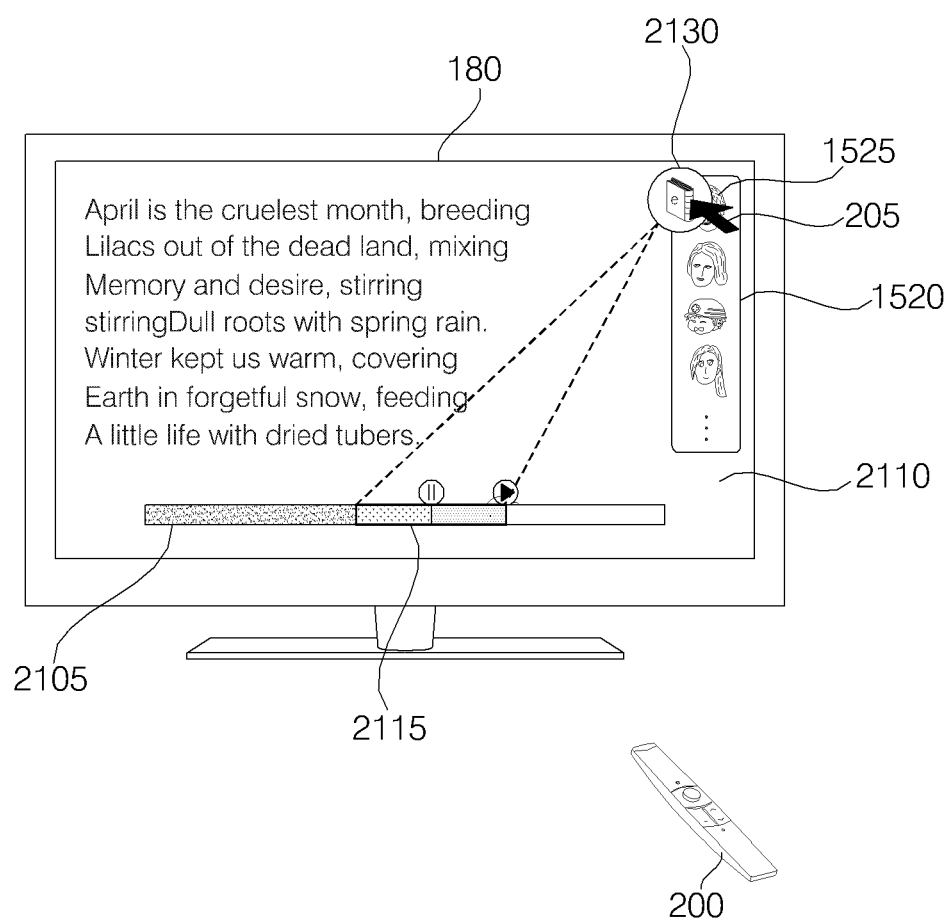

FIG. 32a
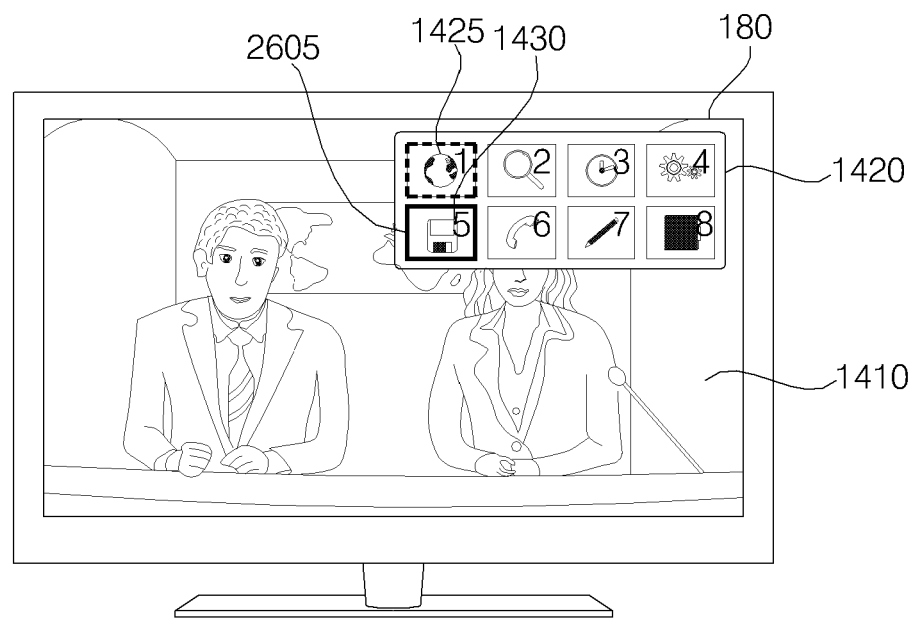
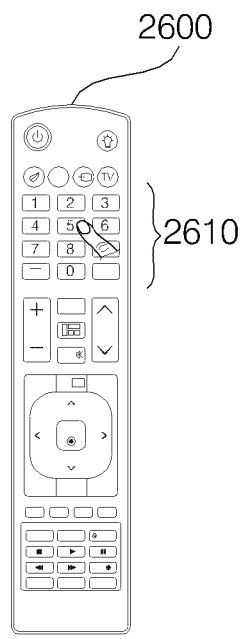

FIG. 32b
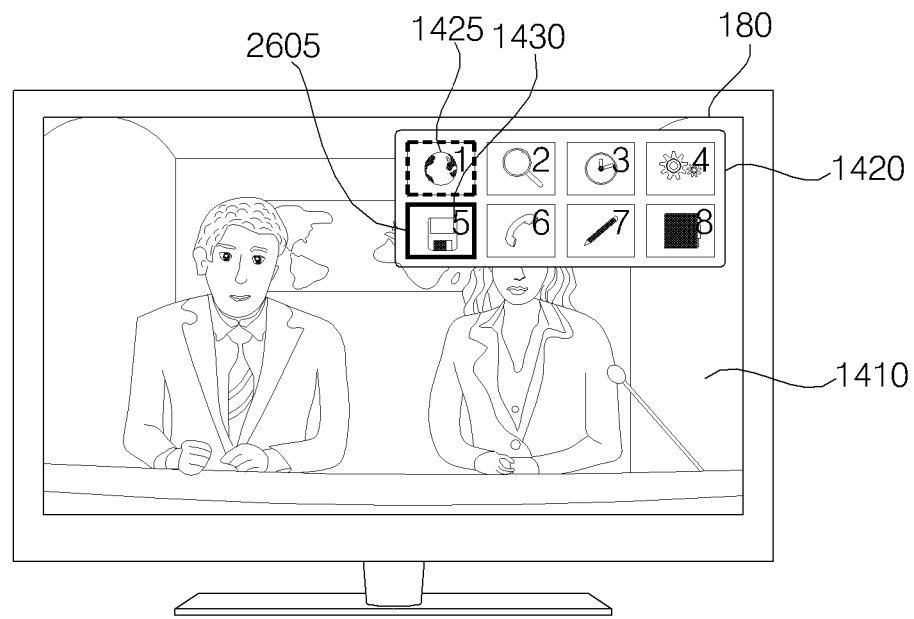
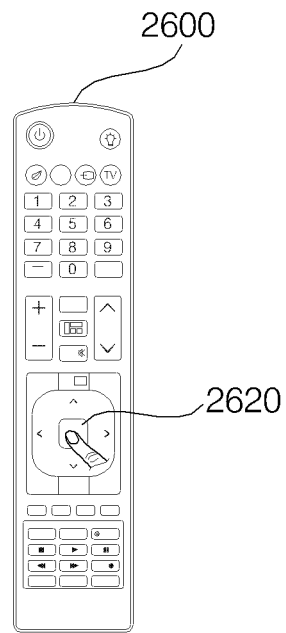

FIG. 33a
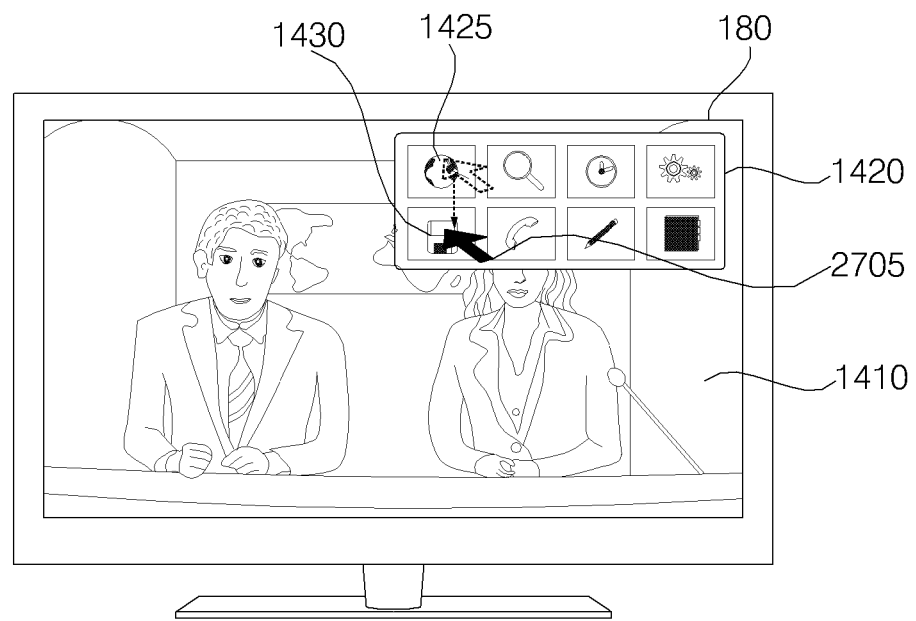
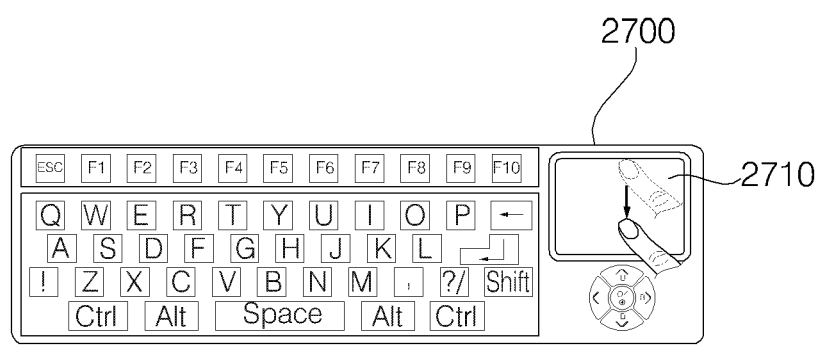

FIG. 33b
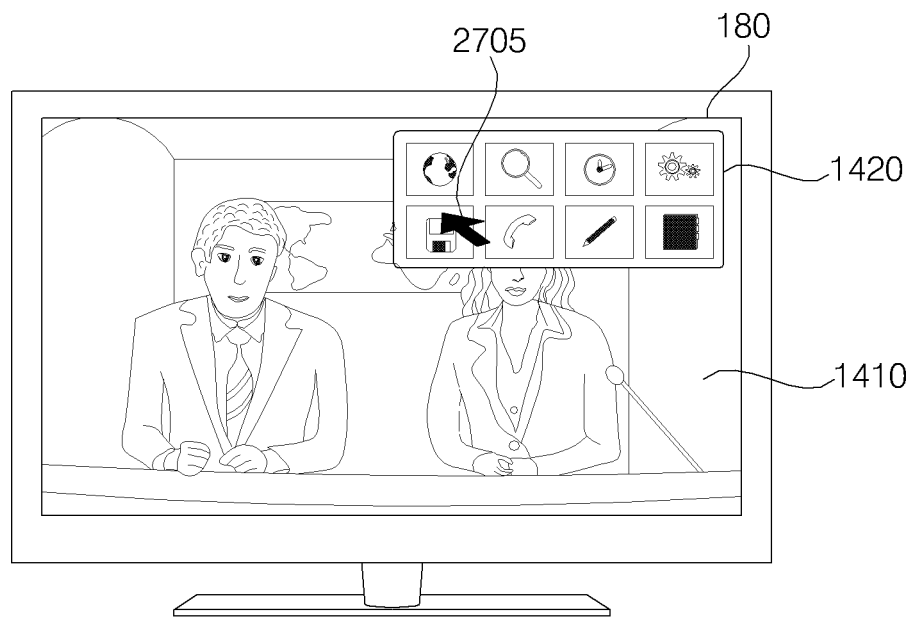
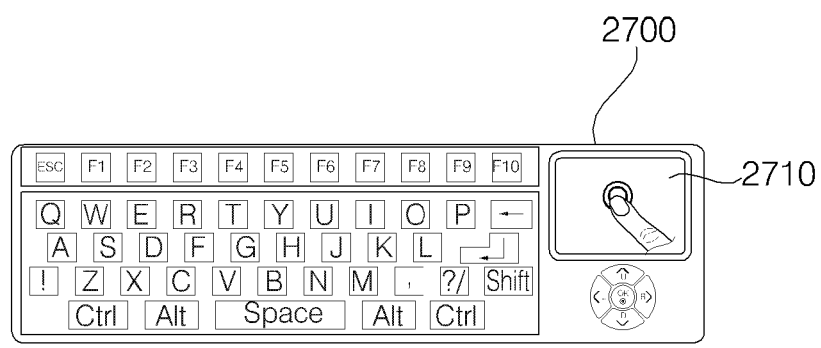

FIG. 34a
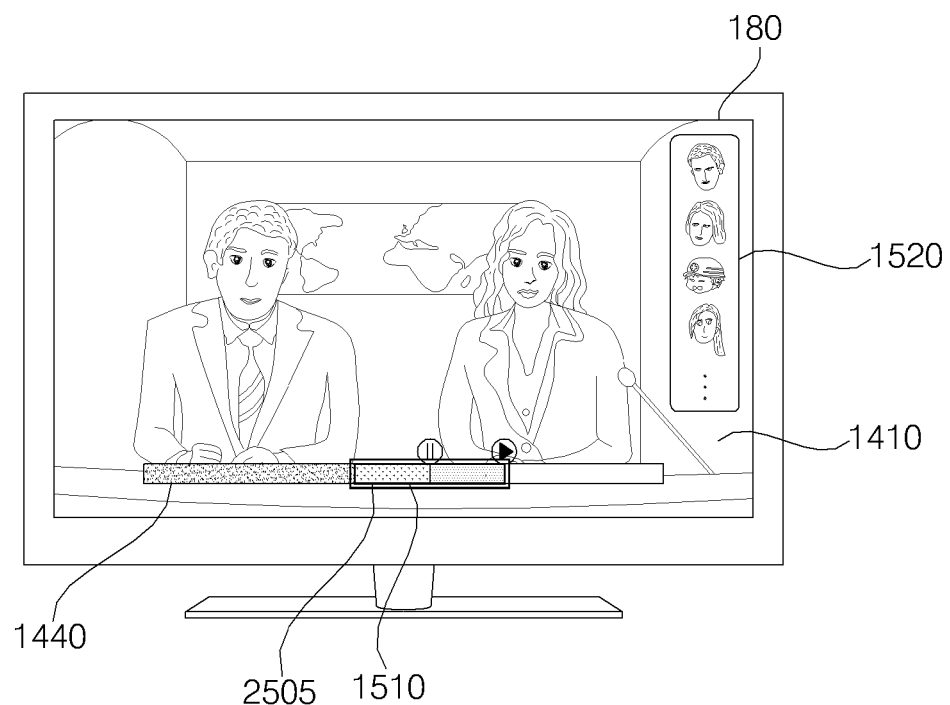
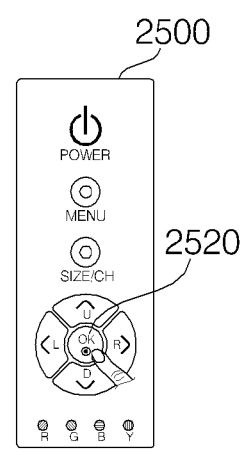

FIG. 34b
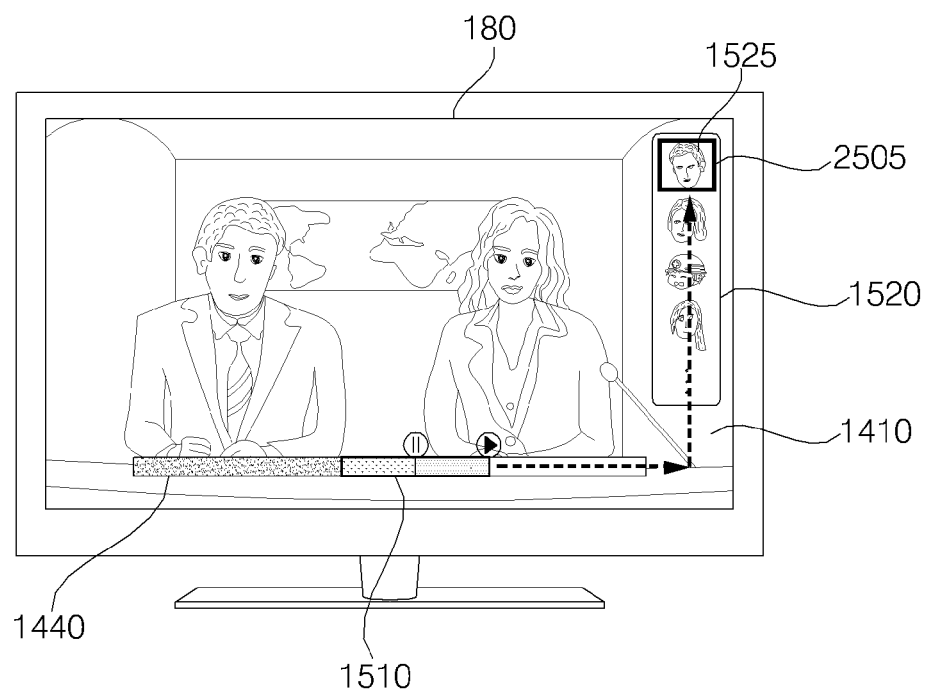
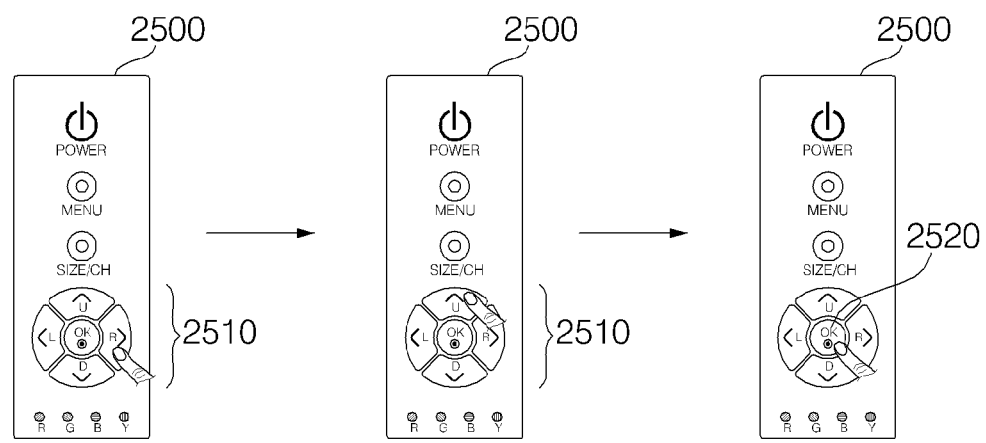

FIG. 35a
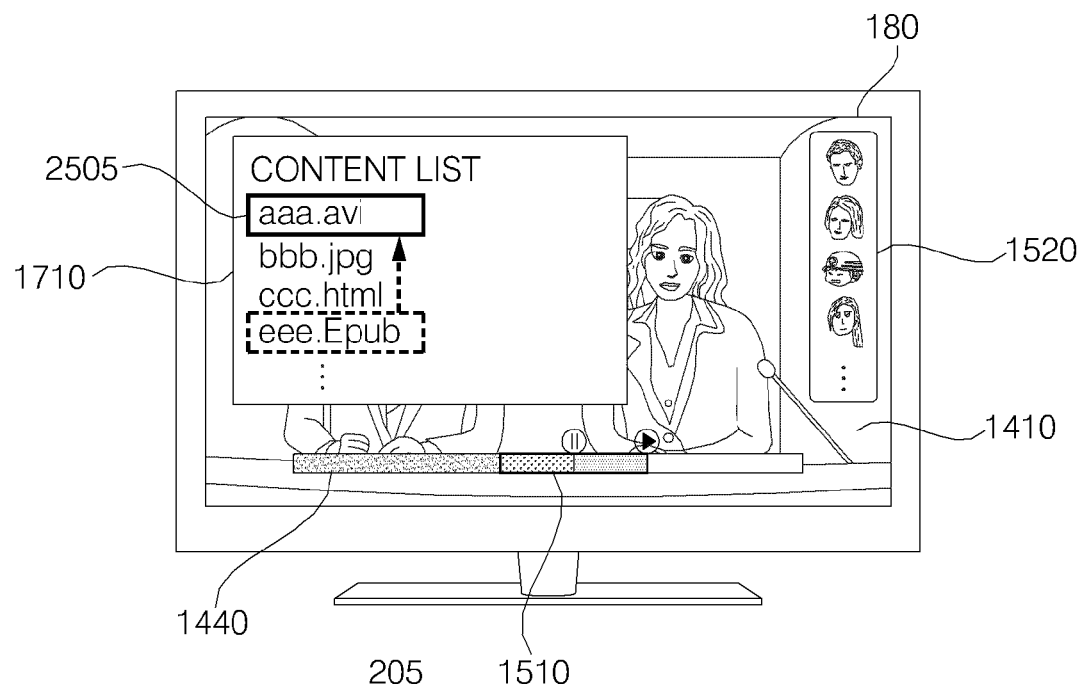
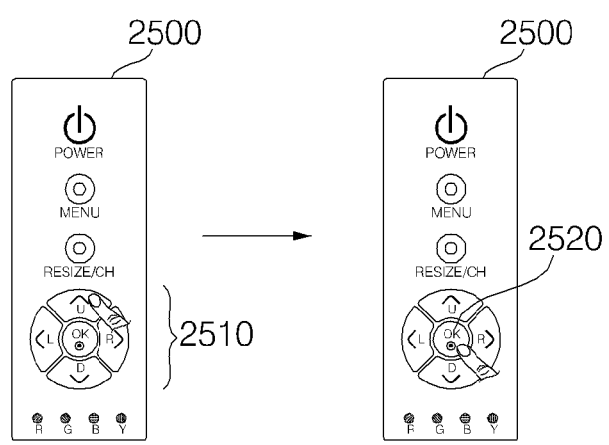

FIG. 35b
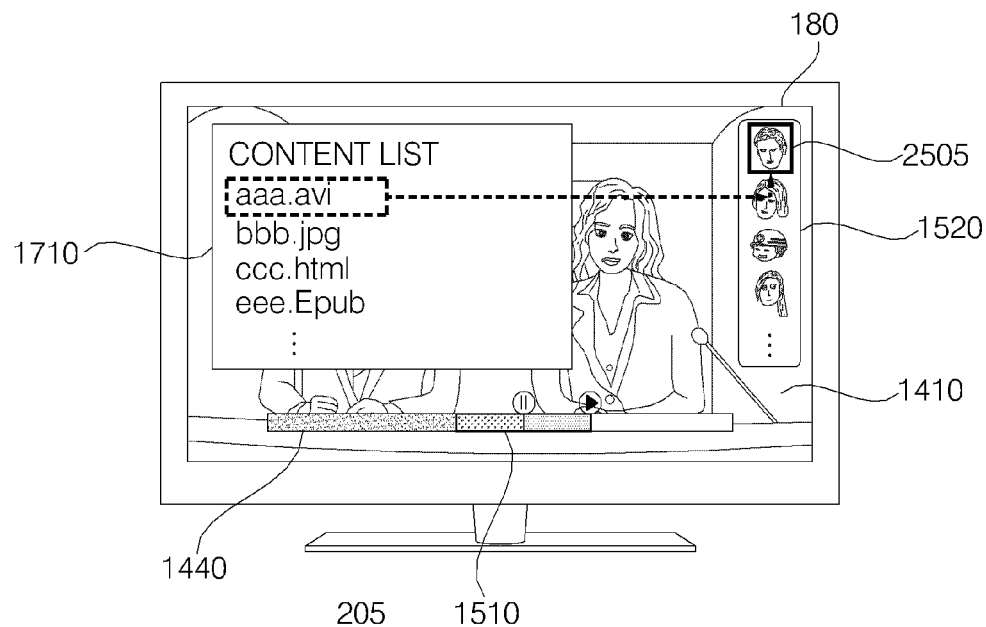
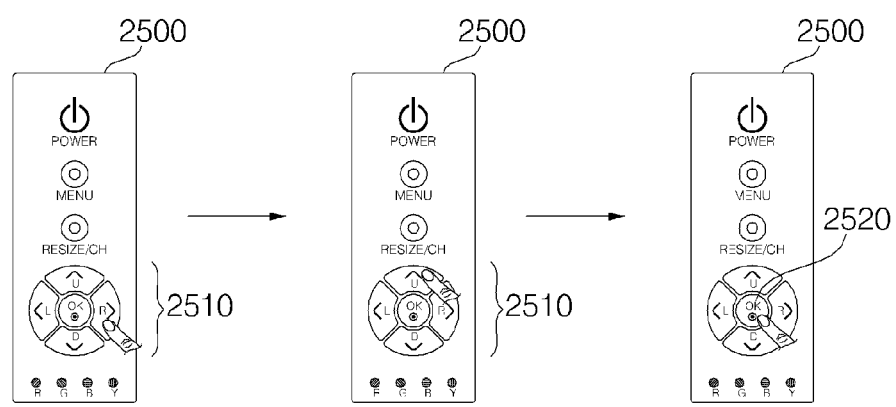

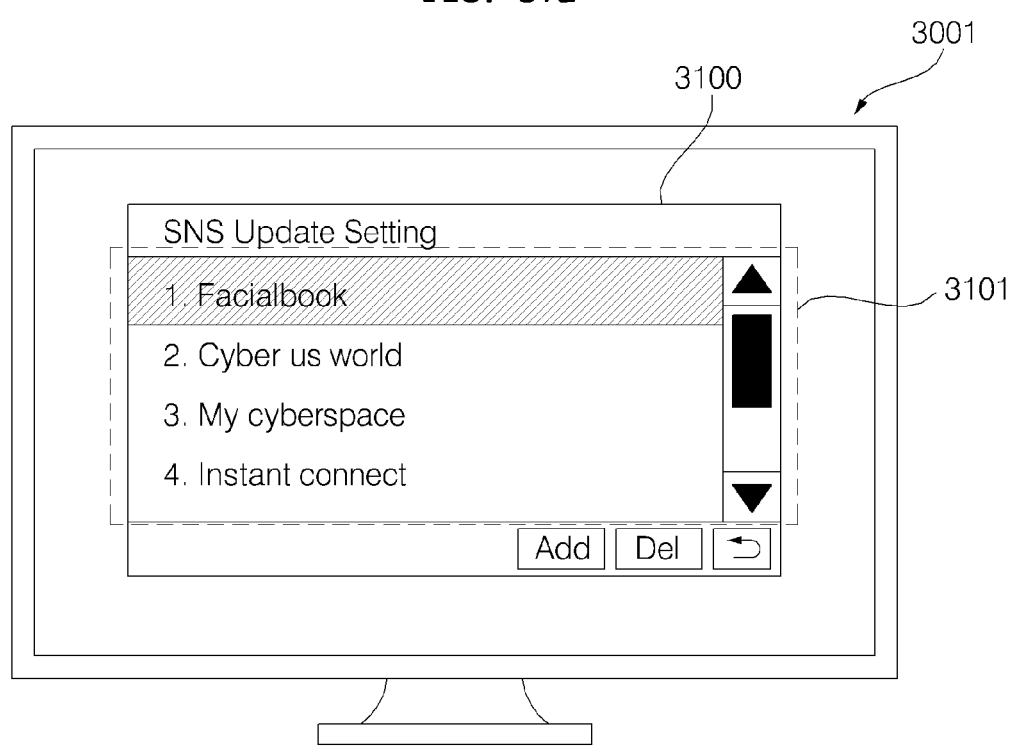

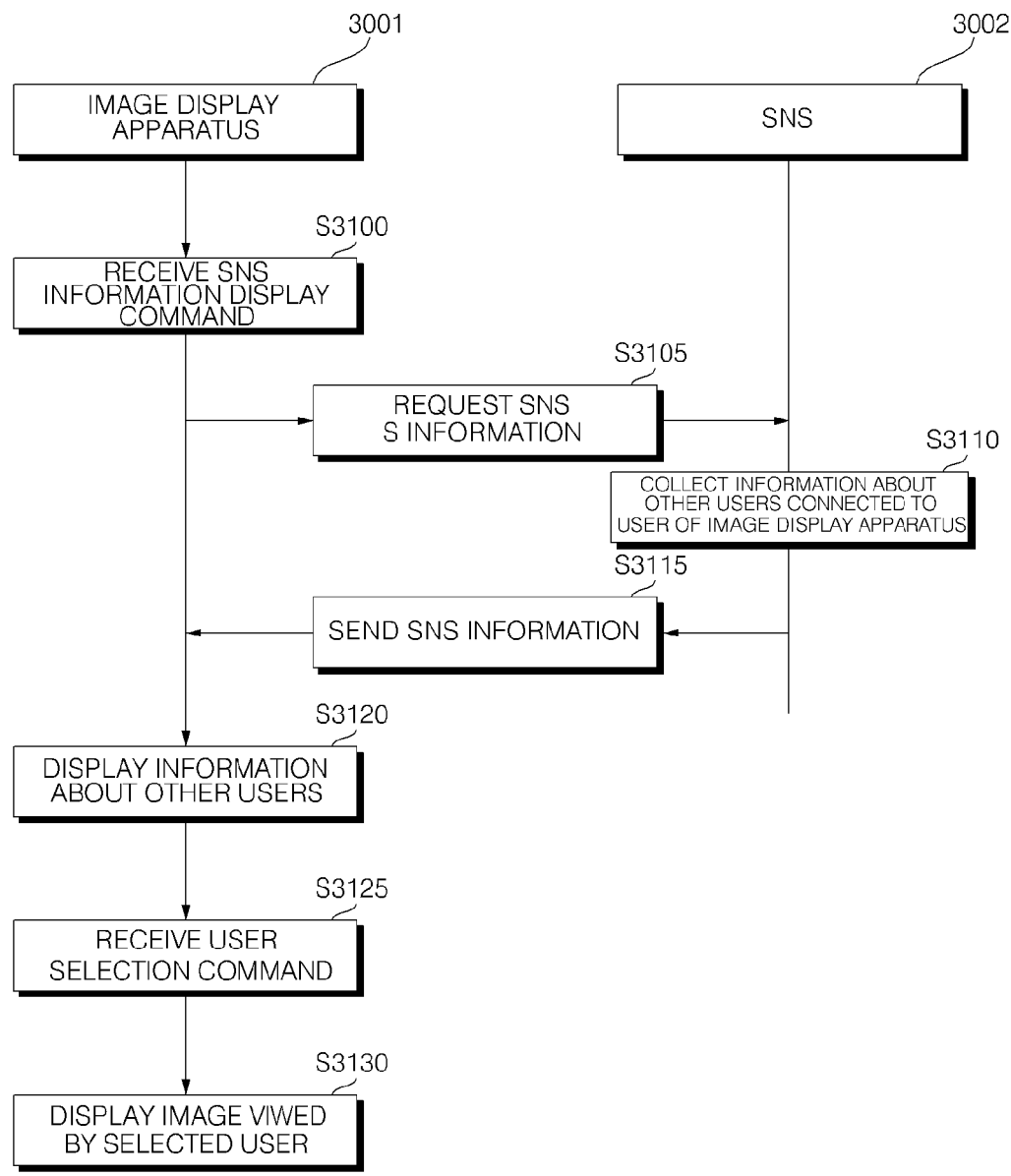

IMAGE DISPLAY APPARATUS AND METHOD FOR OPERATING THE SAME

CROSS-REFERENCE TO RELATED APPLICATION

This application claims the benefit of Korean Patent Application Nos. 10-2010-0038937, filed on Apr. 27, 2010 and 10-2010-0053878, filed on Jun. 8, 2010 in the Korean Intellectual Property Office and the benefit of U.S. Provisional Application Nos. 61/328,488 filed on Apr. 27, 2010, 61/368,192, filed on Jul. 27, 2010 and 61/352,709, filed on Jun. 8, 2010 in the USPTO and the benefit of PCT Application No. PCT/KR10/002,654 filed on Apr. 27, 2010. The entire contents of all these applications are incorporated herein by reference.

BACKGROUND OF THE INVENTION

1. Field of the Invention

The present invention relates to an image display apparatus and a method for operating the same, and more particularly, to an image display apparatus and a method for operating the same, which increase user convenience.

2. Description of the Related Art

An image display apparatus has a function of displaying images to a user. The image display apparatus can display a broadcast program selected by the user on a display from among broadcast programs transmitted from broadcasting stations. The recent trend in broadcasting is a worldwide shift from analog broadcasting to digital broadcasting.

Digital broadcasting offers many advantages over analog broadcasting, such as robustness against noise, less data loss, ease of error correction, and the ability to provide high-definition, clear images. Digital broadcasting also allows interactive viewer services, compared to analog broadcasting.

SUMMARY OF THE INVENTION

Therefore, the present invention has been made in view of the above problems, and it is an object of the present invention to provide an image display apparatus and a method for operating the same, which can increase user convenience.

Another object of the present invention is to provide an image display apparatus and a method for operating the same, which can easily transmit reproduced content to another user or electronic device connected to a network.

Another object of the present invention is to provide an image display apparatus and a method for operating the same, which can change the data size of content to be transmitted according to a network connection state.

Another object of the present invention is to provide an image display apparatus and a method for operating the same, which can readily acquire user-desired information.

Another object of the present invention is to provide an image display apparatus and a method for operating the same, which can transmit and receive status information to and from an electronic device that provides a social networking service over a network such as the Internet.

A further object of the present invention is to provide an image display apparatus and a method for operating the same, which can provide various user interfaces.

In accordance with an aspect of the present invention, the above and other objects can be accomplished by the provision of a method for operating an image display apparatus, including reproducing content, storing at least part of the reproduced content, upon receipt of a content save command, displaying a content object representing the stored content, displaying objects representing other users or electronic devices of a connected network or a network linked to the connected network, and transmitting, when the content object is dragged and dropped on an object selected from among the objects representing other users or electronic devices, the stored content to a selected user or electronic device represented by the selected object. The content is at least one of a broadcast image, an external input image, an audio file, a still image, a connected Web page, or a text file.

In accordance with another aspect of the present invention, there is provided a method for operating an image display apparatus, including displaying a content save object for storing content during content reproduction, storing the reproduced content for a preset time period, upon selection of the content save object using a pointer corresponding to movement of a remote controller, displaying a content object representing the stored content, indicating saving of the content in progress, or indicating a data size of the stored content, and transmitting the stored content to a connected network or a network linked to the connected network.

In accordance with a further aspect of the present invention, there is provided an image display apparatus including a display, a network interface for transmitting data to or receiving data from a network, a memory for storing at least part of reproduced content, upon receipt of a content save command during content reproduction, and a controller for controlling the display to display a content object representing the stored content, controlling the display to display objects representing other users or electronic devices of the connected network or the network linked to the connected network, and controlling transmission of, when the content object is dragged and dropped on an object selected from among the objects representing other users or electronic devices, the stored content to a selected user or electronic device represented by the selected object. The content is at least one of a broadcast image, an external input image, an audio file, a still image, a connected Web page, or a text file.

In accordance with another aspect of the invention, there is a method, computer program product and device for reproducing content, the content being at least one of a television broadcast image, another broadcast image, a text, audio or image file stored within the image display apparatus, a text, audio or image file stored remotely from the image display apparatus, and a connected Web page; storing a part of the content, upon receipt of a content save command; simultaneously displaying 1) a content object representing the content, including the stored content, and 2) an object representing one of a user and an electronic device connected to the image display apparatus via a wired or wireless network or from a network linked to the connected wired or wireless network; receiving a move command to move the part of the content to the one of the user and the electronic device; and transmitting the stored content to the one of the user and the electronic device via the connected wired or wireless network.

BRIEF DESCRIPTION OF THE DRAWINGS

The above and other objects, features and other advantages of the present invention will be more clearly understood from the following detailed description taken in conjunction with the accompanying drawings, in which:

FIGS. 20 to 35 are views referred to for describing the method for operating an image display apparatus, illustrated in FIG. 19;

FIG. 39 is a flowchart illustrating a method for operating an image display apparatus according to a further embodiment of the present invention.

DETAILED DESCRIPTION OF THE PREFERRED EMBODIMENTS

Embodiments of the present invention will be described below with reference to the attached drawings.

The terms "module" and "unit" used to signify components are used herein to help the understanding of the components and thus they should not be considered as having specific meanings or roles. Accordingly, the terms "module" and "unit" may be used interchangeably.

An image display apparatus as set forth herein is an intelligent image display apparatus equipped with a computer support function in addition to a broadcast reception function, for example. Thus the image display apparatus may have user-friendly interfaces such as a handwriting input device, a touch screen, or a pointing device. Further, because the image display apparatus supports wired or wireless Internet, the image display apparatus is capable of e-mail transmission/reception, Web browsing, banking, gaming, etc. by connecting to the Internet or a computer. To implement these functions, the image display apparatus may operate based on a standard general-purpose Operating System (OS).

Various applications can be freely added to or deleted from, for example, a general-purpose OS kernel in the image display apparatus according to the present invention. Therefore, the image display apparatus may perform a number of user-friendly functions. The image display apparatus may be a network TV, a Hybrid broadcast broadband TV (HbbTV), a smart TV, etc. for example. The image display apparatus is applicable to a smart phone, as needed.

Embodiments of the present invention will be described in detail with reference to the attached drawings, but it should be understood that they are merely illustrative of the present invention and should not be interpreted as limiting the scope of the present invention.

In addition, although the terms used in the present invention are selected from generally known and used terms, some of the terms mentioned in the description of the present invention, the detailed meanings of which are described in relevant parts of the description herein, have been selected by the applicant at his or her discretion. Furthermore, the present invention must be understood, not simply by the actual terms used but by the meanings of each term lying within.

Figure 1:
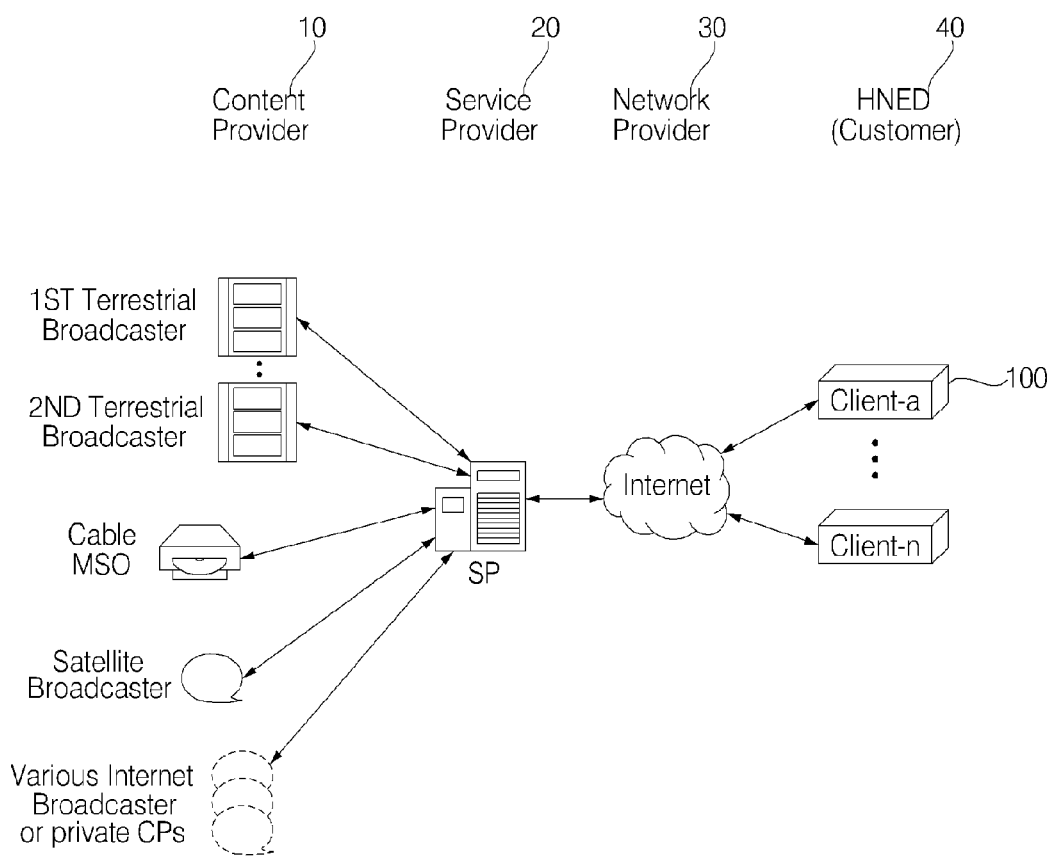
FIG. 1 illustrates the overall configuration of a broadcasting system including an image display apparatus according to an embodiment of the present invention.

FIG. 1 illustrates the overall configuration of a broadcasting system including an image display apparatus according to an embodiment of the present invention. Referring to FIG. 1, the broadcasting system may include a Content Provider (CP) 10, a Service Provider (SP) 20, a Network Provider (NP) 30, and a Home Network End Device (HNED) 40. The HNED 40 corresponds to, for example, a client 100 which is an image display apparatus according to an embodiment of the present invention. As stated before, the image display apparatus may be a network TV, a smart TV, an Internet Protocol TV (IPTV), etc.

The CP 10 creates and provides content. The CP 10 may be, for example, a terrestrial broadcaster, a cable System Operator (SO) or Multiple System Operator (MSO), a satellite broadcaster, or an Internet broadcaster, as illustrated in FIG. 1.

Besides broadcast content, the CP 10 may provide various applications, which will be described later in detail.

The SP 20 may provide content received from the CP 10 in a service package. For instance, the SP 20 may package first terrestrial broadcasting, second terrestrial broadcasting, cable broadcasting, satellite broadcasting, Internet broadcasting, and applications and provide the package to users.

The SP 20 may unicast or multicast a service to the client 100. Unicast is a form of transmission in which information is sent from only one transmitter to only one receiver. In other words, unicast transmission is point-to-point, involving two nodes only. In an example of unicast transmission, upon receipt of a request for data from a receiver, a server transmits the data to only one receiver. Multicast is a type of transmission or communication in which a transmitter transmits data to a group of receivers. For example, a server may transmit data to a plurality of pre-registered receivers at one time. For multicast registration, the Internet Group Management Protocol (IGMP) may be used.

The NP 30 may provide a network over which a service is provided to the client 100. The client 100 may construct a home network and receive a service over the home network.

Content transmitted in the above-described broadcasting system may be protected through conditional access or content protection. CableCard and Downloadable Conditional Access System (DCAS) are examples of conditional access or content protection.

The client 100 may also transmit content over a network. In this case, the client 100 serves as a CP and thus the CP 10 may receive content from the client 100. Therefore, an interactive content service or data service can be provided.

Figure 2:
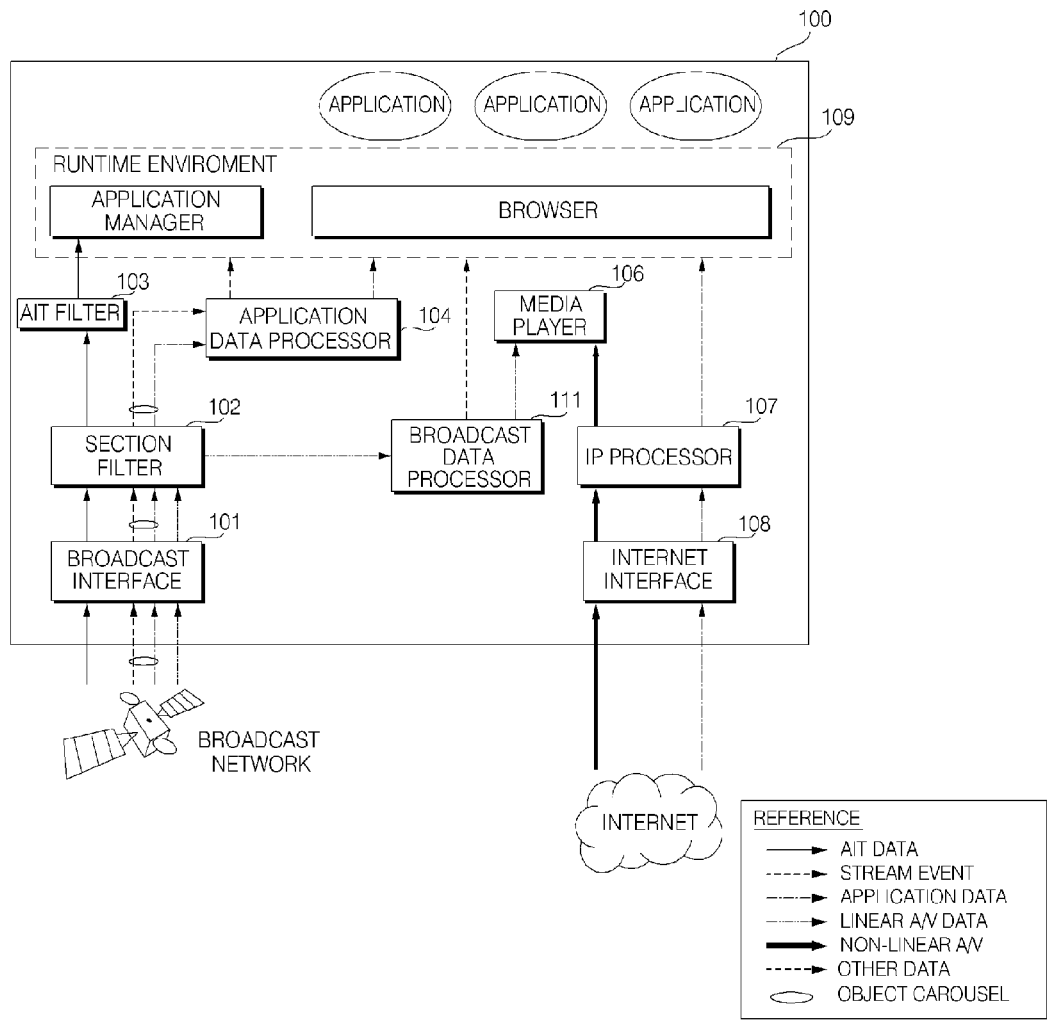
FIG. 2 illustrates the overall configuration of a broadcasting system including an image display apparatus according to another embodiment of the present invention.

FIG. 2 illustrates the overall configuration of a broadcasting system including an image display apparatus according to another embodiment of the present invention.

Referring to FIG. 2, the image display apparatus 100 according to another embodiment of the present invention is connected to a broadcast network and the Internet. The image display apparatus 100 is, for example, a network TV, a smart TV, an HbbTV, etc.

The image display apparatus 100 includes, for example, a broadcast interface 101, a section filter 102, an Application Information Table (AIT) filter 103, an application data processor 104, a broadcast data processor 111, a media player 106, an IP processor 107, an Internet interface 108, and a runtime module 109.

The image display apparatus 100 receives AIT data, real-time broadcast content, application data, and stream events through the broadcast interface 101. The real-time broadcast content may be referred to as linear Audio/Video (A/V) content.

The section filter 102 performs section filtering on the four types of data received through the broadcast interface 101, and outputs the AIT data to the AIT filter 103, the linear A/V content to the broadcast data processor 111, and the stream events and application data to the application data processor 104.

Meanwhile, the image display apparatus 100 receives non-linear A/V content and application data through the Internet interface 108. The non-linear A/V content may be, for example, a Content On Demand (CoD) application.

The non-linear A/V content and the application data are transmitted to the media player 106 and the runtime module 109, respectively.

The runtime module 109 includes, for example, an application manager and a browser as illustrated in FIG. 2. The application manager controls the life cycle of an interactive application using the AIT data, for example. The browser displays and processes the interactive application.

Figure 3:
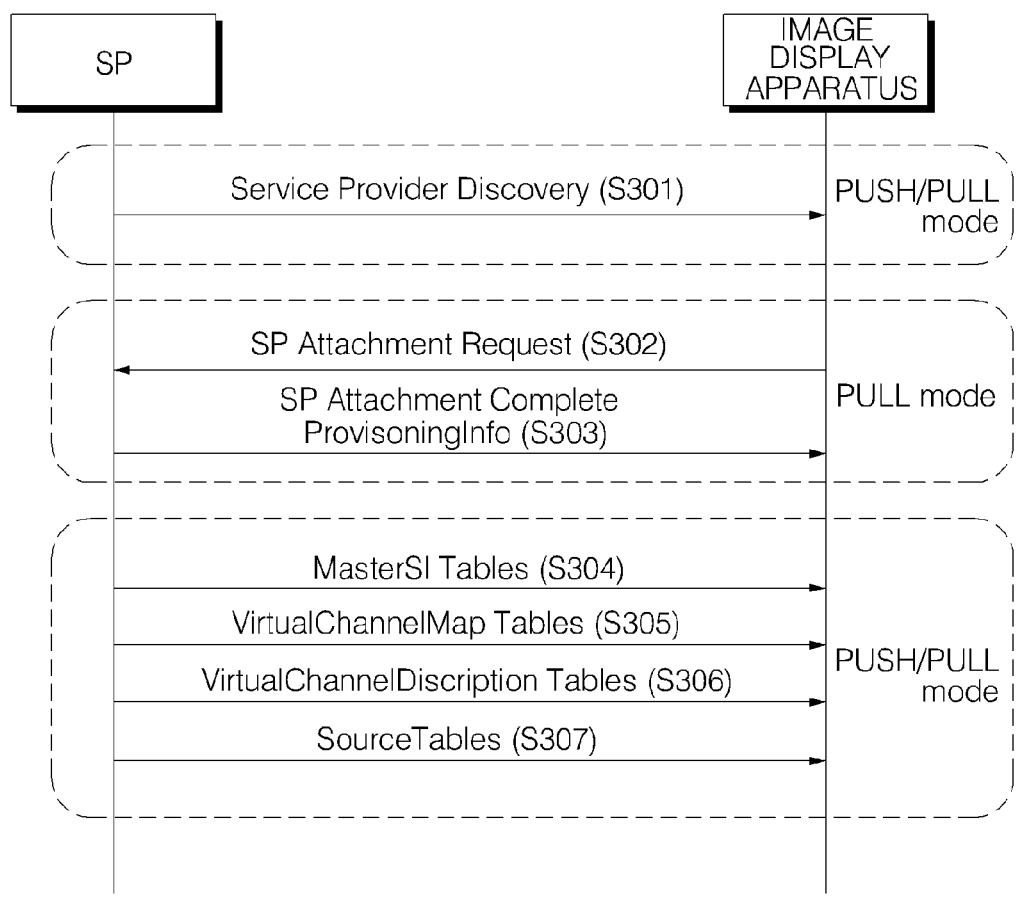
FIG. 3 is a diagram illustrating a signal flow for an operation for attaching to a Service Provider (SP) and receiving channel information from the SP in the image display apparatus illustrated in FIG. 1 or 2 according to an embodiment of the present invention.

FIG. 3 is a diagram illustrating a signal flow for an operation for attaching to an SP and receiving channel information from the SP in the image display apparatus illustrated in FIG. 1 or 2. Needless to say, the operation illustrated in FIG. 3 is an embodiment, which should not be interpreted as limiting the scope of the present invention.

Referring to FIG. 3, an SP performs an SP Discovery operation (S301) and the image display apparatus transmits a Service Provider Attachment Request signal to the SP (S302). Upon completion of attachment to the SP, the image display apparatus receives provisioning information from the SP (S303). Further, the image display apparatus receives Master System Information (SI) Tables, Virtual Channel Map Tables, Virtual Channel Description Tables, and Source Tables from the SP (S304 to S307).

More specifically, SP Discovery is a process by which SPs that provide IPTV services search for Service Discovery (SD) servers having information about the offerings of the SPs.

In order to receive information about the SD servers, an SD server address list can be detected, for example, using three methods, specifically use of an address preset in the image display apparatus or an address manually set by a user, Dynamic Host Configuration Protocol (DHCP)-based SP Discovery, and Domain Name System Service (DNS SRV)-based SP Discovery. The image display apparatus accesses a specific SD server using the SD server address list obtained through one of the above three methods and receives a SP Discovery record from the specific SD server. The Service Provider Discovery record includes information needed to perform Service Discovery on an SP basis. The image display apparatus then starts a Service Discovery operation using the SP Discovery record. These operations can be performed in a push mode or a pull mode.

The image display apparatus accesses an SP attachment server specified by an SP attachment locator included in the SP Discovery record and performs a registration procedure (or a service attachment procedure).

Further, after accessing an authentication service server of an SP specified by an SP authentication locator and performing an authentication procedure, the image display apparatus may perform a service authentication procedure.

After service attachment is successfully performed, a server may transmit data in the form of a provision information table to the image display apparatus.

During service attachment, the image display apparatus may include an Identifier (ID) and location information thereof in data and transmit the data to the service attachment server. Thus the service attachment server may specify a service that the image display apparatus has subscribed to based on the ID and location information. In addition, the service attachment server provides, in the form of a provisioning information table, address information from which the image display apparatus can obtain Service Information (SI). The address information corresponds to access information about a Master SI Table. This method facilitates provision of a customized service to each subscriber.

The SI is divided into a Master SI Table record for managing access information and version information about a Virtual Channel Map, a Virtual Channel Map Table for providing a list of services in the form of a package, a Virtual Channel Description Table that contains details of each channel, and a Source Table that contains access information about actual services.

Figure 4:
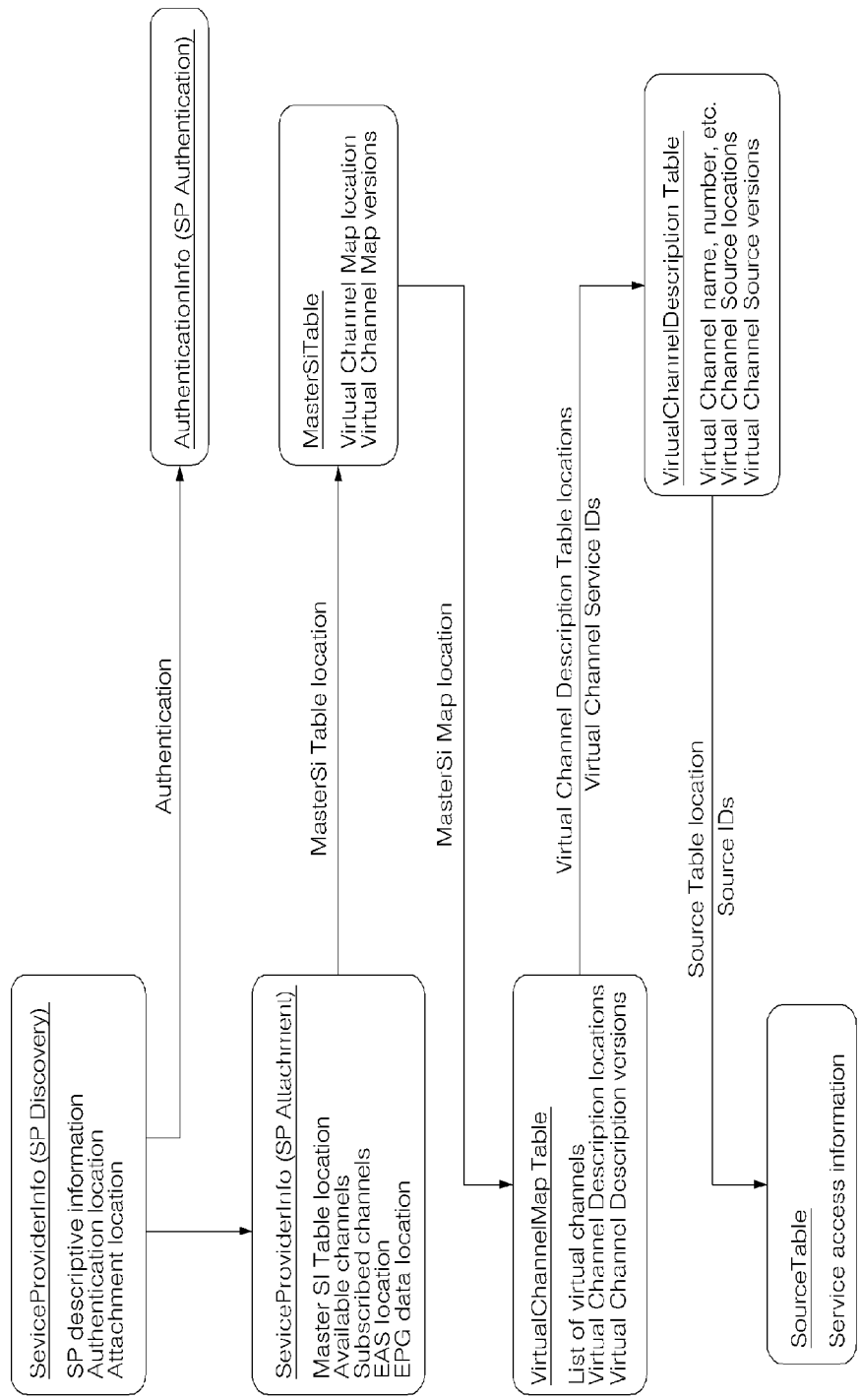
FIG. 4 illustrates an example of data used in the operation illustrated in FIG. 3.

FIG. 4 is a detailed diagram of FIG. 3, illustrating a relationship among data in the SI.

Referring to FIG. 4, a Master SI Table contains information about the location and version of each Virtual Channel MAP.

Each Virtual Channel MAP is identified by its Virtual Channel MAP identifier. VirtualChannelMAPVersion specifies the version number of the Virtual Channel MAP. If any of the tables connected to the Master SI Table in the arrowed direction is modified, the versions of the modified table and overlying tables thereof (up to the Master SI Table) are incremented. Accordingly, a change in any of the SI tables can be readily identified by monitoring the Master SI Table.

For example, when the Source Table is changed, the version of the Source Table is incremented and the version of the Virtual Channel Description Table that references the Source Table is also incremented. In conclusion, a change in any lower table leads to a change in its higher tables and, eventually, a change in the Master SI Table.

One Master SI Table may exist for each SP. However, in the case where service configurations differ for regions or subscribers (or subscriber groups), an SP may have a plurality of Master SI Tables in order to provide a customized service on a region, subscriber or subscriber group basis. Thus it is possible to provide a customized service to a subscriber according to a region in which the subscriber is located and subscriber information regarding the subscriber.

A Virtual Channel Map Table may contain a list of one or more virtual channels. A Virtual Channel Map includes not details of the channels but information about the locations of the details of the channels. In the Virtual Channel Map Table, VirtualChannelDescriptionLocation specifies the location of a Virtual Channel Description Table that provides virtual channel descriptions.

The Virtual Channel Description Table contains the details of the virtual channels. The Virtual Channel Description Table can be accessed using VirtualChannelDescriptionLocation of the Virtual Channel Map Table.

A Source Table provides information necessary to access actual services (e.g. IP addresses, ports, AV Codecs, transmission protocols, etc.) on a service basis.

The above-described Master SI Table, the Virtual Channel Map Table, the Virtual Channel Description Table and the Source Table are delivered in four logically separate flows, in a push mode or a pull mode. For version management, the Master SI Table may be multicast and thus a version change can be monitored by receiving a multicast stream of the Master SI Table.

Figure 5:
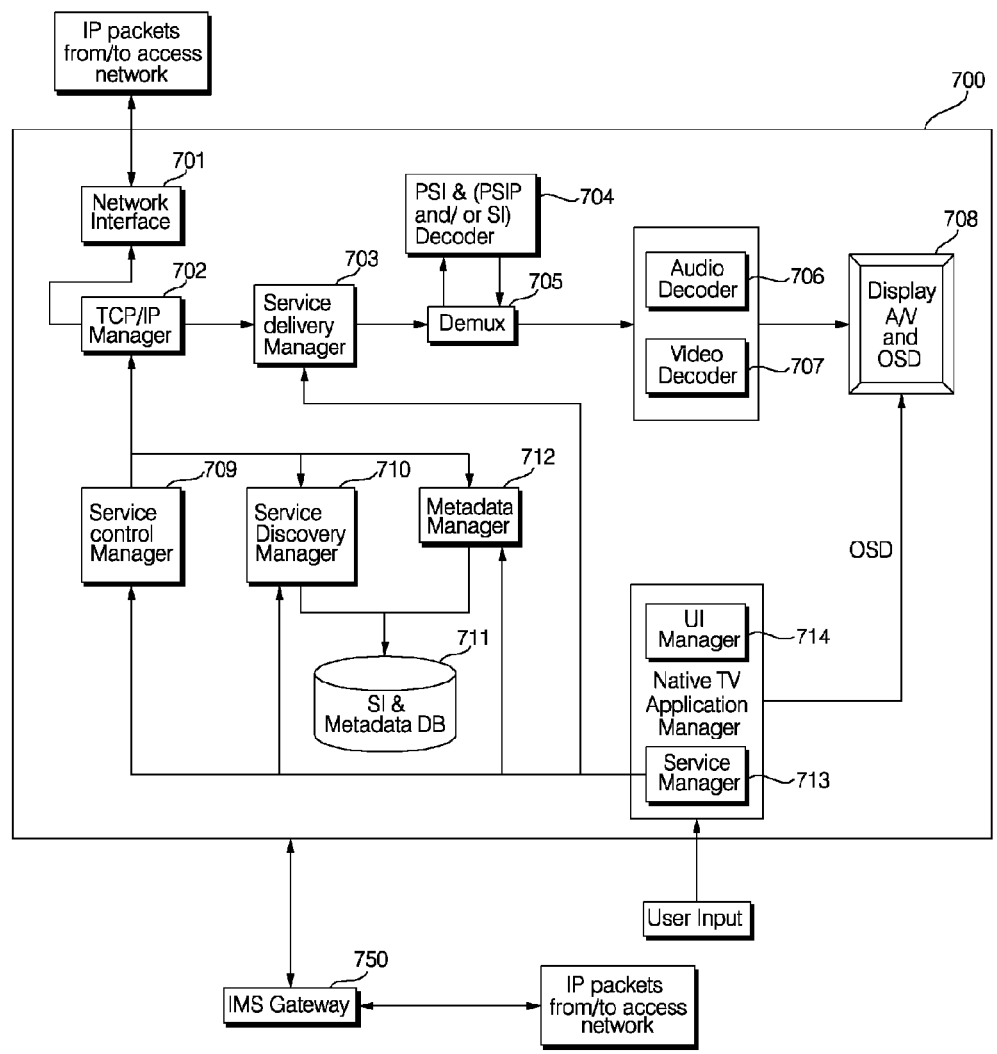
FIG. 5 is a detailed block diagram of the image display apparatus illustrated in FIG. 1 or 2 according to an embodiment of the present invention.

FIG. 5 is a detailed block diagram of the image display apparatus illustrated in FIG. 1 or 2 according to an embodiment of the present invention. The structure of the image display apparatus in FIG. 5 is purely exemplary and should not be interpreted as limiting the scope of the present invention.

Referring to FIG. 5, an image display apparatus 700 includes a network interface 701, a Transmission Control Protocol/Internet Protocol (TCP/IP) manager 702, a service delivery manager 703, a Demultiplexer (DEMUX) 705, a Program Specific Information (PSI) & (Program and System Information Protocol (PSIP) and/or SI) decoder 704, a display A/V and On Screen Display (OSD) module 708, a service control manager 709, a service discovery manager 710, a metadata manager 712, an SI & metadata Database (DB) 711, a User Interface (UI) manager 714, and a service manager 713.

The network interface 701 transmits packets to and receives packets from a network. Specifically, the network interface 701 receives services and content from an SP over the network.

The TCP/IP manager 702 is involved in packet reception and transmission of the image display apparatus 700, that is, packet delivery from a source to a destination. The TCP/IP manager 702 classifies received packets according to appropriate protocols and outputs the classified packets to the service delivery manager 705, the service discovery manager 710, the service control manager 709, and the metadata manager 712.

The service delivery manager 703 controls received service data. For example, when controlling real-time streaming data, the service delivery manager 703 may use the Real-time Transport Protocol/Real-time Transport Control Protocol (RTP/RTCP). If real-time streaming data is transmitted over RTP/RTCP, the service delivery manager 703 parses the received real-time streaming data using RTP and outputs the parsed real-time streaming data to the DEMUX 705 or stores the parsed real-time streaming data in the SI & metadata DB 711 under the control of the service manager 713. In addition, the service delivery manager 703 feeds back network reception information to a server that provides the real-time streaming data service using RTCP.

The DEMUX 705 demultiplexes a received packet into audio data, video data and PSI data and outputs the audio data, video data and PSI data to the audio decoder 706, the video decoder 707, and the PSI & (PSIP and/or SI) decoder 704, respectively.

The PSI & (PSIP and/or SI) decoder 704 decodes SI such as PSI. More specifically, the PSI & (PSIP and/or SI) decoder 704 decodes PSI sections, PSIP sections or SI sections received from the DEMUX 705.

The PSI & (PSIP and/or SI) decoder 704 constructs an SI DB by decoding the received sections and stores the SI DB in the SI & metadata DB 711.

The audio decoder 706 and the video decoder 707 decode the audio data and the video data received from the DEMUX 705 and output the decoded audio and video data to a user through the display A/V and OSD module 708.

The UI manager 714 and the service manager 713 manage the overall state of the image display apparatus 700, provide UIs, and manage other managers.

The UI manager 714 provides a Graphical User Interface (GUI) in the form of an OSD and performs a reception operation corresponding to a key input received from the user. For example, upon receipt of a key input signal regarding channel selection from the user, the UI manager 714 transmits the key input signal to the service manager 713.

The service manager 713 controls managers associated with services, such as the service delivery manager 703, the service discovery manager 710, the service control manager 709, and the metadata manager 712.

The service manager 713 also makes a channel map and selects a channel using the channel map according to the key input signal received from the UI manager 714. The service manager 713 sets the audio/video Packet ID (PID) of the selected channel based on SI about the channel received from the PSI & (PSIP and/or SI) decoder 704.

The service discovery manager 710 provides information necessary to select an SP that provides a service. Upon receipt of a channel selection signal from the service manager 713, the service discovery manager 710 detects a service based on the channel selection signal.

The service control manager 709 takes charge of selecting and control services. For example, if a user selects live broadcasting, like a conventional broadcasting service, the service control manager selects and controls the service using Internet Group Management Protocol (IGMP) or Real-Time Streaming Protocol (RTSP). If the user selects Video on Demand (VoD), the service control manager 709 selects and controls the service. RTSP supports trick mode for real-time streaming. Further, the service control manager 709 may initialize and manage a session through an IP Multimedia Control (IMC) gateway using IP Multimedia Subsystem (IMS) and Session Initiation Protocol (SIP). The protocols are given by way of example and thus other protocols are also applicable according to other embodiments.

The metadata manager 712 manages metadata related to services and stores the metadata in the SI & metadata DB 711.

The SI & metadata DB 711 stores the SI decoded by the PSI & (PSIP and/or SI) decoder 704, the metadata managed by the metadata manager 712, and the information required to select an SP, received from the service discovery manager 710. The SI & metadata DB 711 may store setup data for the system.

The SI & metadata DB 711 may be constructed in a Non-Volatile RAM (NVRAM) or a flash memory.

An IMS gateway 705 is a gateway equipped with functions needed to access IMS-based IPTV services.

Figure 6:
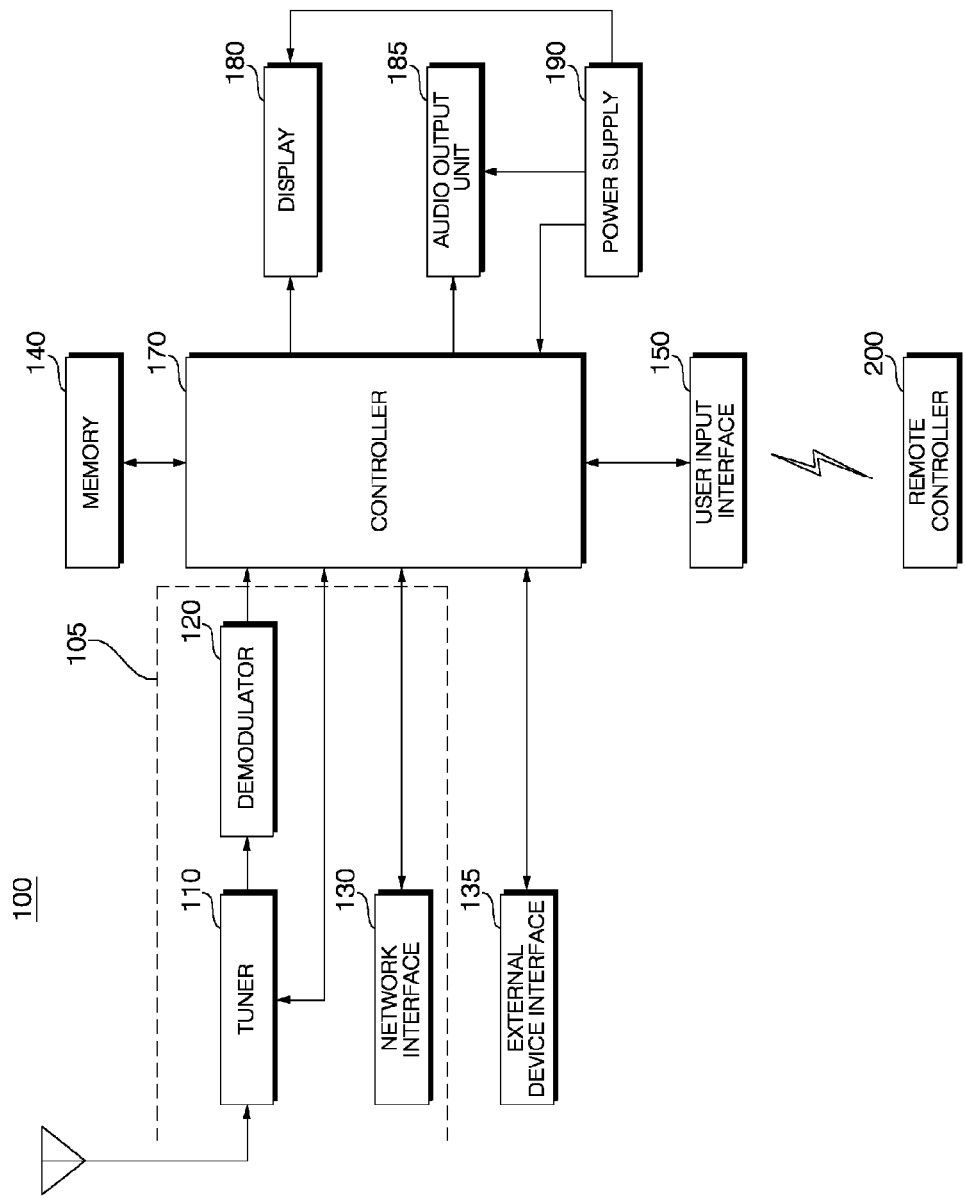
FIG. 6 is a detailed block diagram of the image display apparatus illustrated in FIG. 1 or 2 according to another embodiment of the present invention.

FIG. 6 is a detailed block diagram of the image display apparatus illustrated in FIG. 1 or 2 according to another embodiment of the present invention.

Referring to FIG. 6, an image display apparatus 100 according to another embodiment of the present invention includes a broadcasting receiver 105, an external device interface 135, a memory 140, a user input interface 150, a controller 170, a display 180, an audio output unit 185, a power supply 190, and a camera module. The broadcasting receiver 105 may include a tuner 110, a demodulator 120 and a network interface 130. As needed, the broadcasting receiver 105 may be configured so as to include only the tuner 110 and the demodulator 120 or only the network interface 130.

The tuner 110 selects a Radio Frequency (RF) broadcast signal corresponding to a channel selected by a user from among a plurality of RF broadcast signals received through an antenna and downconverts the selected RF broadcast signal into a digital Intermediate Frequency (IF) signal or an analog baseband A/V signal.

More specifically, if the selected RF broadcast signal is a digital broadcast signal, the tuner 110 downconverts the selected RF broadcast signal into a digital IF signal DIF. On the other hand, if the selected RF broadcast signal is an analog broadcast signal, the tuner 110 downconverts the selected RF broadcast signal into an analog baseband A/V signal, CVBS/SIF. That is, the tuner 110 may be a hybrid tuner capable of processing not only digital broadcast signals but also analog broadcast signals. The analog baseband A/V signal CVBS/SIF may be directly input to the controller 170.

The tuner 110 may be capable of receiving RF broadcast signals from an Advanced Television Systems Committee (ATSC) single-carrier system or from a Digital Video Broadcasting (DVB) multi-carrier system.

The tuner 110 may sequentially select a number of RF broadcast signals corresponding to all broadcast channels previously stored in the image display apparatus 100 by a channel add function from a plurality of RF signals received through the antenna and may downconvert the selected RF broadcast signals into IF signals or baseband A/V signals.

The demodulator 120 receives the digital IF signal DIF from the tuner 110 and demodulates the digital IF signal DIF.

For example, if the digital IF signal DIF is an ATSC signal, the demodulator 120 may perform 8-Vestigal SideBand (VSB) demodulation on the digital IF signal DIF. The demodulator 120 may also perform channel decoding. For channel decoding, the demodulator 120 may include a Trellis decoder, a de-interleaver and a Reed-Solomon decoder so as to perform Trellis decoding, de-interleaving and Reed-Solomon decoding.

For example, if the digital IF signal DIF is a DVB signal, the demodulator 120 performs Coded Orthogonal Frequency Division Multiple Access (COFDMA) demodulation upon the digital IF signal DIF. The demodulator 120 may also perform channel decoding. For channel decoding, the demodulator 120 may include a convolution decoder, a de-interleaver, and a Reed-Solomon decoder so as to perform convolution decoding, de-interleaving, and Reed-Solomon decoding.

The demodulator 120 may perform demodulation and channel decoding on the digital IF signal DIF, thereby obtaining a stream signal TS. The stream signal TS may be a signal in which a video signal, an audio signal and a data signal are multiplexed. For example, the stream signal TS may be an MPEG-2 TS in which an MPEG-2 video signal and a Dolby AC-3 audio signal are multiplexed. An MPEG-2 TS may include a 4-byte header and a 184-byte payload.

In order to properly handle not only ATSC signals but also DVB signals, the demodulator 120 may include an ATSC demodulator and a DVB demodulator.

The stream signal TS may be input to the controller 170 and thus subjected to demultiplexing and A/V signal processing. The processed video and audio signals are output to the display 180 and the audio output unit 185, respectively.

The external device interface 135 may serve as an interface between an external device and the image display apparatus 100. For interfacing, the external device interface 135 may include an A/V Input/Output (I/O) unit and/or a wireless communication module.

The external device interface 135 may be connected to an external device such as a Digital Versatile Disk (DVD) player, a Blu-ray player, a game console, a camera, a camcorder, or a computer (e.g., a laptop computer), wirelessly or by wire. Then, the external device interface 135 externally receives video, audio, and/or data signals from the external device and transmits the received input signals to the controller 170. In addition, the external device interface 135 may output video, audio, and data signals processed by the controller 170 to the external device. In order to receive or transmit audio, video and data signals from or to the external device, the external device interface 135 includes the A/V I/O unit and/or the wireless communication module.

The A/V I/O unit of the external device interface 135 may include a Universal Serial Bus (USB) port, a Composite Video Banking Sync (CVBS) port, a Component port, a Super-video (S-video) (analog) port, a Digital Visual Interface (DVI) port, a High-Definition Multimedia Interface (HDMI) port, a Red-Green-Blue (RGB) port, and a D-sub port.

The wireless communication module of the external device interface 135 may perform short-range wireless communication with other electronic devices. For short-range wireless communication, the wireless communication module may use Bluetooth, Radio-Frequency IDentification (RFID), Infrared Data Association (IrDA), Ultra WideBand (UWB), ZigBee, and Digital Living Network Alliance (DLNA).

The external device interface 135 may be connected to various set-top boxes through at least one of the above-described ports and may thus receive data from or transmit data to the various set-top boxes.

The external device interface 135 may receive applications or an application list from an adjacent external device and provide the applications or the application list to the controller 170 or the memory 140.

The network interface 130 serves as an interface between the image display apparatus 100 and a wired/wireless network such as the Internet. The network interface 130 may include an Ethernet port for connection to a wired network. The wireless communication module of the external signal I/O unit 128 may wirelessly access the Internet. For connection to wireless networks, the network interface 130 may use Wireless Local Area Network (WLAN) (i.e., Wi-Fi), Wireless Broadband (WiBro), World Interoperability for Microwave Access (WiMax), and High Speed Downlink Packet Access (HSDPA).

The network interface 130 may transmit data to or receive data from another user or electronic device over a connected network or another network linked to the connected network. Especially, the network interface 130 may transmit data stored in the image display apparatus 100 to a user or electronic device selected from among users or electronic devices pre-registered with the image display apparatus 100.

The network interface 130 may access a specific Web page over a connected network or another network linked to the connected network. That is, the network interface 130 may access a specific Web page over a network and transmit or receive data to or from a server. Additionally, the network interface 130 may receive content or data from a CP or an NP. Specifically, the network interface 130 may receive content such as movies, advertisements, games, VoD files, and broadcast signals, and information related to the content from a CP or an NP. Also, the network interface 130 may receive update information about firmware and update files of the firmware from the NP. The network interface 130 may transmit data over the Internet or to the CP or the NP.

The network interface 130 may selectively receive a desired application among open applications over a network.

In an embodiment of the present invention, when a game application is executed in the image display apparatus 100, the network interface 130 may transmit data to or receive data from a user terminal connected to the image display apparatus 100 through a network. In addition, the network interface 130 may transmit specific data to or receive specific data from a server that records game scores.

The memory 140 may store various programs necessary for the controller 170 to process and control signals, and may also store processed video, audio and data signals.

The memory 140 may temporarily store a video, audio and/or data signal received from the external device interface 135 or the network interface 130. The memory 140 may store information about broadcast channels by the channel-add function.

The memory 140 may store applications or a list of applications received from the external device interface 135 or the network interface 130.

The memory 140 may store a variety of platforms which will be described later.

In an embodiment of the present invention, when the image display apparatus 100 executes a game application, the memory 140 may store user-specific information and game play information about a user terminal used as a game controller.

The memory 140 may include, for example, at least one of a flash memory-type storage medium, a hard disk-type storage medium, a multimedia card micro-type storage medium, a card-type memory (e.g. a Secure Digital (SD) or eXtreme Digital (XD) memory), a Random Access Memory (RAM), or a Read-Only Memory (ROM) such as an Electrically Erasable and Programmable Read Only Memory. The image display apparatus 100 may reproduce content stored in the memory 140 (e.g. video files, still image files, music files, text files, and application files) to the user.

While the memory 140 is shown in FIG. 6 as configured separately from the controller 170, to which the present invention is not limited, the memory 140 may be incorporated into the controller 170, for example.

The user input interface 150 transmits a signal received from the user to the controller 170 or transmits a signal received from the controller 170 to the user.

For example, the user input interface 150 may receive various user input signals such as a power-on/off signal, a channel selection signal, and a screen setting signal from a remote controller 200 or may transmit a signal received from the controller 170 to the remote controller 200, according to various communication schemes, for example, RF communication and IR communication.

For example, the user input interface 150 may provide the controller 170 with user input signals or control signals received from local keys, such as inputs of a power key, a channel key, and a volume key, and setting values.

Also, the user input interface 150 may transmit a control signal received from a sensor unit for sensing a user gesture to the controller 170 or transmit a signal received from the controller 170 to the sensor unit. The sensor unit may include a touch sensor, a voice sensor, a position sensor, a motion sensor, etc.

The controller 170 may demultiplex the stream signal TS received from the tuner 110, the demodulator 120, or the external device interface 135 into a number of signals and process the demultiplexed signals into audio and video data.

The video signal processed by the controller 170 may be displayed as an image on the display 180. The video signal processed by the controller 170 may also be transmitted to an external output device through the external device interface 135.

The audio signal processed by the controller 170 may be output to the audio output unit 185. Also, the audio signal processed by the controller 170 may be transmitted to the external output device through the external device interface 135.

While not shown in FIG. 6, the controller 170 may include a DEMUX and a video processor, which will be described later with reference to FIG. 10.

In addition, the controller 170 may provide overall control to the image display apparatus 100. For example, the controller 170 may control the tuner 110 to select an RF broadcast signal corresponding to a user-selected channel or a pre-stored channel.

The controller 170 may control the image display apparatus 100 according to a user command received through the user input interface 150 or according to an internal program. Especially the controller 170 may access a network and download an application or application list selected by the user to the image display apparatus 100 over the network.

For example, the controller 170 controls the tuner 110 to receive a channel selected according to a specific channel selection command received through the user input interface 150, and the controller 170 processes a video, audio and/or data signal of the selected channel. The controller 170 outputs the processed video or audio signal along with information about the user-selected channel to the display 180 or the audio output unit 185.

In another example, the controller 170 outputs a video or audio signal received from an external device such as a camera or a camcorder through the external device interface 135 to the display 180 or the audio output unit 185 according to an external device video playback command received through the external device interface 150.

The controller 170 may control the display 180 to display images. For instance, the controller 170 may control the display 180 to display a broadcast image received from the tuner 110, an external input image received through the external device interface 135, an image received through the network interface 130, or an image stored in the memory 140. The image displayed on the display 180 may be a Two-Dimensional (2D) or Three-Dimensional (3D) still image or moving picture.

The controller 170 may control content playback. The content may include any content stored in the image display apparatus 100, received broadcast content, and external input content. The content includes at least one of a broadcast image, an external input image, an audio file, a still image, a Web page, or a text file.

Upon receipt of a go-to-home input, the controller 170 may control display of the home screen on the display 180 in an embodiment of the present invention.

The home screen may include a plurality of card objects classified according to content sources. The card objects may include at least one of a card object representing a thumbnail list of broadcast channels, a card object representing a broadcast program guide, a card object representing a program reservation list or a program recording list, or a card object representing a media list of a device connected to the image display apparatus 100. The card objects may further include at least one of a card object representing a list of connected external devices or a card object representing a call-associated list.

The home screen may further include an application menu with at least one application that can be executed.

Upon receipt of a card object move input, the controller 170 may control movement of a card object corresponding to the card object move input on the display 180, or if the card object is not displayed on the display 180, the controller 170 may control display of the card object on the display 180.

When a card object is selected from among the card objects on the home screen, the controller 170 may control display of an image corresponding to the selected card object on the display 180.

The controller 170 may control display of an input broadcast image and an object representing information about the broadcast image in a card object representing broadcast images. The broadcast image may be fixed in size through lock setting.

The controller 170 may control display of a set-up object for at least one of image setting, audio setting, screen setting, reservation setting, setting of a pointer of the remote controller, or network setting on the home screen.

The controller 170 may control display of a log-in object, a help object, or an exit object on a part of the home screen.

The controller 170 may control display of an object representing the total number of available card objects or the number of card objects displayed on the display 180 among all card objects, on a part of the home screen.

If one of the card objects displayed on the display 180 is selected, the controller 170 may fullscreen the selected card object to cover the entirety of the display 180.

Upon receipt of an incoming call at a connected external device or the image display apparatus 100, the controller 170 may control focusing-on or shift of a call-related card object among the plurality of card objects.

If an application view menu item is selected, the controller 170 may control display of applications or a list of applications that are available in the image display apparatus or downloadable from an external network.

The controller 170 may control installation and execution of an application downloaded from the external network along with various UIs. Also, the controller 170 may control display of an image related to the executed application on the display 180, upon user selection.

In an embodiment of the present invention, when the image display apparatus 100 provides a game application, the controller 170 may control assignment of player IDs to specific user terminals, creation of game play information by executing the game application, transmission of the game play information to the user terminals through the network interface 130, and reception of the game play information at the user terminals.

The controller 170 may control detection of user terminals connected to the image display apparatus 100 over a network through the network interface 130, display of a list of the detected user terminals on the display 180 and reception of a selection signal indicating a user terminal selected for use as a user controller from among the listed user terminals through the user input interface 150.

The controller 170 may control output of a game play screen of the game application, inclusive of player information about each user terminal and game play information, through the display 180.

The controller 170 may determine the specific signal received from a user terminal through the network interface 130 as game play information and thus control the game play information to be reflected in the game application in progress.

The controller 170 may control transmission of the game play information about the game application to a specific server connected to the image display apparatus 100 over a network through the network interface 130.

As another embodiment, upon receipt of information about a change in the game play information from the server through the network interface 130, the controller 170 may control output of a notification message in a predetermined area of the display 180.

The image display apparatus 100 may further include a channel browsing processor for generating thumbnail images corresponding to channel signals or external input signals.

The channel browsing processor may extract some of the video frames of each of stream signals TS received from the demodulator 120 or stream signals received from the external device interface 135 and display the extracted video frames on the display 180 as thumbnail images. The thumbnail images may be directly output to the controller 170 or may be output after being encoded. Also, it is possible to encode the thumbnail images into a stream and output the stream to the controller 170. The controller 170 may display a thumbnail list including a plurality of received thumbnail images on the display 180. The thumbnail images may be updated sequentially or simultaneously in the thumbnail list. Therefore, the user can readily identify the content of broadcast programs received through a plurality of channels.

The display 180 may convert a processed video signal, a processed data signal, and an OSD signal received from the controller 170 or a video signal and a data signal received from the external device interface 135 into RGB signals, thereby generating driving signals.

The display 180 may be various types of displays such as a Plasma Display Panel (PDP), a Liquid Crystal Display (LCD), an Organic Light-Emitting Diode (OLED) display, a flexible display, and a 3D display.

The display 180 may also be a touch screen that can be used not only as an output device but also as an input device.

The audio output unit 185 may receive a processed audio signal (e.g., a stereo signal, a 3.1-channel signal or a 5.1-channel signal) from the controller 170 and output the received audio signal as sound. The audio output unit 185 may employ various speaker configurations.

To sense a user gesture, the image display apparatus 100 may further include the sensor unit that has at least one of a touch sensor, a voice sensor, a position sensor, and a motion sensor, as stated before. A signal sensed by the sensor unit may be output to the controller 170 through the user input interface 150.

The image display apparatus 100 may further include the camera unit for capturing images of a user. Image information captured by the camera unit may be input to the controller 170.

The controller 170 may sense a user gesture from an image captured by the camera unit or a signal sensed by the sensor unit, or by combining the captured image and the sensed signal.

The power supply 190 supplies power to the image display apparatus 100. Particularly, the power supply 190 may supply power to the controller 170, the display 180, and the audio output unit 185, which may be implemented as a System On Chip (SOC).

For supplying power, the power supply 190 may include a converter for converting Alternating Current (AC) into Direct Current (DC). If the display 180 is configured with, for example, a liquid crystal panel having a plurality of backlight lamps, the power supply 190 may further include an inverter capable of performing Pulse Width Modulation (PWM) for luminance change or dimming driving.

The remote controller 200 transmits a user input to the user input interface 150. For transmission of user input, the remote controller 200 may use various communication techniques such as Bluetooth, RF communication, IR communication, UWB and ZigBee.

In addition, the remote controller 200 may receive a video signal, an audio signal or a data signal from the user input interface 150 and output the received signals visually, audibly or as vibrations.

The above-described image display apparatus 100 may be a fixed digital broadcast receiver capable of receiving at least one of ATSC (8-VSB) broadcast programs, DVB-T (COFDM) broadcast programs, and ISDB-T (BST-OFDM) broadcast programs.

The block diagram of the image display apparatus 100 illustrated in FIG. 6 is purely exemplary. Depending upon the specifications of the image display apparatus 100 in actual implementation, the components of the image display apparatus 100 may be combined or omitted or new components may be added. That is, two or more components are incorporated into one component or one component may be configured as separate components, as needed. In addition, the function of each block is described for the purpose of describing the embodiment of the present invention and thus specific operations or devices should not be construed as limiting the scope and spirit of the present invention.

Unlike the configuration illustrated in FIG. 6, the image display apparatus 100 may be configured so as to receive and playback video content through the network interface 130 or the external device interface 135, without the tuner 100 and the demodulator 120.

The image display apparatus 100 is an example of image signal processing apparatus that processes a stored image or an input image. Other examples of the image signal processing apparatus include a set-top box without the display 180 or the audio output unit 185, a DVD player, a Blu-ray player, a game console, and a computer. The set-top box will be described later with reference to FIGS. 7 and 8.

Figure 7:
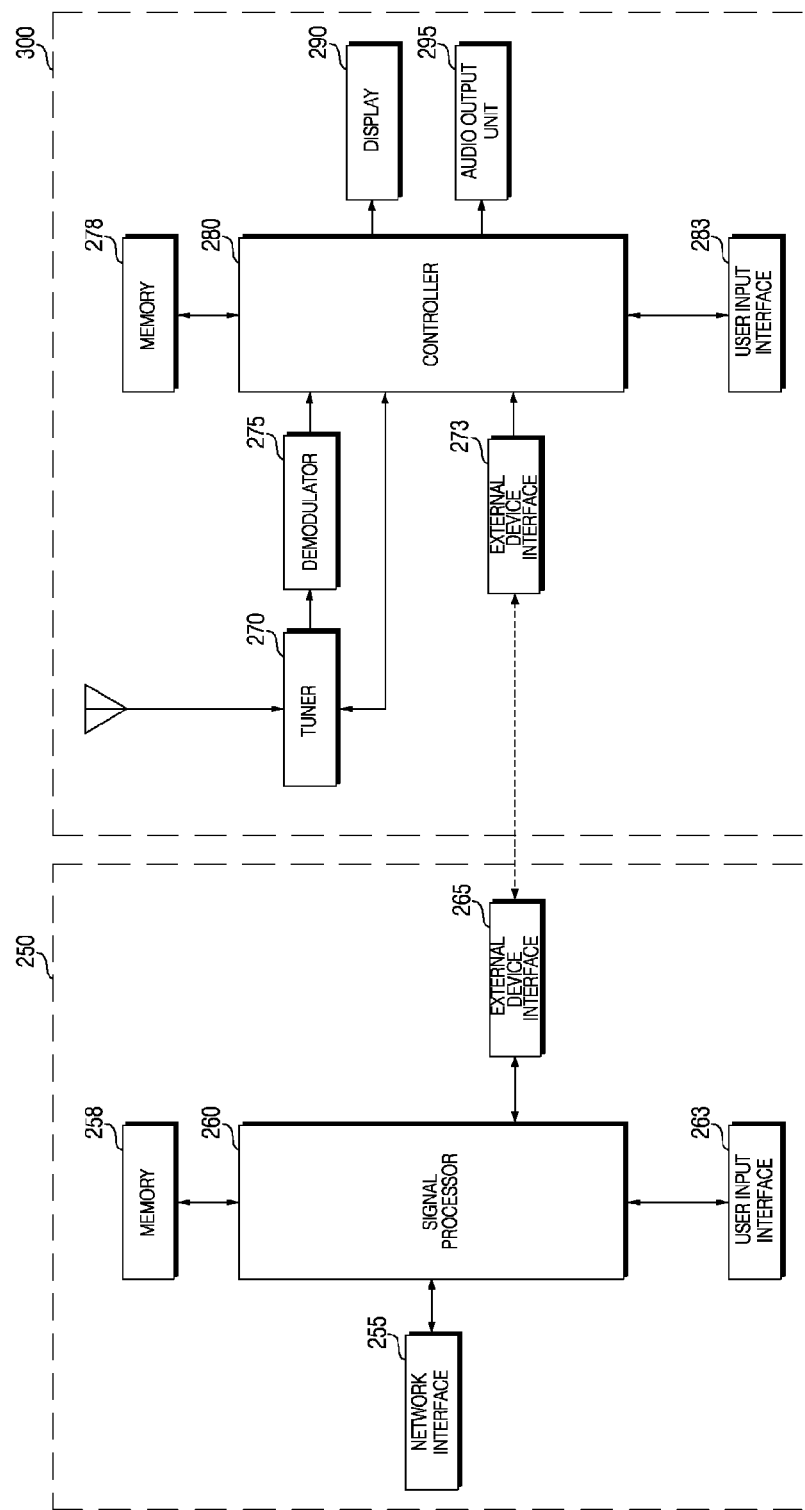
FIGS. 7 and 8 are block diagrams illustrating either of the image display apparatuses separately as a set-top box and a display device according to embodiments of the present invention.
Figure 8:
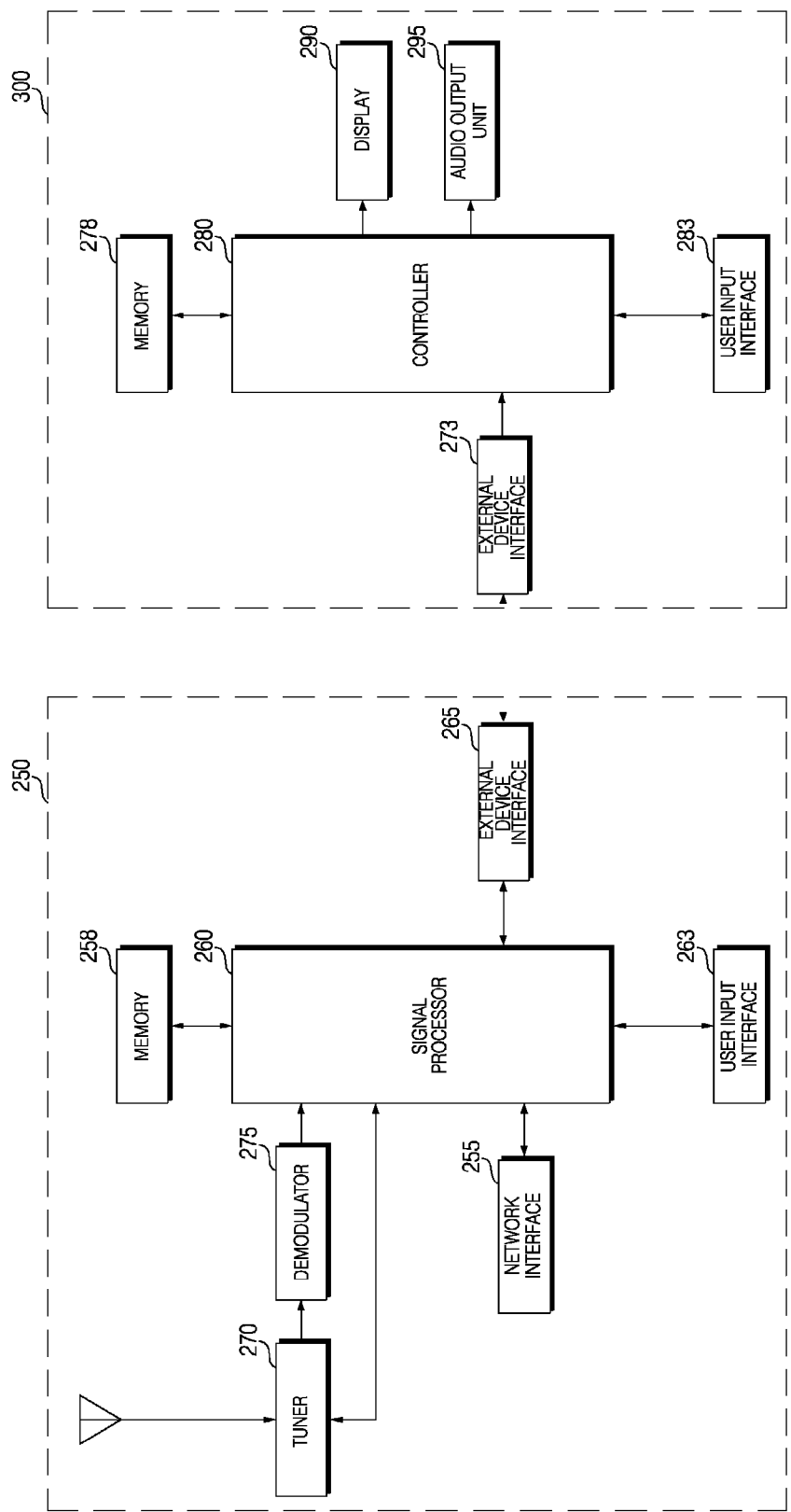

FIGS. 7 and 8 are block diagrams illustrating either of the image display apparatuses separately as a set-top box and a display device according to embodiments of the present invention.

Referring to FIG. 7, a set-top box 250 and a display device 300 may transmit or receive data wirelessly or by wire.

The set-top box 250 may include a network interface 255, a memory 258, a signal processor 260, a user input interface 263, and an external device interface 265.

The network interface 255 serves as an interface between the set-top box 250 and a wired/wireless network such as the Internet. The network interface 255 may transmit data to or receive data from another user or another electronic device over a connected network or over another network linked to the connected network.

The memory 258 may store programs necessary for the signal processor 260 to process and control signals and temporarily store a video, audio and/or data signal received from the external device interface 265 or the network interface 255. The memory 258 may also store platforms illustrated in FIGS. 11 and 12, as described later.

The signal processor 260 processes an input signal. For example, the signal processor 260 may demultiplex or decode an input video or audio signal. For signal processing, the signal processor 260 may include a video decoder or an audio decoder. The processed video or audio signal may be transmitted to the display device 300 through the external device interface 265.

The user input interface 263 transmits a signal received from the user to the signal processor 260 or a signal received from the signal processor 260 to the user. For example, the user input interface 263 may receive various control signals such as a power on/off signal, an operation input signal, and a setting input signal through a local key or the remote controller 200 and output the control signals to the signal processor 260.

The external device interface 265 serves as an interface between the set-top box 250 and an external device that is connected wirelessly or by wire, particularly the display device 300, for signal transmission or reception. The external device interface 265 may also interface with an external device such as a game console, a camera, a camcorder, and a computer (e.g. a laptop computer), for data transmission or reception.

The set-top box 250 may further include a media input unit for media playback. The media input unit may be a Blu-ray input unit, for example. That is, the set-top box 250 may include a Blu-ray player. After signal processing such as demultiplexing or decoding in the signal processor 260, a media signal from a Blu-ray disk may be transmitted to the display device 300 through the external device interface 265 so as to be displayed on the display device 300.

The display device 300 may include a tuner 270, an external device interface 273, a demodulator 275, a memory 278, a controller 280, a user input interface 283, a display 290, and an audio output unit 295.

The tuner 270, the demodulator 275, the memory 278, the controller 280, the user input interface 283, the display 290, and the audio output unit 295 are identical respectively to the tuner 110, the demodulator 120, the memory 140, the controller 170, the user input interface 150, the display 180, and the audio output unit 185 illustrated in FIG. 6 and thus a description thereof is not provided herein.

The external device interface 273 serves as an interface between the display device 300 and a wireless or wired external device, particularly the set-top box 250, for data transmission or reception.

Hence, a video signal or an audio signal received through the set-top box 250 is output through the display 290 or the audio output unit 295 through the controller 280.

Referring to FIG. 8, the configuration of the set-top box 250 and the display device 300 illustrated in FIG. 8 is similar to that of the set-top box 250 and the display device 300 illustrated in FIG. 7, except that the tuner 270 and the demodulator 275 reside in the set-top box 250, not in the display device 300. Thus the following description is given focusing on such difference.

The signal processor 260 may process a broadcast signal received through the tuner 270 and the demodulator 275. The user input interface 263 may receive a channel selection input, a channel store input, etc.

Figure 9:
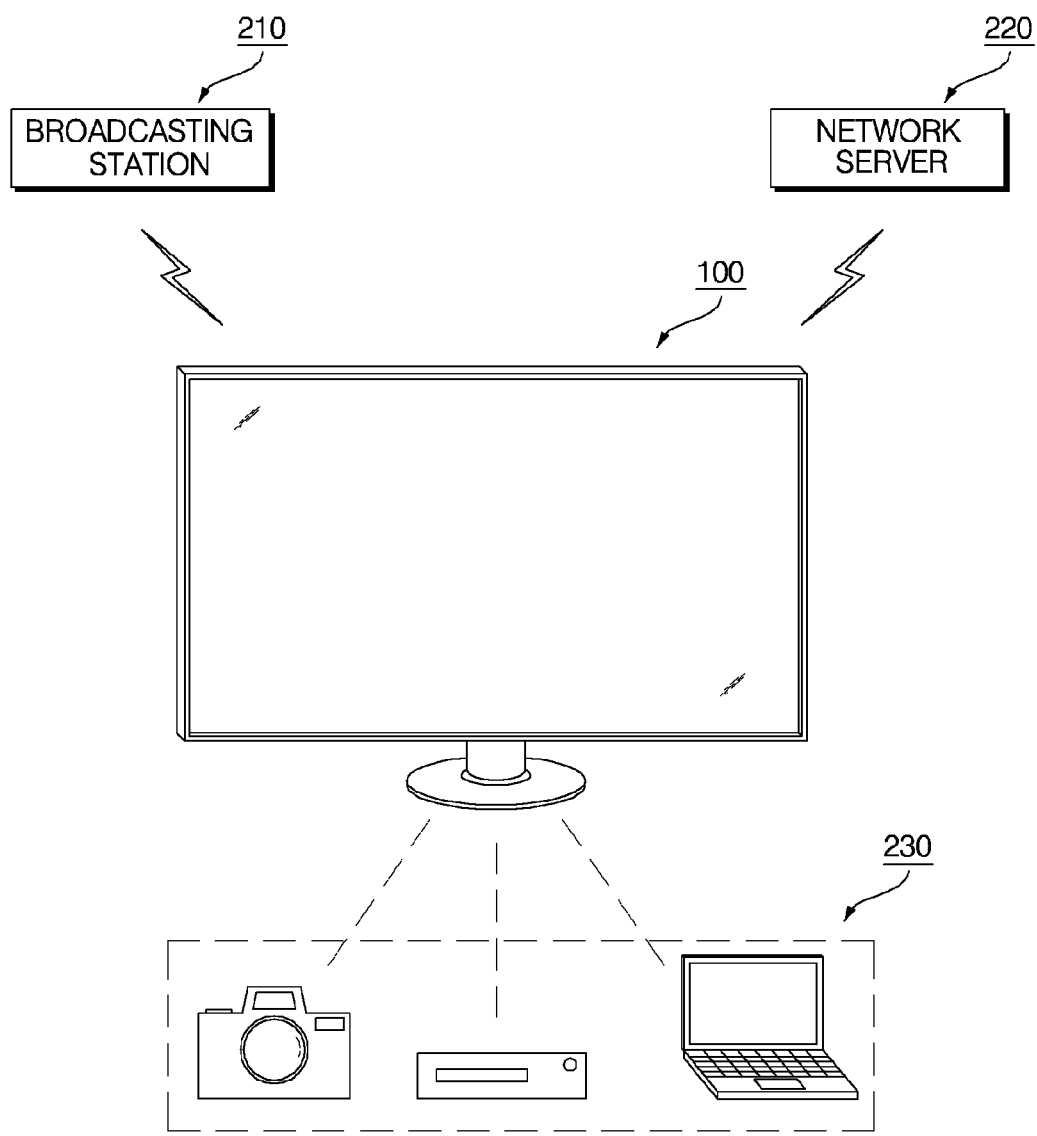
FIG. 9 illustrates an operation for communicating with third devices in either of the image display apparatuses according to an embodiment of the present invention.

FIG. 9 illustrates an operation for communicating with third devices in either of the image display apparatuses according to an embodiment of the present invention. The image display apparatus illustrated in FIG. 9 may be one of the afore-described image display apparatuses according to the embodiments of the present invention.

Referring to FIG. 9, the image display apparatus 100 may communicate with a broadcasting station 210, a network server 220, or an external device 230.

The image display apparatus 100 may receive a broadcast signal including a video signal from the broadcasting station 210. The image display apparatus 100 may process the audio and video signals of the broadcast signal or the data signal of the broadcast signal, suitably for transmission from the image display apparatus 100. The image display apparatus 100 may output images or sound based on the processed video or audio signal.

Meanwhile, the image display apparatus 100 may communicate with the network server 220. The network server 200 is capable of transmitting signals to and receiving signals from the image display apparatus 100 over a network. For example, the network server 220 may be a portable terminal that can be connected to the image display apparatus 100 through a wired or wireless base station. In addition, the network server 200 may provide content to the image display apparatus 100 over the Internet. A CP may provide content to the image display apparatus 100 through the network server 220.

The image display apparatus 100 may communicate with the external device 230. The external device 230 can transmit and receive signals directly to and from the image display apparatus 100 wirelessly or by wire. For instance, the external device 230 may be a media memory device or a player. That is, the external device 230 may be any of a camera, a DVD player, a Blu-ray player, a PC, etc.

The broadcasting station 210, the network server 220 or the external device 230 may transmit a signal including a video signal to the image display apparatus 100. The image display apparatus 100 may display an image based on the video signal included in the received signal. Also, the image display apparatus 100 may transmit a signal received from the broadcasting station 210 or the network server 220 to the external device 230 and may transmit a signal received from the external device 230 to the broadcasting station 210 or the network server 220. That is, the image display apparatus 100 may transmit content included in signals received from the broadcasting station 210, the network server 220, and the external device 230, as well as playback the content immediately.

Figure 10:
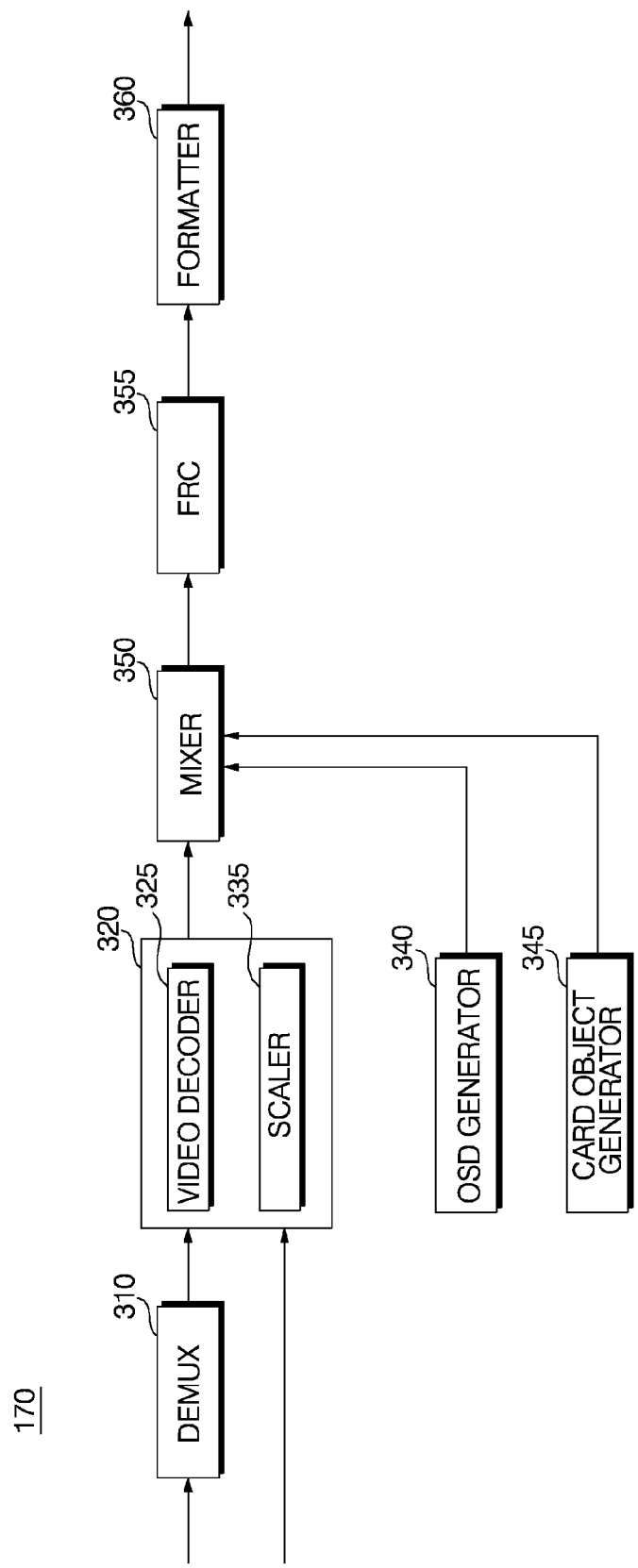
FIG. 10 is a block diagram of a controller illustrated in FIG. 6.

FIG. 10 is a block diagram of the controller illustrated in FIG. 6.

Referring to FIG. 10, the controller 170 may include a DEMUX 310, a video processor 320, an OSD generator 340, a mixer 350, a Frame Rate Converter (FRC) 355, and a formatter 360 according to an embodiment of the present invention. The controller 170 may further include an audio processor and a data processor.

The DEMUX 310 demultiplexes an input stream. For example, the DEMUX 310 may demultiplex an MPEG-2 TS into a video signal, an audio signal, and a data signal. The input stream signal may be received from the tuner 110, the demodulator 120 or the external device interface 135.

The video processor 320 may process the demultiplexed video signal. For video signal processing, the video processor 320 may include a video decoder 325 and a scaler 335.

The video decoder 325 decodes the demultiplexed video signal and the scaler 335 scales the resolution of the decoded video signal so that the video signal can be displayed on the display 180.

The video decoder 325 may be provided with decoders that operate based on various standards.

If the demultiplexed video signal is, for example, an MPEC-2 encoded video signal, the video signal may be decoded by an MPEC-2 decoder.

On the other hand, if the video signal is an H.264-encoded DMB or DVB-handheld (DVB-H) signal, the video signal may be decoded by an H.264 decoder.

The video signal decoded by the video processor 320 is provided to the mixer 350.

The OSD generator 340 generates an OSD signal autonomously or according to user input. For example, the OSD generator 340 may generate signals by which a variety of information is displayed as images or text on the display 180, according to control signals received from the user input interface 150. The OSD signal may include various data such as a UI, a variety of menu screens, widgets, icons, etc.

For example, the OSD generator 340 may generate a signal by which subtitles are displayed for a broadcast image or Electronic Program Guide (EPG)-based broadcasting information.

The mixer 350 may mix the decoded video signal with the OSD signal and output the mixed signal to the formatter 360. As the decoded broadcast video signal or the external input signal is mixed with the OSD signal, an OSD may be overlaid on the broadcast image or the external input image.

The FRC 355 may change the frame rate of an input image. For example, a frame rate of 60 Hz is converted into a frame rate of 120 or 240 Hz. When the frame rate is to be changed from 60 Hz to 120 Hz, a first frame is inserted between the first frame and a second frame, or a predicted third frame is inserted between the first and second frames. If the frame rate is to be changed from 60 Hz to 240 Hz, three identical frames or three predicted frames are inserted between the first and second frames. It is also possible to maintain the frame rate of the input image without frame rate conversion.

The formatter 360 changes the format of the signal received from the FRC 355 to be suitable for the display 180. For example, the formatter 360 may convert a received signal into an RGB data signal. The RGB signal may be output in the form of a Low Voltage Differential Signal (LVDS) or mini-LVDS.

The audio processor of the controller 170 may process the demultiplexed audio signal. For audio signal processing, the audio processor may have a plurality of decoders.

If the demultiplexed audio signal is a coded audio signal, the audio processor of the controller 170 may decode the audio signal. For example, the demultiplexed audio signal may be decoded by an MPEG-2 decoder, an MPEG-4 decoder, an Advanced Audio Coding (AAC) decoder, or an AC-3 decoder.

The audio processor of the controller 170 may also adjust the bass, treble or volume of the audio signal.

The data processor of the controller 170 may process the data signal obtained by demultiplexing the input stream signal. For example, if the data signal is an encoded signal such as an EPG which includes broadcasting information specifying the start time, end time, etc. of scheduled broadcast TV or radio programs, the controller 170 may decode the data signal. Examples of an EPG include ATSC-Program and System Information Protocol (PSIP) information and DVB-Service Information (SI).

ATSC-PSIP information or DVB-SI may be included in the header of a TS, i.e., a 4-byte header of an MPEG-2 TS.

The block diagram of the controller 170 illustrated in FIG. 10 is an embodiment of the present invention. Depending upon the specifications of the controller 170, the components of the controller 170 may be combined, or omitted. Or new components are added to the controller 170.

Figure 11:
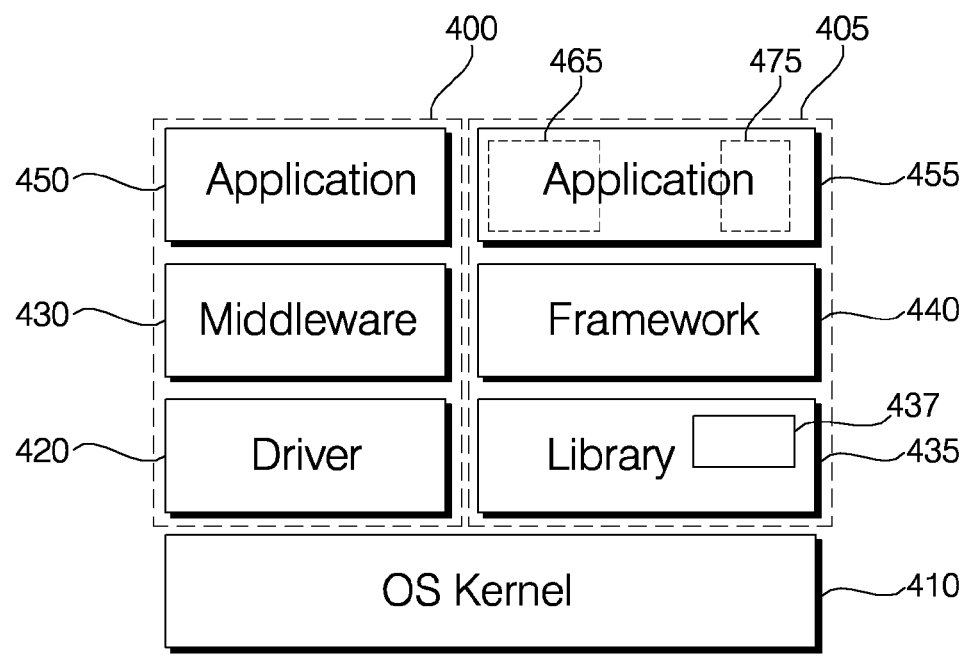
FIG. 11 illustrates a platform architecture for either of the image display apparatuses according to an embodiment of the present invention.
Figure 12:
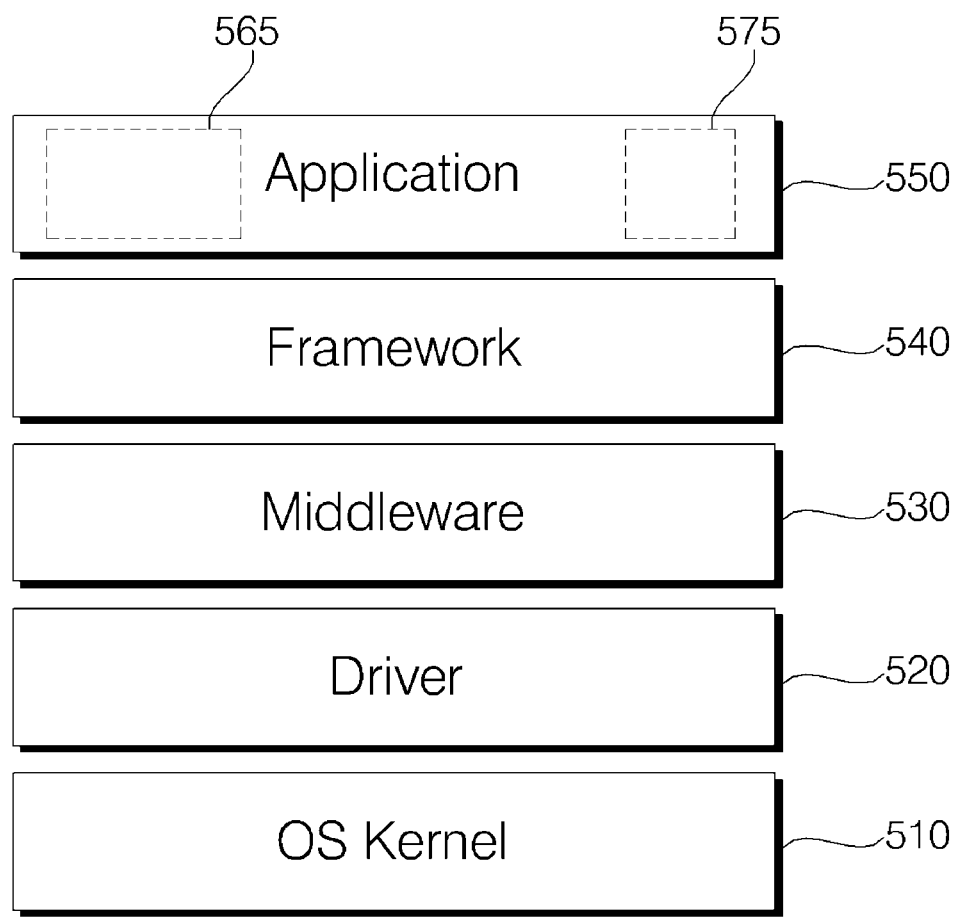
FIG. 12 illustrates a platform architecture for either of the image display apparatuses according to another embodiment of the present invention.

FIG. 11 illustrates a platform architecture for either of the image display apparatuses according to an embodiment of the present invention and FIG. 12 illustrates a platform architecture for either of the image display apparatuses according to another embodiment of the present invention.

A platform for either of the image display apparatuses may have OS-based software to implement the above-described various operations according to an embodiment of the present invention.

Referring to FIG. 11, a platform for either of the image display apparatuses is a separate type according to an embodiment of the present invention. The platform may be designed separately as a legacy system platform 400 and a smart system platform 405. An OS kernel 410 may be shared between the legacy system platform 400 and the smart system platform 405.

The legacy system platform 400 may include a stack of a driver 420, middleware 430, and an application layer 450 on the OS kernel 410.

On the other hand, the smart system platform 405 may include a stack of a library 435, a framework 440, and an application layer 455 on the OS kernel 410.

The OS kernel 410 is the core of an operating system. When the image display apparatus is driven, the OS kernel 410 may be responsible for operation of at least one of hardware drivers, security protection for hardware and processors in the image display apparatus, efficient management of system resources, memory management, hardware interfacing by hardware abstraction, multi-processing, or scheduling associated with the multi-processing. Meanwhile, the OS kernel 410 may further perform power management.

The hardware drivers of the OS kernel 410 may include, for example, at least one of a display driver, a Wi-Fi driver, a Bluetooth driver, a USB driver, an audio driver, a power manager, a binder driver, or a memory driver.

Alternatively or additionally, the hardware drivers of the OS kernel 410 may be drivers for hardware devices within the OS kernel 410. The hardware drivers may include a character device driver, a block device driver, and a network device driver. The block device driver may need a buffer for buffering data on a block basis, because data is transmitted on a block basis. The character device driver may not need a buffer since data is transmitted on a basic data unit basis, that is, on a character basis.

The OS kernel 410 may be implemented based on any of various OSs such as UNIX (Linux), Windows, etc. The OS kernel 410 may be a general-purpose open OS kernel which can be implemented in other electronic devices.

The driver 420 is interposed between the OS kernel 410 and the middleware 430. Along with the middleware 430, the driver 420 drives devices for operations of the application layer 450. For example, the driver 420 may include a driver(s) for a microcomputer, a display module, a Graphic Processing Unit (GPU), the FRC, a General-Purpose Input/Output (GPIO) pin, a High-Definition Multimedia Interface (HDMI), a System Decoder (SDEC) or DEMUX, a Video Decoder (VDEC), an Audio Decoder (ADEC), a Personal Video Recorder (PVR), and/or an Inter-Integrated Circuit (I2C). These drivers operate in conjunction with the hardware drivers of the OS kernel 410.

In addition, the driver 420 may further include a driver for the remote controller 200, especially a pointing device to be described below. The remote controller driver may reside in the OS kernel 410 or the middleware 430, instead of the driver 420.

The middleware 430 resides between the OS kernel 410 and the application layer 450. The middleware 430 may mediate between different hardware devices or different software programs, for data transmission and reception between the hardware devices or the software programs. Therefore, the middleware 430 can provide standard interfaces, support various environments, and enable interaction between tasks conforming to heterogeneous communication protocols.

Examples of the middleware 430 in the legacy system platform 400 may include Multimedia and Hypermedia information coding Experts Group (MHEG) and Advanced Common Application Platform (ACAP) as data broadcasting-related middleware, PSIP or SI middleware as broadcasting information-related middleware, and DLNA middleware as peripheral device communication-related middleware.

The application layer 450 that runs atop the middleware 430 in the legacy system platform 400 may include, for example, UI applications associated with various menus in the image display apparatus. The application layer 450 may allow editing and updating over a network by user selection. With use of the application layer 450, the user may enter a desired menu among various UIs by manipulating the remote controller 210 while viewing a broadcast program.

The application layer 450 may further include at least one of a TV guide application, a Bluetooth application, a reservation application, a Digital Video Recorder (DVR) application, and a hotkey application.

In the smart system platform 405, the library 435 is positioned between the OS kernel 410 and the framework 440, forming the basis of the framework 440. For example, the library 435 may include Secure Socket Layer (SSL) being a security-related library, WebKit being a Web engine-related library, c library (libc), and Media Framework being a media-related library specifying, for example, a video format and an audio format. The library 435 may be written in C or C++. Also, the library 435 may be exposed to a developer through the framework 440.

The library 435 may include a runtime 437 with a core Java library and a Virtual Machine (VM). The runtime 437 and the library 435 form the basis of the framework 440.

The VM may be a virtual machine that enables concurrent execution of a plurality of instances, that is, multi-tasking. For each application of the application layer 455, a VM may be allocated and executed. For scheduling or interconnection between instances, the binder driver of the OS kernel 410 may operate.

The binder driver and the runtime 437 may connect Java applications to C-based libraries.

The library 435 and the runtime 437 may correspond to the middleware 430 of the legacy system platform 400.

In the smart system platform 405, the framework 440 includes programs on which applications of the application layer 455 are based. The framework 440 is compatible with any application and may allow component reuse, movement or exchange. The framework 440 may include supporting programs and programs for interconnecting different software components. For example, the framework 440 may include an activity manager related to activities of applications, a notification manager, and a CP for abstracting common information between applications. This framework 440 may be written in Java.

The application layer 455 on top of the framework 440 includes a variety of programs that are executed and displayed in the image display apparatus. The application layer 455 may include, for example, a core application that is a suit having at least one solution of e-mail, Short Message Service (SMS), calendar, map, or browser. The application layer 455 may be written in Java.

In the application layer 455, applications may be categorized into user-undeletable applications 465 stored in the image display apparatus 100 that cannot be modified and user-installable or user-deletable applications 475 that are downloaded from an external device or a network and stored in the image display apparatus.

With the applications of the application layer 455, a variety of functions such as Internet telephony, VoD, Web album, Social Networking Service (SNS), Location-Based Service (LBS), map service, Web browsing, and application search may be performed through network access. In addition, other functions such as gaming and schedule management may be performed by the applications.

Referring to FIG. 12, a platform for the image display apparatus according to another embodiment of the present invention is an integrated type. The integrated platform may include an OS kernel 510, a driver 520, middleware 530, a framework 540, and an application layer 550.

Compared to the separate-type platform illustrated in FIG. 11, the integrated-type platform is characterized by the absence of the library 435 and the application layer 550 being an integrated layer. The driver 520 and the framework 540 correspond to the driver 420 and the framework 440 of FIG. 5, respectively.

The library 435 of FIG. 11 may be incorporated into the middleware 530. That is, the middleware 530 may include both the legacy system middleware and the image display system middleware. As described before, the legacy system middleware includes MHEG or ACAP as data broadcasting-related middleware, PSIP or SI middleware as broadcasting information-related middleware, and DLNA middleware as peripheral device communication-related middleware, whereas the image display system middleware includes SSL as a security-related library, WebKit as a Web engine-related library, libc, and Media Framework as a media-related library. The middleware 530 may further include the afore-described runtime.

The application layer 550 may include a menu-related application, a TV guide application, a reservation application, etc. as legacy system applications, and e-mail, SMS, a calendar, a map, and a browser as image display system applications.

In the application layer 550, applications may be categorized into user-undeletable applications 565 that are stored in the image display apparatus and user-installable or user-deletable applications 575 that are downloaded from an external device or a network and stored in the image display apparatus.

Based on the afore-described platforms illustrated in FIGS. 11 and 12, a variety of Application Programming Interfaces (APIs) and Software Development Kits (SDKs) necessary to develop applications may be opened. APIs may be implemented functions that provide connectivity to specific sub-routines, for execution of the functions within a program. Or APIs may be implemented programs.

For example, sources related to hardware drivers of the OS kernel 410, such as a display driver, a WiFi driver, a Bluetooth driver, a USB driver or an audio driver, may be opened. Related sources within the driver 420 such as a driver for a microcomputer, a display module, a GPU, an FRC, an SDEC, a VDEC, an ADEC or a pointing device may be opened. In addition, sources related to PSIP or SI middleware as broadcasting information-related middleware or sources related to DLNA middleware may be opened.

Such various open APIs allow developers to create applications executable in the image display apparatus 100 or applications required to control operations of the image display apparatus 100 based on the platforms illustrated in FIGS. 11 and 12.

The platforms illustrated in FIGS. 11 and 12 may be general-purpose ones that can be implemented in many other electronic devices as well as in image display apparatuses. The platforms may be stored or loaded in the memory 140, the controller 170, or any other processor. To execute applications, an additional application processor may be further provided.

Figure 13:
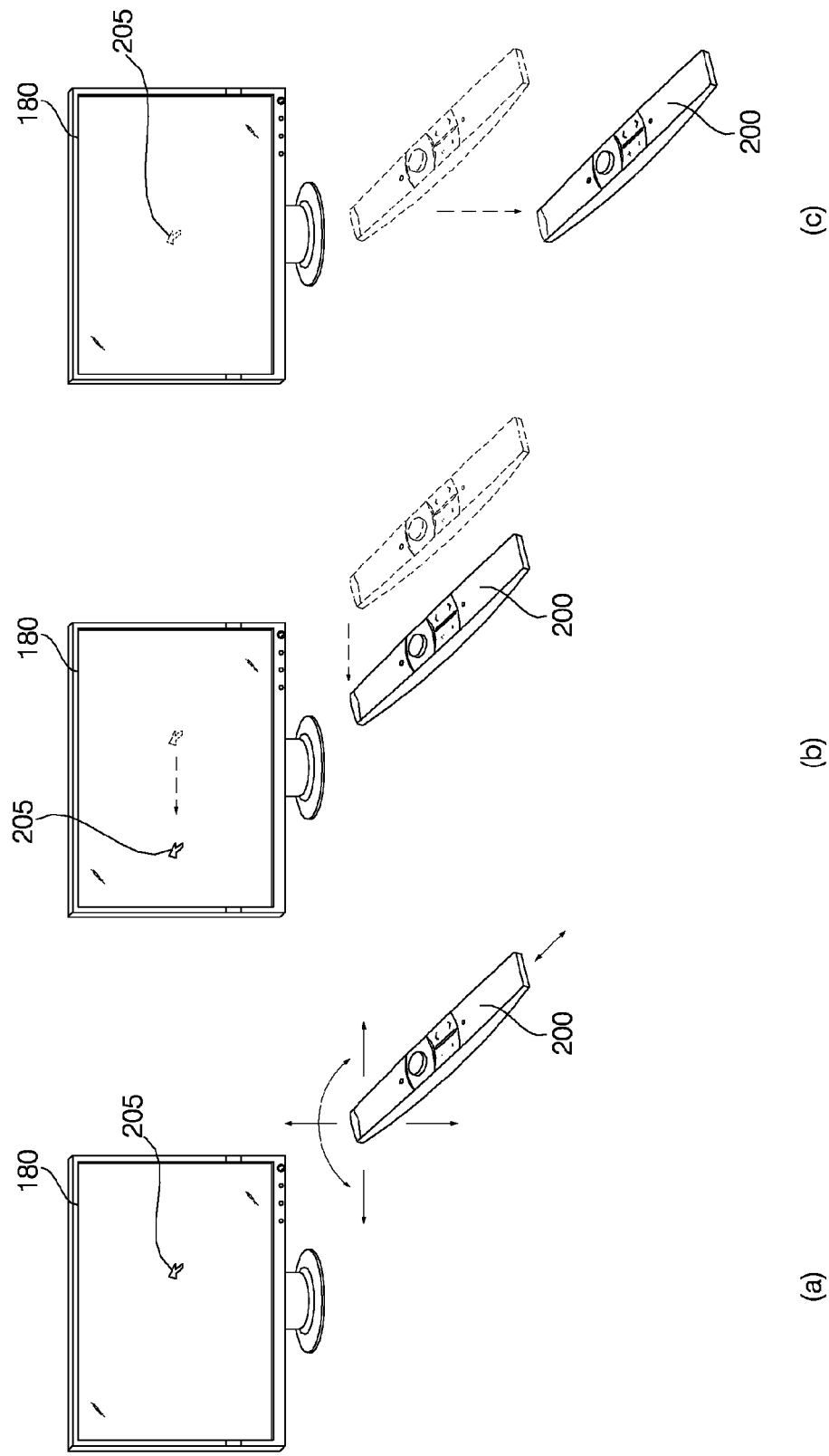
FIG. 13 illustrates a method for controlling either of the image display apparatuses in a remote controller according to an embodiment of the present invention.

FIG. 13 illustrates a method for controlling either of the image display apparatuses using a remote controller according to an embodiment of the present invention.

FIG. 13(*a*) illustrates a pointer 205 representing movement of the remote controller 200 displayed on the display 180.

The user may move or rotate the remote controller 200 up and down, side to side (FIG. 13(*b*)), and back and forth (FIG. 13(*c*)). Since the pointer 205 moves in accordance with the movement of the remote controller 200, the remote controller 200 may be referred to as a pointing device.

Referring to FIG. 13(*b*), if the user moves the remote controller 200 to the left, the pointer 205 moves to the left on the display 180. A sensor of the remote controller 200 detects the movement of the remote controller 200 and transmits motion information corresponding to the result of the detection to the image display apparatus. Then, the image display apparatus determines the movement of the remote controller 200 based on the motion information received from the remote controller 200, and calculates the coordinates of a target point to which the pointer 205 should be shifted in accordance with the movement of the remote controller 200 based on the result of the determination. The image display apparatus then displays the pointer 205 at the calculated coordinates.

Referring to FIG. 13(*c*), while pressing a predetermined button of the remote controller 200, the user moves the remote controller 200 away from the display 180. Then, a selected area corresponding to the pointer 205 may be zoomed in on and enlarged on the display 180. On the contrary, if the user moves the remote controller 200 toward the display 180, the selection area corresponding to the pointer 205 is zoomed out and thus contracted on the display 180. The opposite case is possible. That is, when the remote controller 200 moves away from the display 180, the selection area may be zoomed out and when the remote controller 200 approaches the display 180, the selection area may be zoomed in.

With the predetermined button pressed in the remote controller 200, the up, down, left and right movements of the remote controller 200 may be ignored. That is, when the remote controller 200 moves away from or approaches the display 180, only the back and forth movements of the remote controller 200 are sensed, while the up, down, left and right movements of the remote controller 200 are ignored. Unless the predetermined button is pressed in the remote controller 200, the pointer 205 moves in accordance with the up, down, left or right movement of the remote controller 200.

The speed and direction of the pointer 205 may correspond to the speed and direction of the remote controller 200.

The pointer 205 is an object displayed on the display 180 in correspondence with the movement of the remote controller 200. Therefore, the pointer 205 may have various shapes other than the arrow illustrated in FIG. 13. For example, the pointer 205 may be a dot, a cursor, a prompt, a thick outline, etc. The pointer 205 may be displayed across a plurality of points, such as a line and a surface, as well as at a single point on horizontal and vertical axes.

Figure 14:
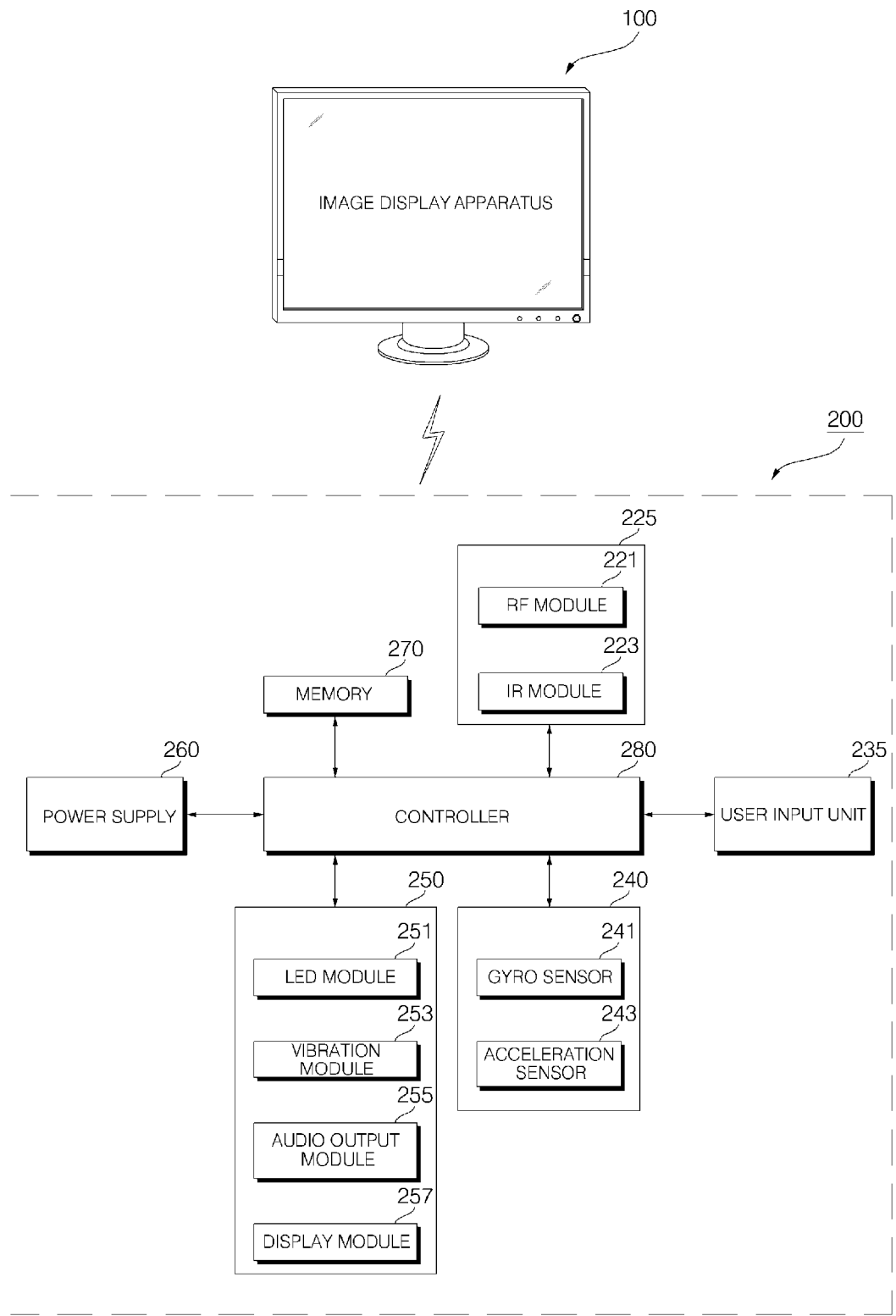
FIG. 14 is a detailed block diagram of the remote controller in either of the image display apparatuses according to an embodiment of the present invention.

FIG. 14 is a detailed block diagram of the remote controller in either of the image display apparatuses according to an embodiment of the present invention.

Referring to FIG. 14, the remote controller 200 may include a wireless communication module 225, a user input unit 235, a sensor unit 240, an output unit 250, a power supply 260, a memory 270, and a controller 280.

The wireless communication module 225 transmits signals to and/or receives signals from either of the afore-described image display apparatuses according to the embodiments of the present invention, herein, the image display apparatus 100.

The wireless communication module 225 may include an RF module 221 for transmitting RF signals to and/or receiving RF signals from the image display apparatus 100 according to an RF communication standard. The wireless communication module 225 may also include an IR module 223 for transmitting IR signals to and/or receiving IR signals from the image display apparatus 100 according to an IR communication standard.

The remote controller 200 transmits motion information representing the movement of the remote controller 200 to the image display apparatus 100 through the RF module 221 in this embodiment. The remote controller 200 may also receive signals from the image display apparatus 100 through the RF module 221. As needed, the remote controller 200 may transmit commands such as a power on/off command, a channel switch command, or a volume change command to the image display apparatus 100 through the IR module 223.

The user input unit 235 may include a keypad, a plurality of buttons, a touchpad and/or a touch screen. The user may enter commands to the image display apparatus 100 by manipulating the user input unit 235. If the user input unit 235 includes a plurality of hard buttons, the user may input various commands to the image display apparatus 100 by pressing the hard buttons. Alternatively or additionally, if the user input unit 235 includes a touch screen displaying a plurality of soft keys, the user may input various commands to the image display apparatus 100 by touching the soft keys. The user input unit 235 may also include various input tools other than those set forth herein, such as a scroll key and/or a jog wheel, which should not be construed as limiting the present invention.

The sensor unit 240 may include a gyro sensor 241 and/or an acceleration sensor 243. The gyro sensor 241 may sense the movement of the remote controller 200, for example, in X-, Y-, and Z-axis directions, and the acceleration sensor 243 may sense the speed of the remote controller 200. The sensor unit 240 may further include a distance sensor for sensing the distance between the remote controller 200 and the display 180.

The output unit 250 may output a video and/or audio signal corresponding to manipulation of the user input unit 235 or corresponding to a signal received from the image display apparatus 100. The user may easily identify whether the user input unit 235 has been manipulated or whether the image display apparatus 100 has been controlled, based on the video and/or audio signal output by the output unit 250.

The output unit 250 may include a Light Emitting Diode (LED) module 351 which is turned on or off whenever the user input unit 235 is manipulated or whenever a signal is received from or transmitted to the image display apparatus 100 through the wireless communication module 225, a vibration module 253 which generates vibrations, an audio output module 255 which outputs audio data, and/or a display module 257 which outputs video data.

The power supply 260 supplies power to the remote controller 200. If the remote controller 200 is kept stationary for a predetermined time or longer, the power supply 260 may, for example, reduce or shut off supply of power to the spatial remote controller 200 in order to save power. The power supply 260 may resume power supply if a predetermined key on the spatial remote controller 200 is manipulated.

The memory 270 may store various types of programs and application data necessary to control or drive the remote controller 200. The spatial remote controller 200 may wirelessly transmit signals to and/or receive signals from the image display apparatus 100 over a predetermined frequency band with the aid of the RF module 221. The controller 280 of the remote controller 200 may store information regarding the frequency band used for the remote controller 200 to wirelessly transmit signals to and/or wirelessly receive signals from the paired image display apparatus 100 in the memory 270, for later use.

The controller 280 provides overall control to the remote controller 200. The controller 280 may transmit a signal corresponding to a key manipulation detected from the user input unit 235 or a signal corresponding to motion of the spatial remote controller 200, as sensed by the sensor unit 240, to the image display apparatus 100.

FIGS. 15 to 18 illustrate UIs in either of the image display apparatuses according to embodiments of the present invention.

Figure 15:
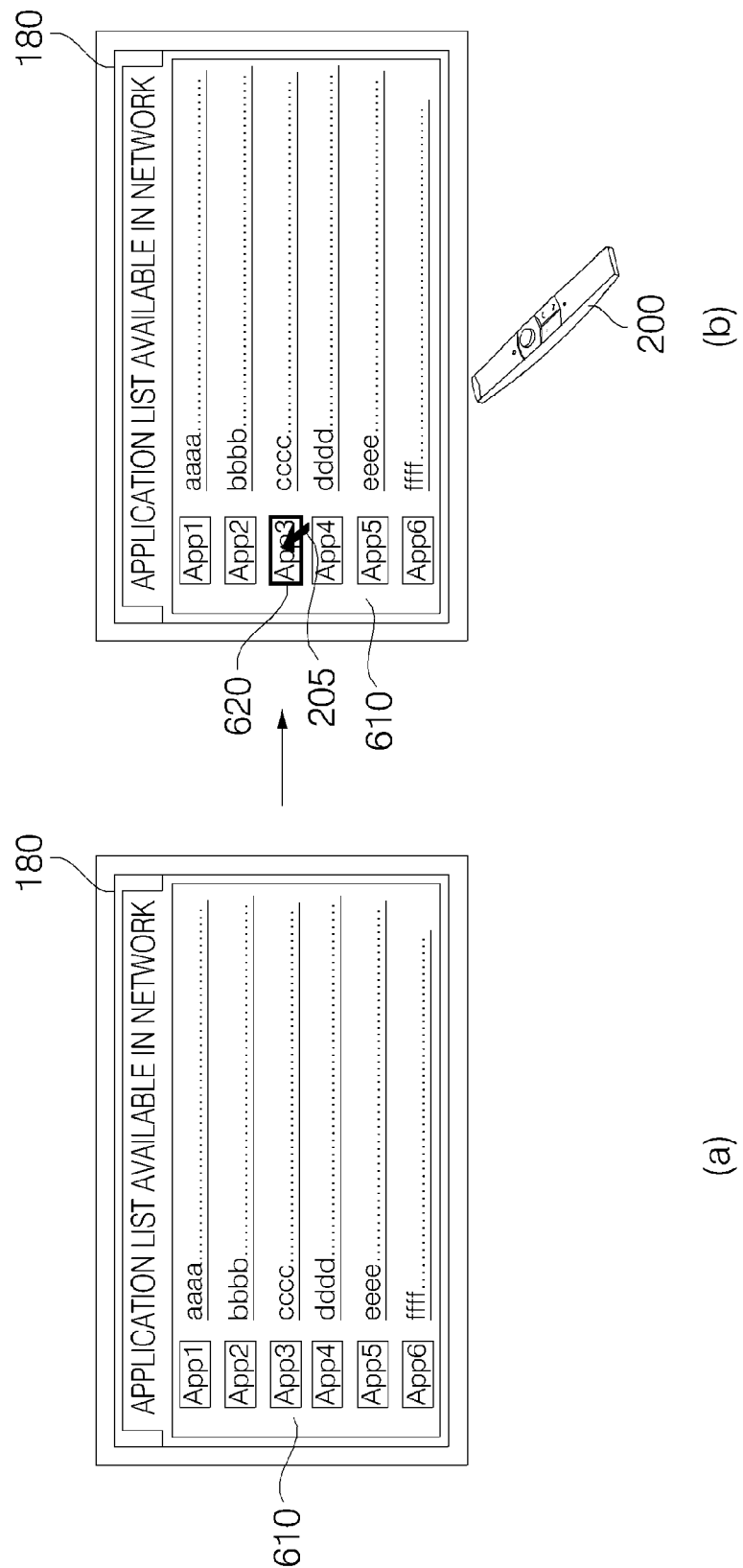
FIG. 15 illustrates a UI in either of the image display apparatuses according to an embodiment of the present invention.

Referring to FIG. 15, an application list available from a network is displayed on the display 180. A user may access a CP or an NP directly, search for various applications, and download the applications from the CP or the NP.

Specifically, FIG. 15(a) illustrates an application list 610 available in a connected server, displayed on the display 180. The application list 610 may include an icon representing each application and a brief description of the application. Because each of the image display apparatuses according to the embodiments of the present invention is capable of full browsing, the image display apparatus may enlarge the icons or descriptions of applications received from the connected server on the display 180. Accordingly, the user can readily identify applications, which will be described later.

FIG. 15(b) illustrates selection of one application 620 from the application list 610 using the pointer 205 of the remote controller 200. Thus, the selected application 620 may be easily downloaded.

Figure 16:
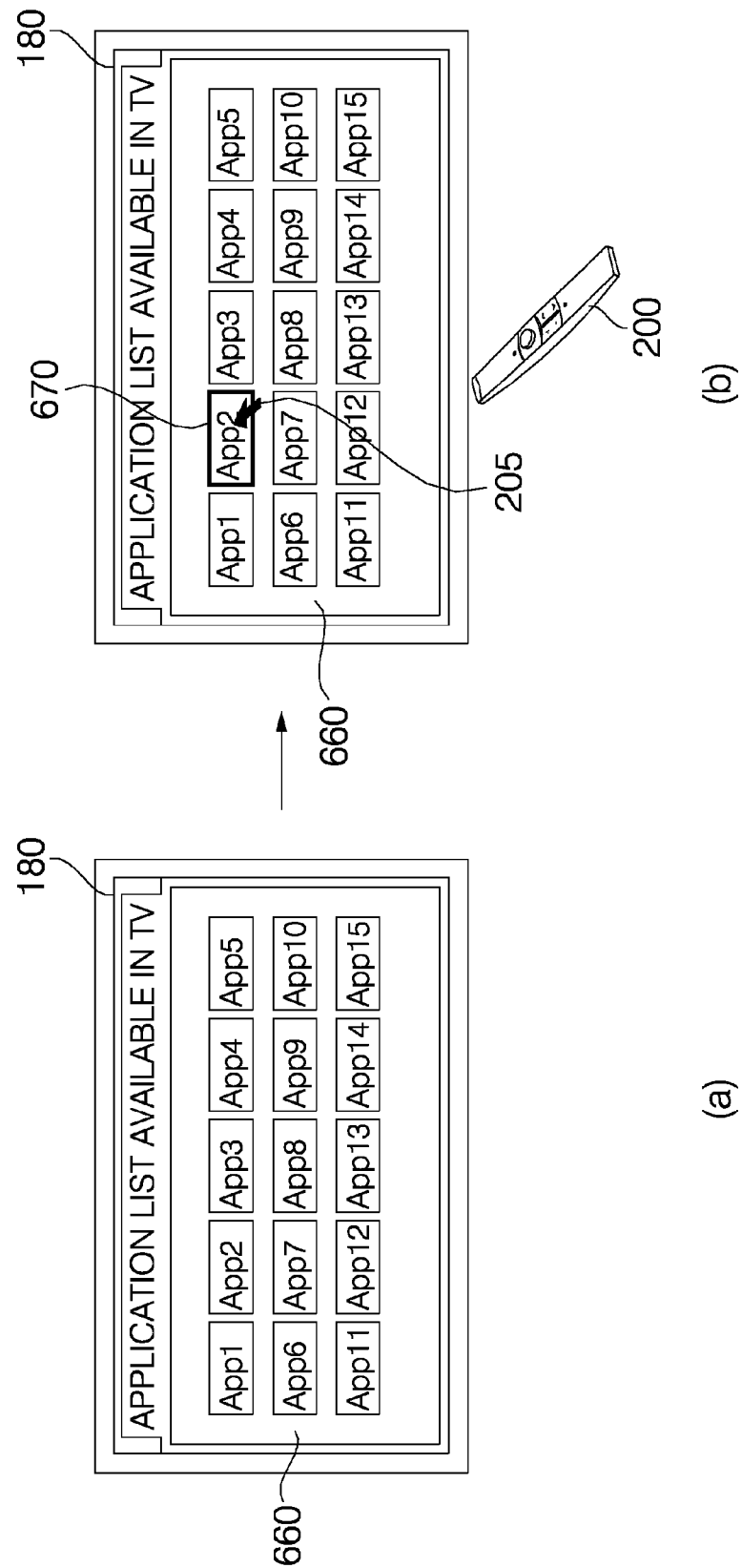
FIG. 16 illustrates a UI in either of the image display apparatuses according to another embodiment of the present invention.

FIG. 16 illustrates an application list available in the image display apparatus, displayed on the display 180. Referring to FIG. 16(a), when the user selects an application list view menu by manipulating the remote controller 200, a list of applications 660 stored in the image display apparatus is displayed on the display 180. While only icons representing the applications are shown in FIG. 16, the application list 660 may further include brief descriptions of the applications, like the application list 610 illustrated in FIG. 15. Therefore, the user can readily identify the applications.

FIG. 16(b) illustrates selection of one application 670 from the application list 660 using the pointer 205 of the remote controller 200. Thus, the selected application 670 may be easily executed.

While FIGS. 15 and 16 show that the user selects a desired application by moving the pointer 205 using the remote controller 200, the application may be selected in many other ways. For example, the user may select a specific application using a cursor displayed on the display 180 by a combined input of a local key and an OK key in the remote controller 200.

In another example, if the remote controller 200 has a touch pad, the pointer 205 moves on the display 180 according to touch input of the touch pad. Thus the user may select a specific menu using the touch-based pointer 205.

Figure 17:
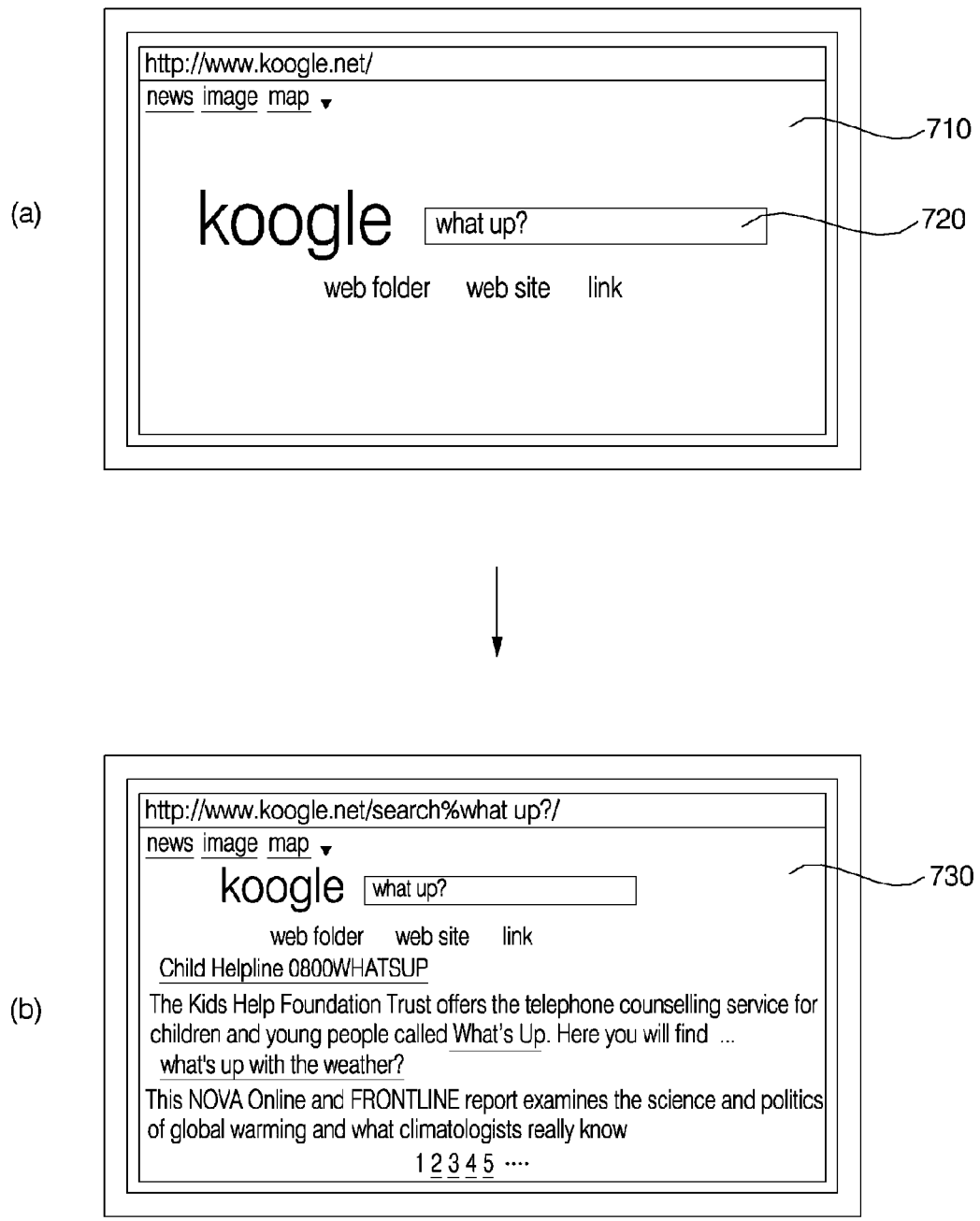
FIG. 17 illustrates a UI in either of the image display apparatuses according to another embodiment of the present invention.

FIG. 17 illustrates a Web page displayed on the display 180. Specifically, FIG. 17(a) illustrates a Web page 710 with a search window 720, displayed on the display 180. The user may enter a character into the search window 720 by use of character keys of a keypad displayed on a screen, character keys provided as local keys, or character keys of the remote controller 200.

FIG. 17(b) illustrates a search result page 730 having search results matching a keyword entered into the search window 720. Since the image display apparatuses according to the embodiments of the present invention are capable of fully browsing a Web page, the user can easily read the Web page.

Figure 18:
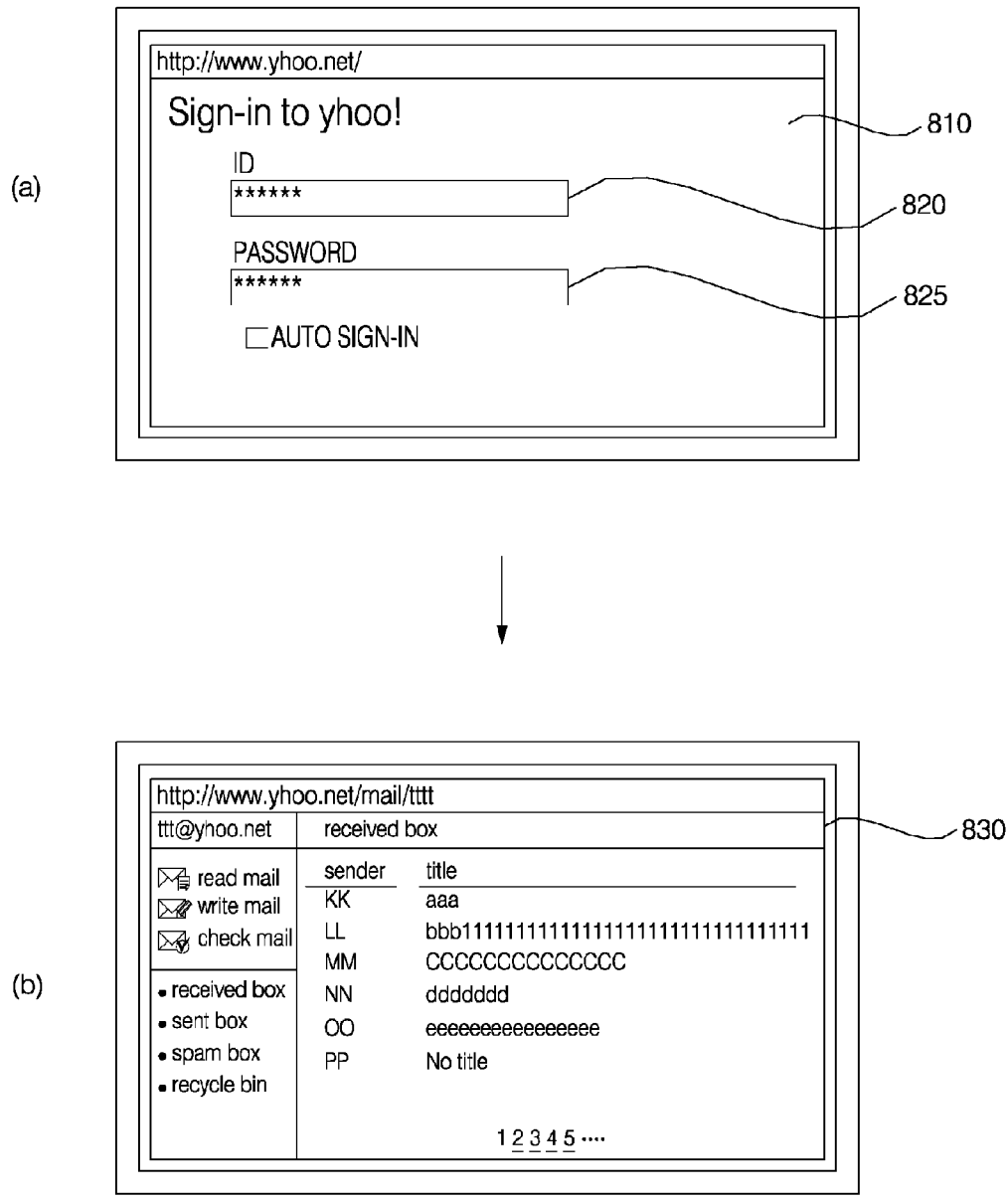
FIG. 18 illustrates a UI in either of the image display apparatuses according to a further embodiment of the present invention.

FIG. 18 illustrates another Web page displayed on the display 180. Specifically, FIG. 18(a) illustrates a mail service page 810 including an ID input window 820 and a password input window 825, displayed on the display 180. The user may enter a specific numeral and/or text into the ID input window 820 and the password input window 825 using a keypad displayed on the mail service page 810, character keys provided as local keys, or character keys of the remote controller 200. Hence, the user can log in to a mail service.

FIG. 18(b) illustrates a mail page 830 displayed on the display 180, after log-in to the mail service. For example, the mail page 830 may contains items "read mail", "write mail", "sent box", "received box", "recycle bin", etc. In the "received box" item, mail may be ordered by sender or by title.

The image display apparatuses according to the embodiments of the present invention are capable of full browsing when displaying a mail service page. Therefore, the user can use the mail service conveniently.

Figure 19:
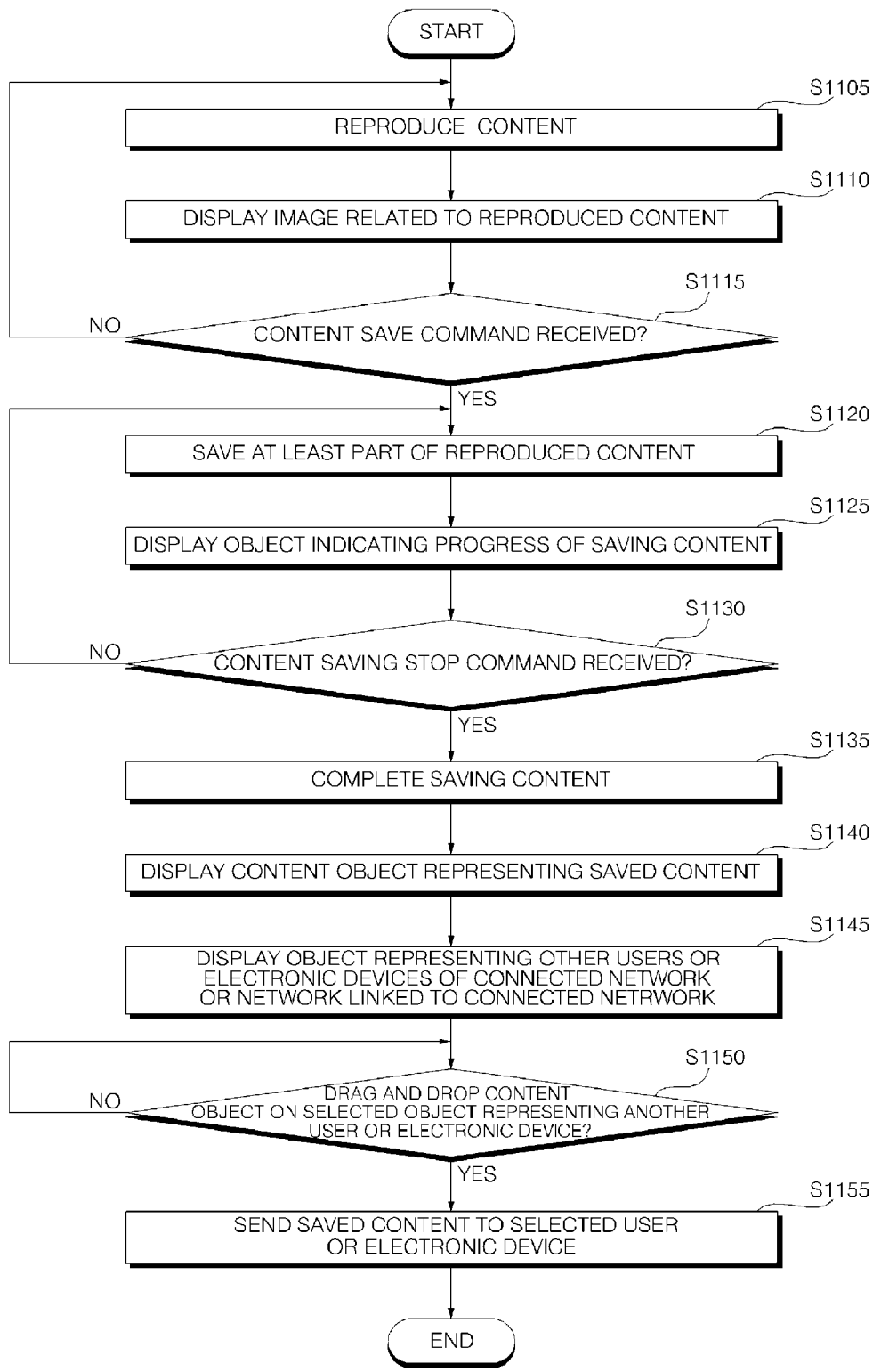
FIG. 19 is a flowchart illustrating a method for operating an image display apparatus according to an embodiment of the present invention.
Figure 20:
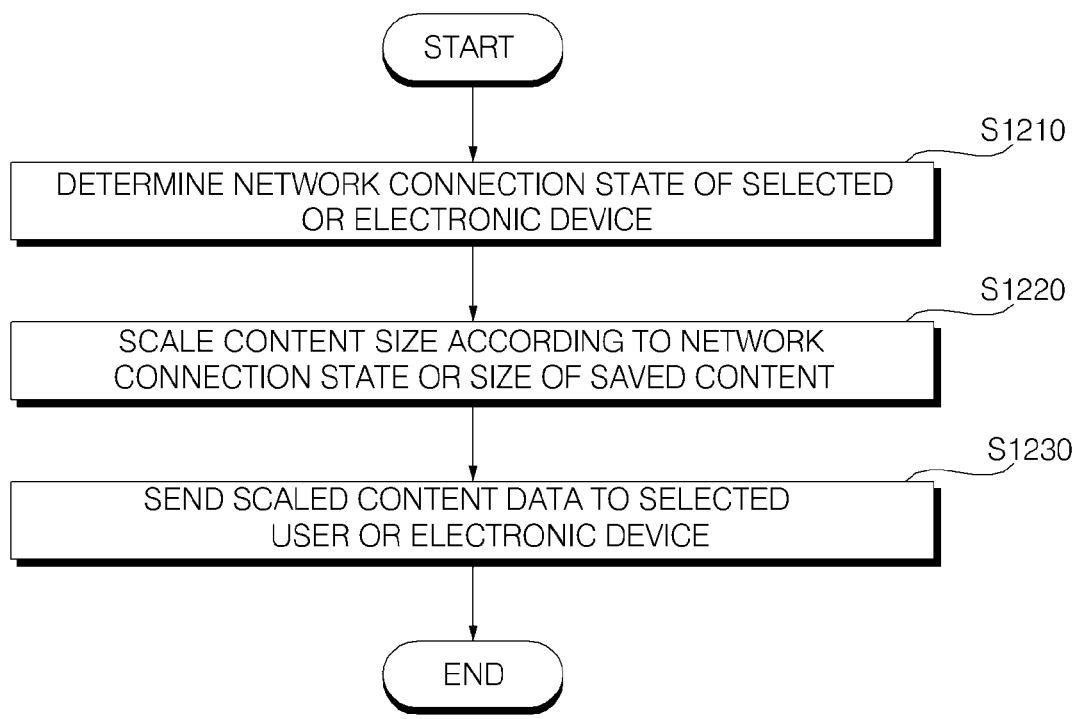
Figure 21:
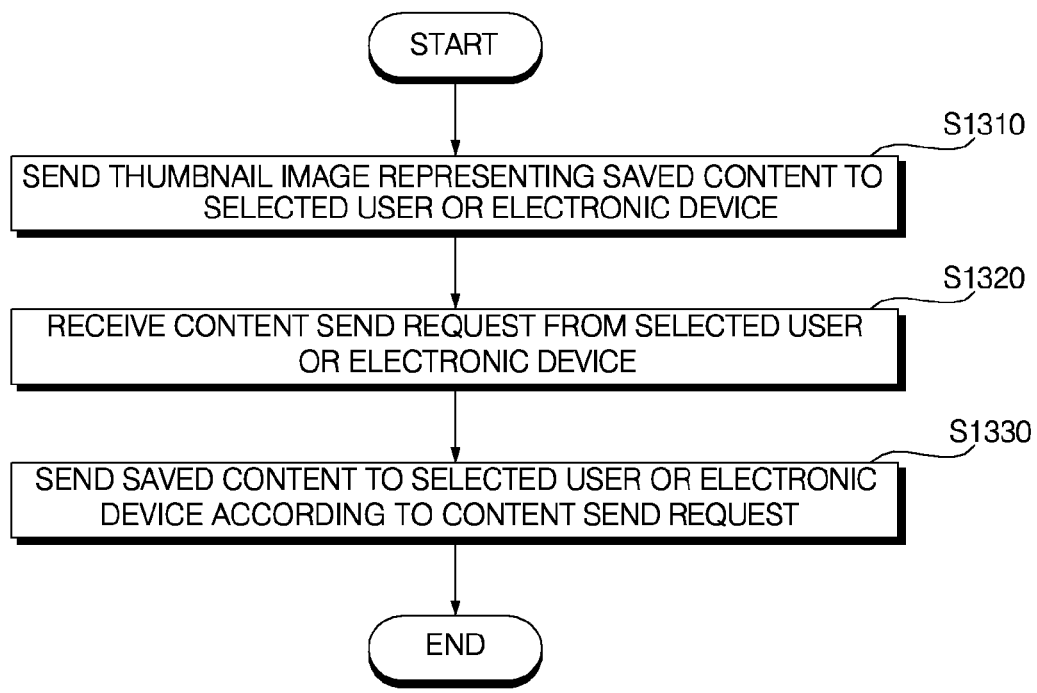

FIG. 19 is a flowchart illustrating a method for operating an image display apparatus according to an embodiment of the present invention, FIGS. 20 and 21 are detailed flowcharts illustrating a transmission step in the method of FIG. 19 according to embodiments of the present invention, and FIGS. 22 to 35 are views referred to for describing the method for operating an image display apparatus, illustrated in FIG. 19.

Referring to FIG. 19, content is reproduced (S1105).

Specifically, the controller 170 controls content reproduction. For example, upon receipt of a content playback input from the remote controller 200 or a local key, content may be played back. The content may be any of content stored in the image display apparatus 100, content received from an external device connected to the image display apparatus 100, and content received from a connected network. The content may be at least one of a broadcast image, an external input image, an audio file, a still image, a connected Web page, or a text file.

During content reproduction, an image related to the reproduced content is displayed (S1110).

Figure 22A:
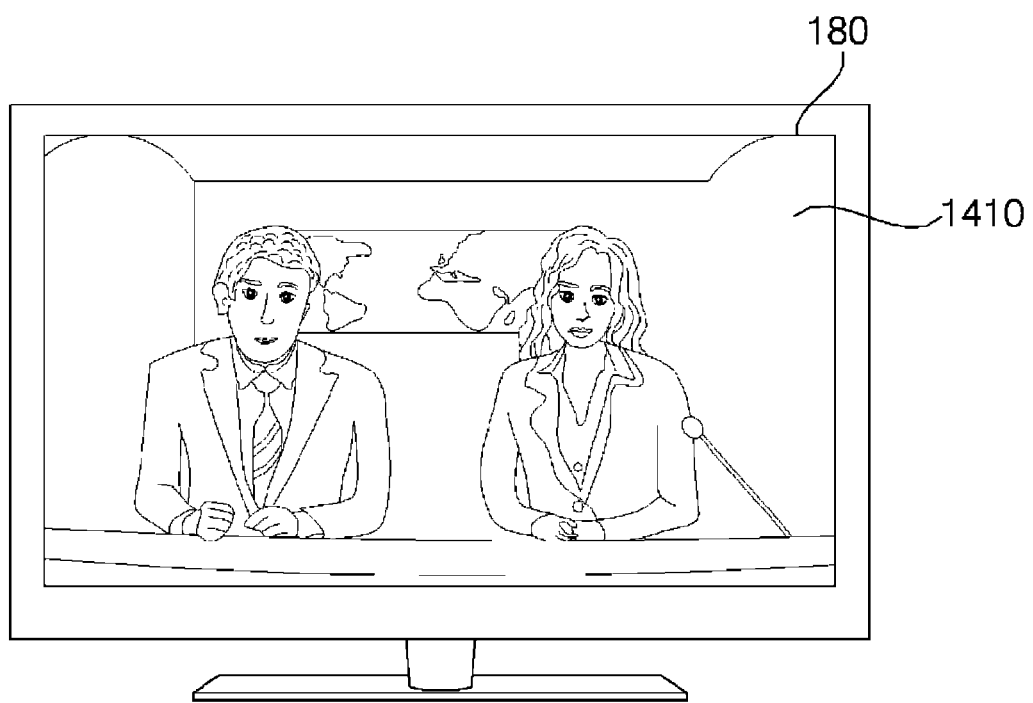
Figure 27A:
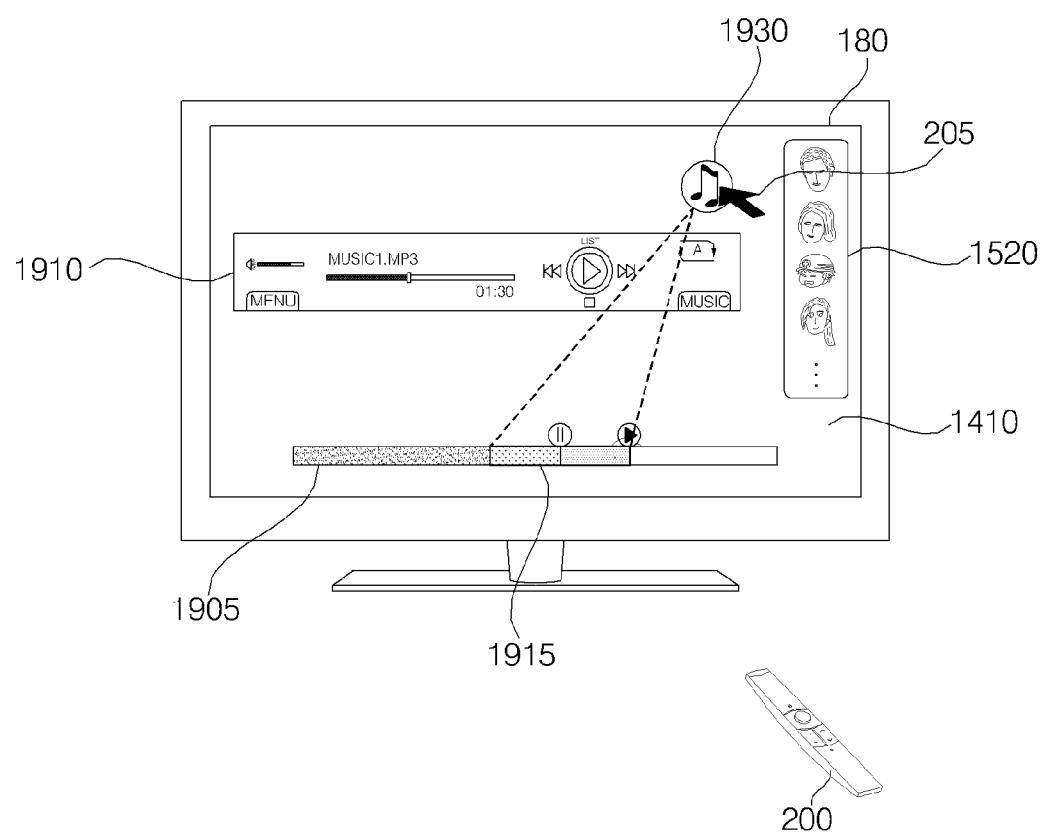
Figure 28A:
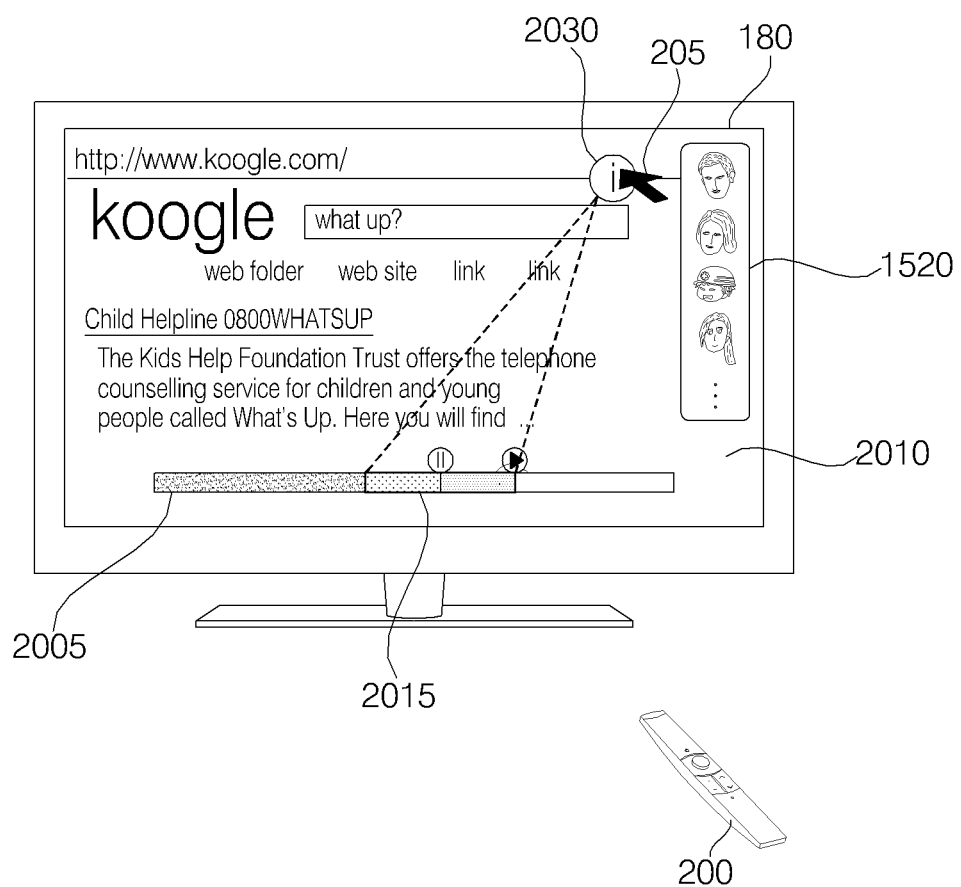
Figure 29A:
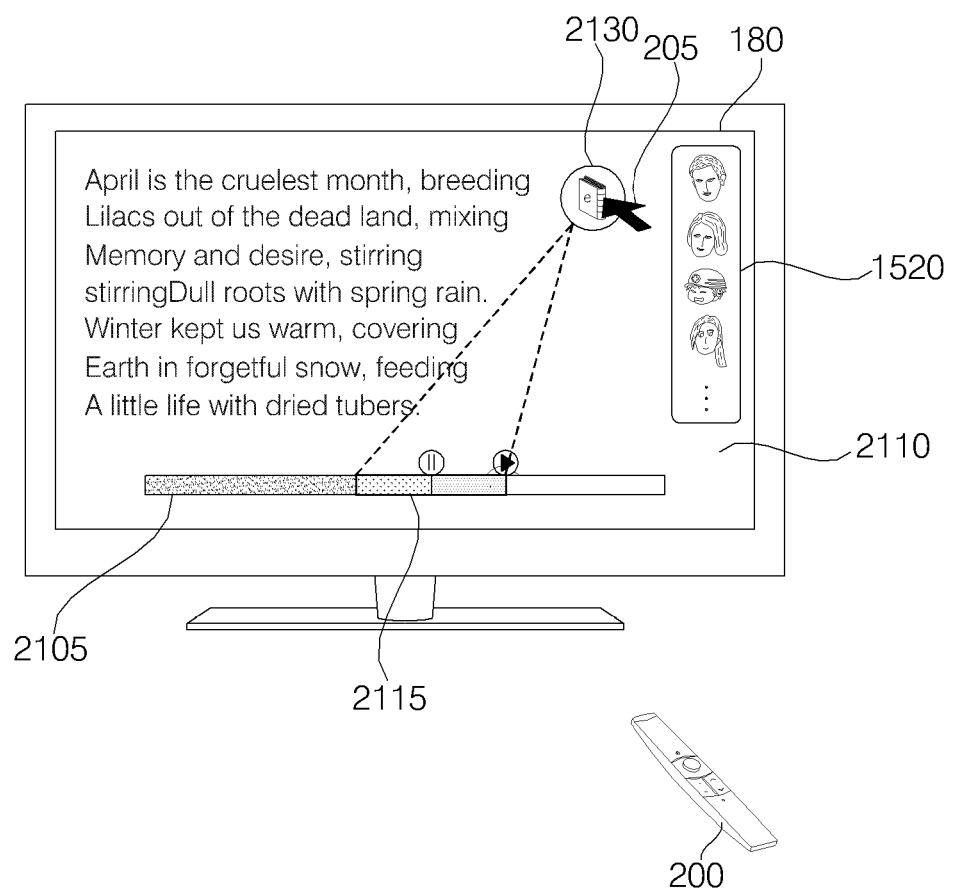

Specifically, the controller 170 controls display of an image related to the reproduced content during content reproduction. For example, if a broadcast program is airing, a broadcast image 1410 of the broadcast program is displayed on the display 180, as illustrated in FIG. 22A. If an audio file is played, a screen 1910 indicating audio playback may be displayed on the display 180, as illustrated in FIG. 27A. If the image display apparatus 100 accesses a specific Web server over a network, a screen 2010 of a Web page may be displayed on the display 180 as illustrated in FIG. 28A. If an electronic document, for example, an e-book is opened, a screen 2110 of a page of an e-book may be displayed on the display 180 as illustrated in FIG. 29A.

Whether or not a content save command has been received for the content is determined during content reproduction (S1115). Upon receipt of the content save command, at least part of the content being reproduced is stored (S1120) and an object indicating content saving in progress is displayed (S1125).

The content save command may be input by manipulating a predetermined key of the remote controller 200 or by entering a related menu and selecting a content save menu item from the menu. It is also possible to execute a content save application.

Figure 22B:
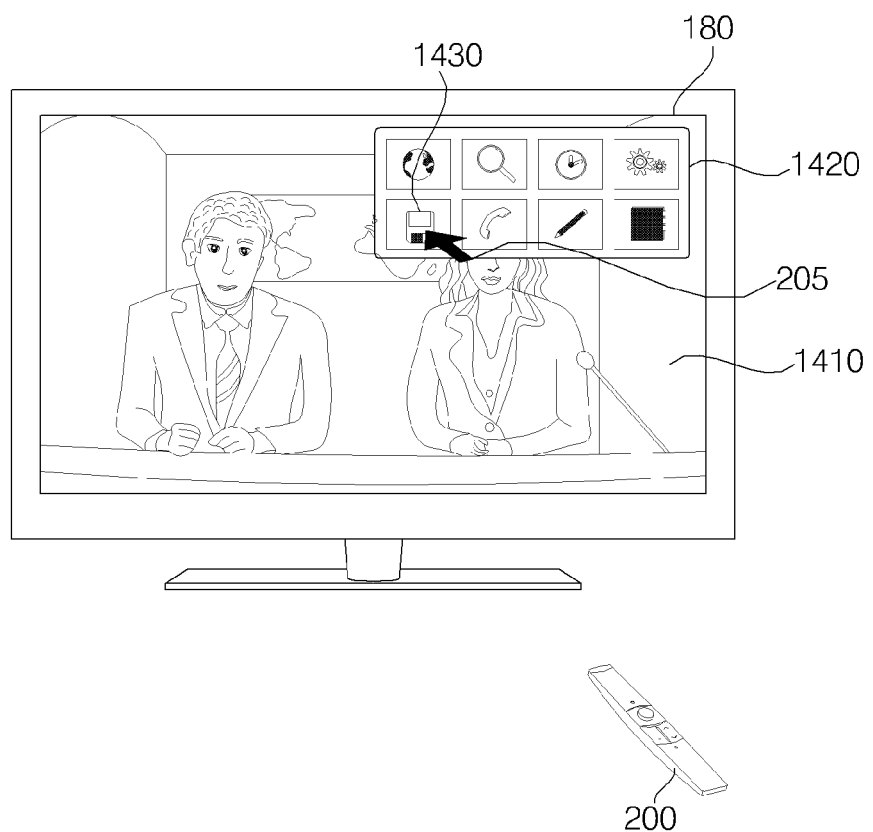

FIG. 22B illustrates exemplary display of an application menu object 1420 on the display 180. The user may select a content save application object 1430 from the application menu object 1420. In FIG. 22B, the user selects the content save application object 1430 from the application menu object 1420 using the pointer 205 of the remote controller 200, by way of example. Therefore, the user can store the content simply and rapidly during content reproduction.

In addition to the content save application object 1430, the application menu object 1420 may include objects representing Internet access, call, environment setting, text input, and watch applications.

Figure 22C:
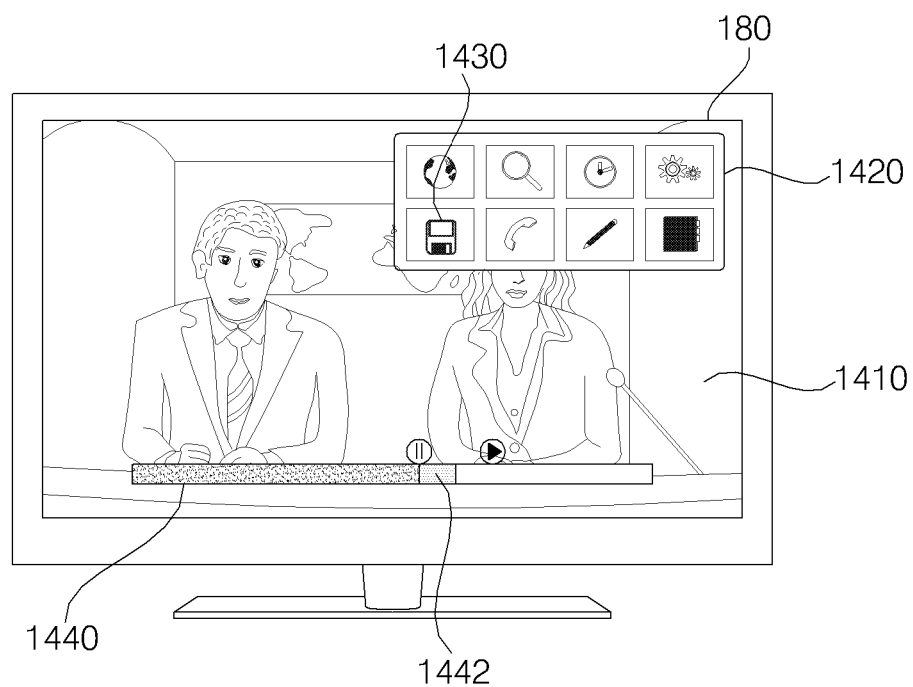

Upon selection of the content save command, at least part of the content is stored during content reproduction. In FIG. 22C, the broadcast image 1410 is being partially stored during reproduction of the broadcast image 1410, by way of example. At the same time, an object 1440 indicating that at least part of the broadcast image 1410 is being stored may be displayed on the display 180. While the object 1440 is a progressive bar in FIG. 22C, object 1440 may take any other form. In addition, an object 1442 indicating the data size of content stored so far may be displayed on the display 180, to thereby allow the user to easily notice the saving progress of the content.

Whether or not a content saving stop command has been received is determined (S1130). Upon receipt of the content saving stop command, the saving of the content is discontinued (S1135). Then an object indicating the stored content is displayed (S1140).

Specifically, the content saving stop command may be input by manipulating a predetermined key of the remote controller 200 or by entering a related menu and selecting the content save menu item from the menu. It is also possible to execute a content saving stop application.

Figure 22D:
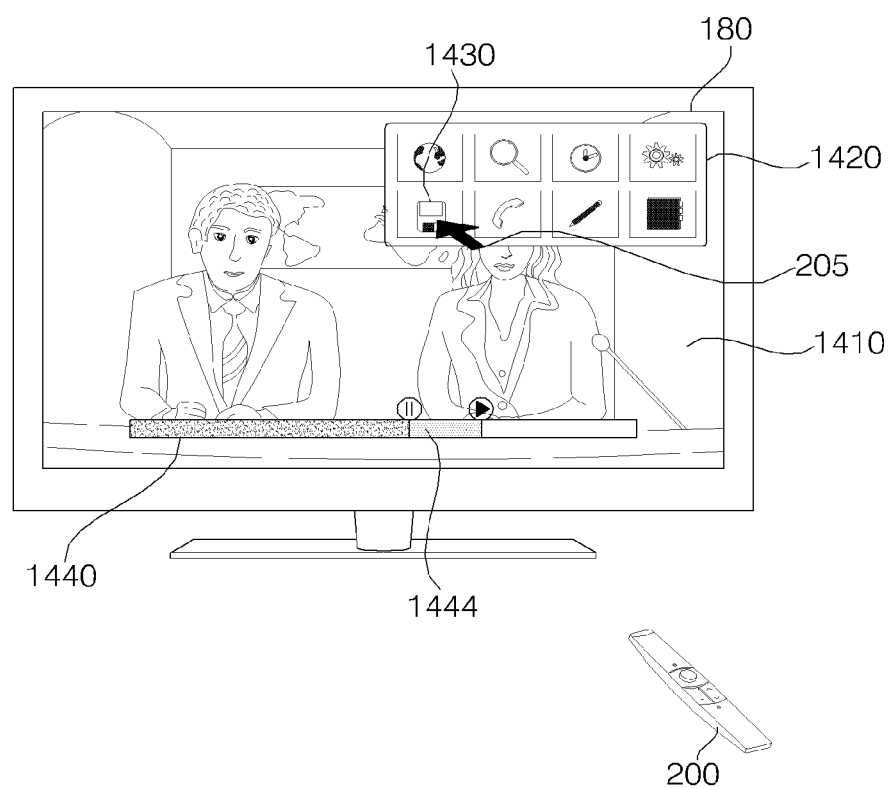

FIG. 22D illustrates exemplary re-selection of the content save application object 1430 from the application menu object 1420. Upon re-selection of the content save application object 1430, the content saving stop command may be input. In FIG. 22D, the user selects the content save application object 1430 again using the pointer 205 of the remote controller 205. Hence, the user can store the content simply and rapidly during content reproduction.

The color, brightness and/or outline of the content save application object 1430 may be changed according to the number of selections of the content save application object 1430 that the pointer 205 makes. If content is stored upon initial selection of the content save application object 1430, at least one of the color, brightness or outline of the content save application object 1430 is changed. Then if the saving of content is discontinued upon re-selection of the content save application object 1430, the content save application object 1430 may return to the original color, brightness or outline. In this manner, the user can determine from the content save application object 1430 whether content is being stored.

In FIG. 22D, upon completion of the content saving, the object 1444 indicating the data size of content stored from the time of receiving the content save command to the time of receiving the content saving stop command is displayed, by way of example. Thus the user is easily aware of the data size of the stored content.

Figure 23A:
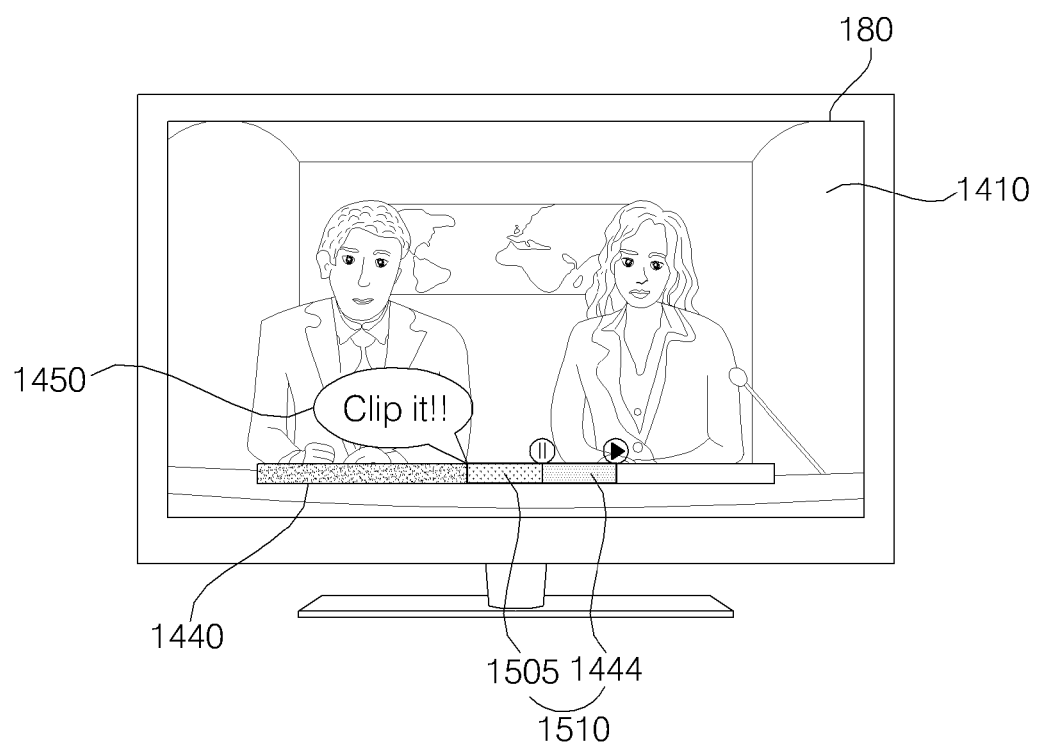

Referring to FIG. 23A, an object 1450 ("Clip it") indicating completion of content saving is displayed, by way of example. The object 1440 indicating that at least part of the broadcast image 1410 has been stored may be displayed. Particularly, an object 1510 representing the stored content may be displayed. The object 1510 may include the object 1444 indicating the data size of content stored from the time of receiving the content save command to the time of completion of the content saving and an object 1505 indicating that a predetermined previous time of content has been stored before the content save commend is received. This is an automatic save function for storing a predetermined previous time of content before a content save command is issued, for the case where a user might miss a desired save time. The automatic save function is optional.

An object is displayed (S1145), with the object indicating other users or electronic devices of a connected network or another network linked to the connected network.

Specifically, the controller 170 controls display of an object representing other users or electronic devices of a connected network or another network linked to the connected network on the display 180. Especially, an object representing pre-registered users or electronic devices may be displayed.

Figure 23B:
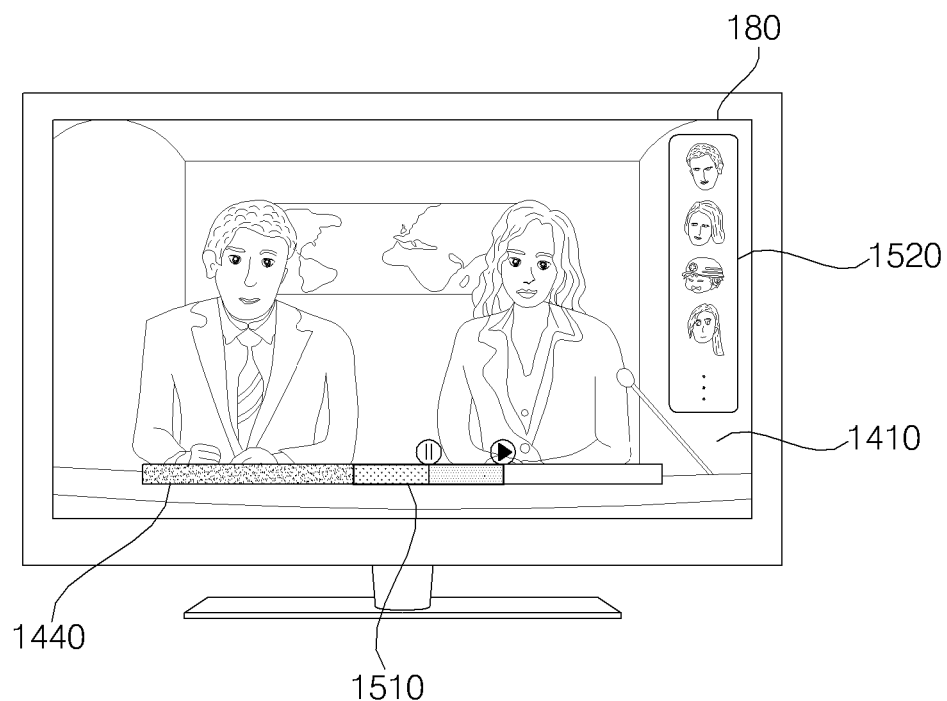

FIG. 23B illustrates exemplary display of an object 1520 representing users connected to a network. The object 1520 may include at least one of an icon, nickname or name of each user. Therefore, the user can identify the network connection state of each user.

Whether or not the content object has been dragged and then dropped on a selected object representing another user or electronic device is determined (S1150). Upon detection of the drag and drop operation, the stored content is transmitted to the selected user or electronic device (S1155).

More specifically, the controller 170 may control transmission of the stored content to a user or electronic device selected from among the users or electronic devices connected to the network. The user or electronic device may be selected in various manners according to user input. Herein, a drag and drop operation is given as an example of the user input.

Figure 23C:
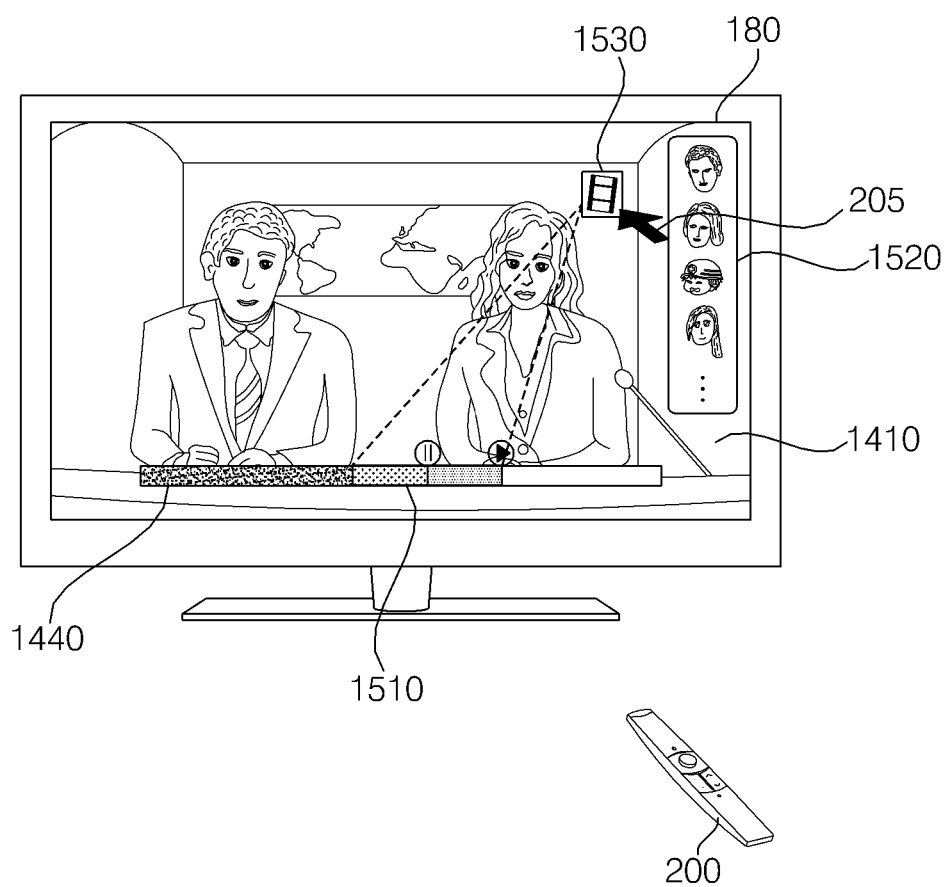

FIG. 23C illustrates an exemplary drag of the object 1510 representing the stored content from the object 1440 indicating saving of at least part of the broadcast image 1410, using the pointer 205 of the remote controller 200. When the object 1510 is dragged, a new object 1530 representing the stored content may appear on the display 180. In FIG. 23C, since the stored content is a broadcast image, the object 1530 represents an image.

Figure 23D:
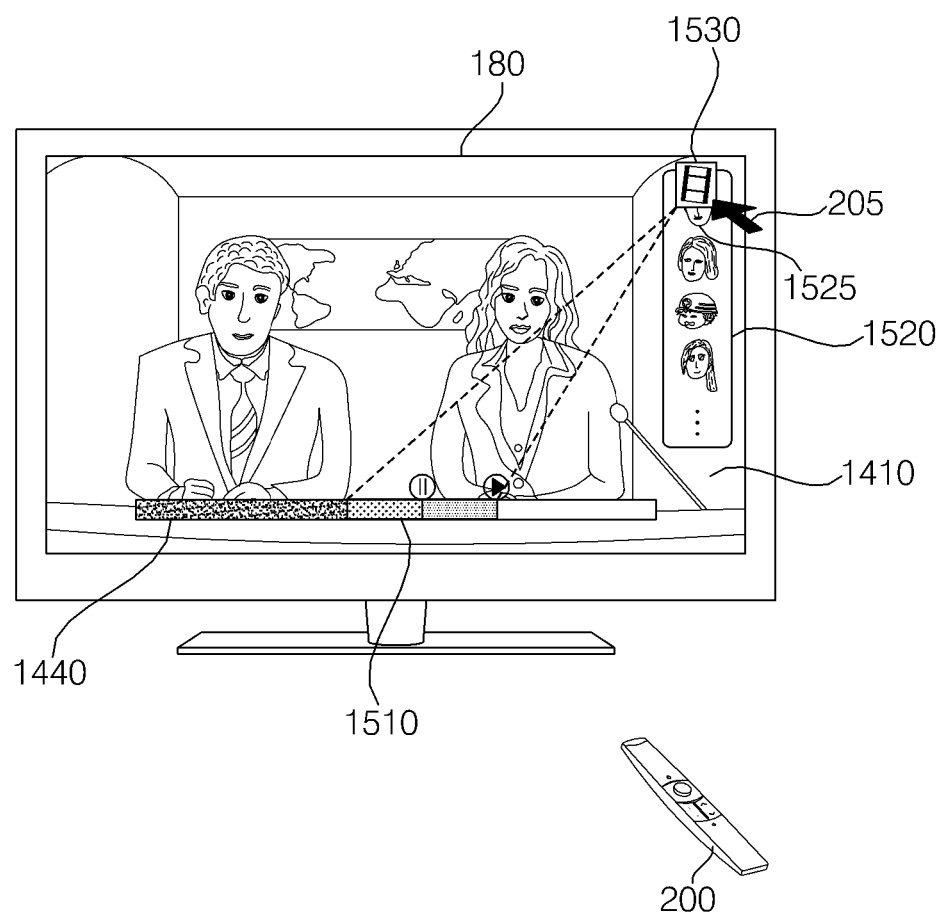

Referring to FIG. 23D, upon dropping of the object 1530 on an object 1525 representing a user connected to the network within the object 1520, the specific user is selected from among other users and the stored content is transmitted to the selected user or an electronic device of the selected user.

Figure 23E:
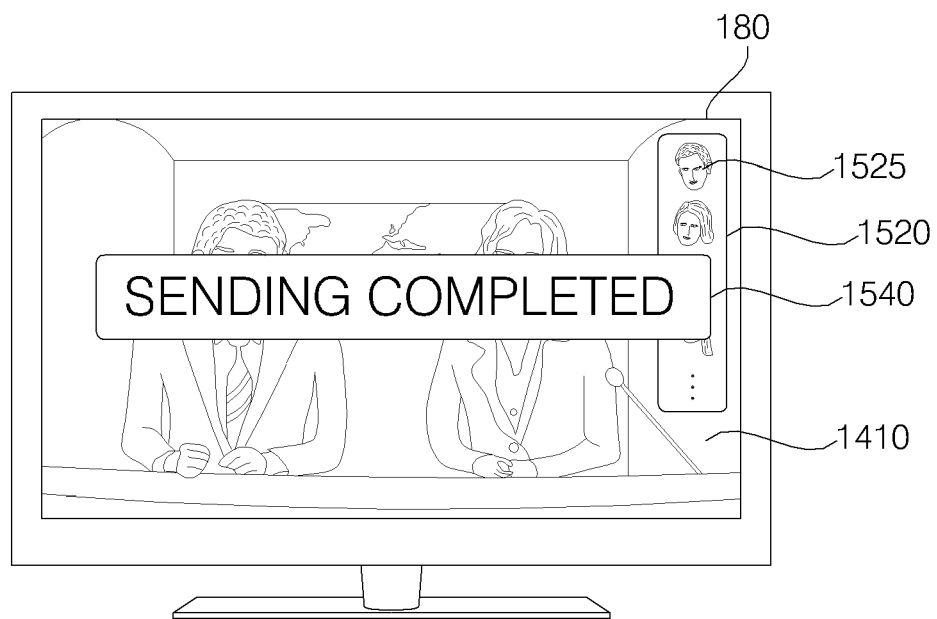

Referring to FIG. 23E, upon completion of transmission of the stored content, an object 1540 indicating completion of content transmission is displayed on the display 180. The user can easily notice from the object 1540 that the stored content has been completely transmitted.

The afore-described transmission step S1155 may be performed in various manners.

FIG. 20 is a detailed flowchart illustrating the transmission step S1155 in the method illustrated in FIG. 19 according to an embodiment of the present invention.

Referring to FIG. 20, the network connection state of the selected user or electronic device is determined (S1210).

Specifically, the controller 170 may determine the network connection state of a user or electronic device. For instance, the controller 170 may transmit specific data to the user or electronic device connected to the network and receive the transmitted data from the user or electronic device, thereby determining the network connection state of the user or electronic device.

Figure 24A:
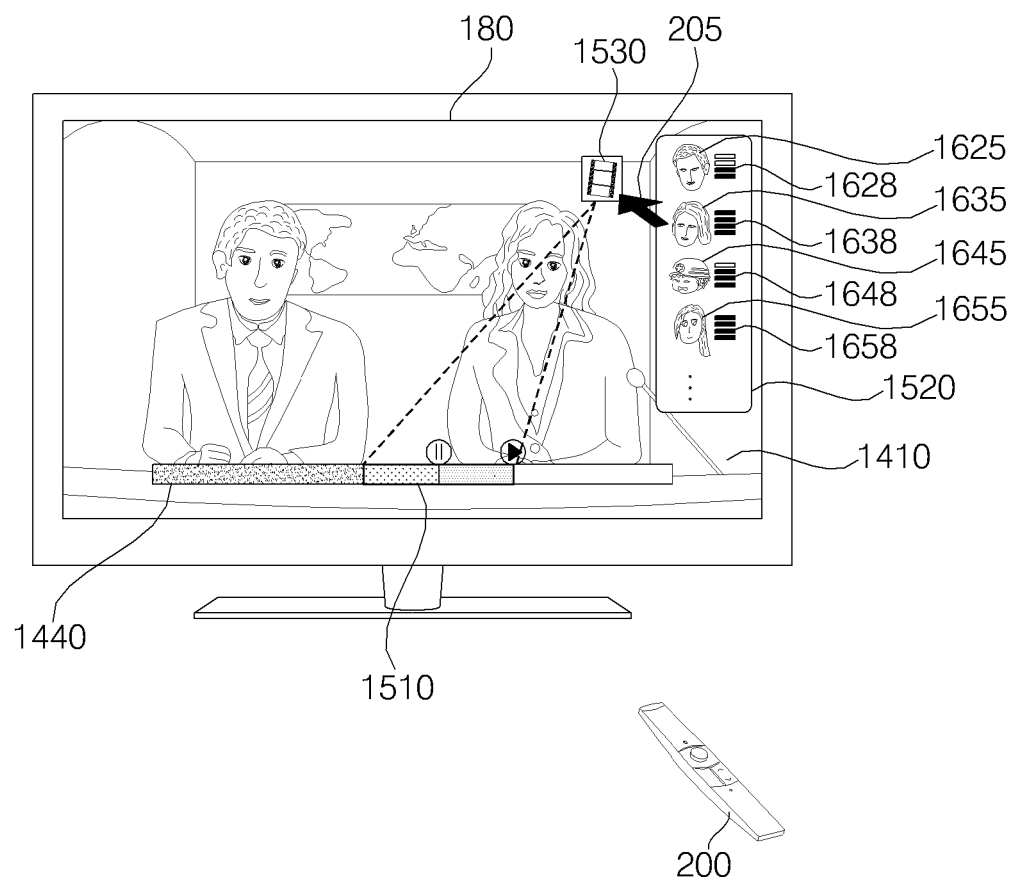

FIG. 24A illustrates the object 1520 representing users connected to the network. Especially, the object 1520 may be configured so as to provide information about the network connection states of the users.

Referring to FIG. 24A, the object 1520 may contain user objects 1625, 1635, 1645 and 1655 each representing a user connected to the network and network connection state information 1628, 1638, 1648 and 1658 for the user objects 1625, 1635, 1645 and 1655, respectively. The network connection state information 1628, 1638, 1648 and 1658 tells that a second user represented by the user object 1635 and a fourth user represented by the user object 1655 are in the best connection state, whereas a first user represented by the user object 1625 is in the poorest connection state. The network connection state information 1628, 1638, 1648 and 1658 may be configured in different fashions from in FIG. 24A.

The size of the content to be transmitted is changed according to the determined network connection state or the size of the stored content (S1220) and the scaled content is transmitted to the selected user or electronic device (S1230).

Specifically, the controller 170 may scale the content to be transmitted according to the determined network connection state of the selected user or electronic device or the size of the stored content. For instance, if the network connection state is poor or the size of the stored content is too great, the size of the content to be transmitted may be reduced.

In case of an image, the data size of the image may be increased or decreased by changing the resolution, video coding scheme, and/or saved content length of the image. In case of audio data, the amount of the audio data may be increased or decreased by changing the audio quality of the audio data.

Figure 24B:
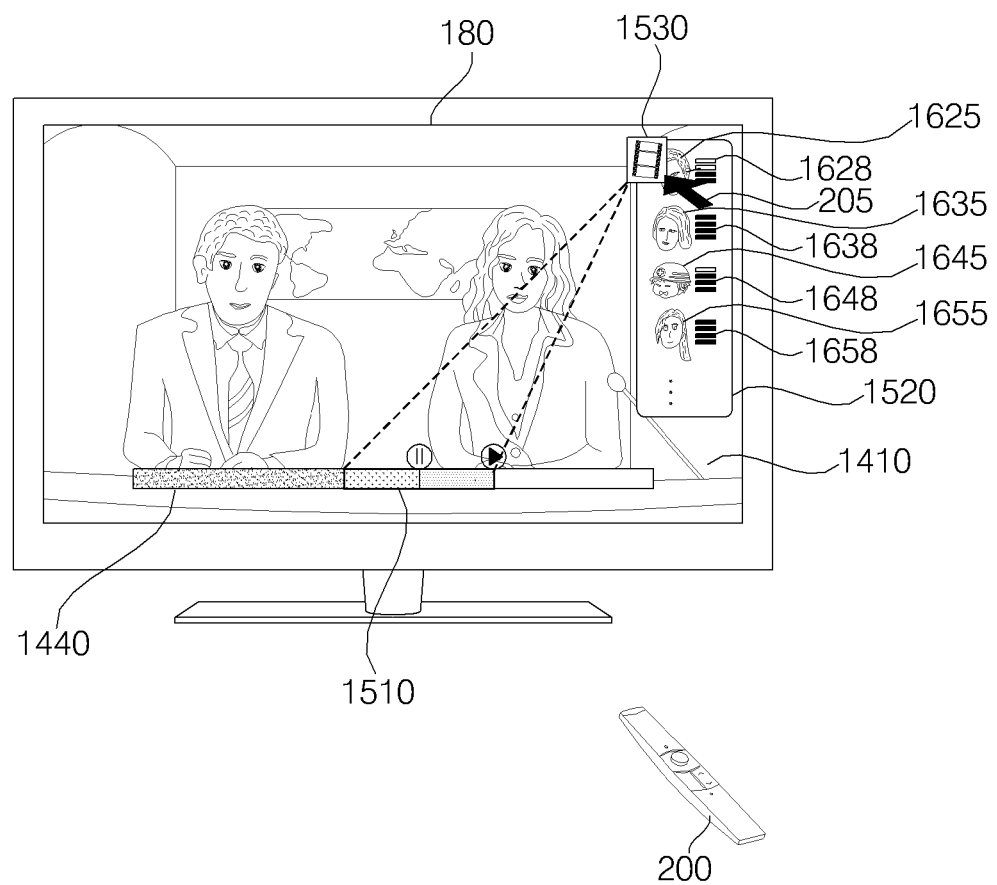

Like FIG. 23D, FIG. 24B illustrates an exemplary operation of dropping the object 1530 on the user object 1625 in the object 1520 representing users connected to the network using the pointer 205 of the remote controller 200. The object 1520 includes the user objects 1625, 1635, 1645 and 1655 and the network connection state information 1628, 1638, 1648 and 1658, as described before.

Figure 24C:
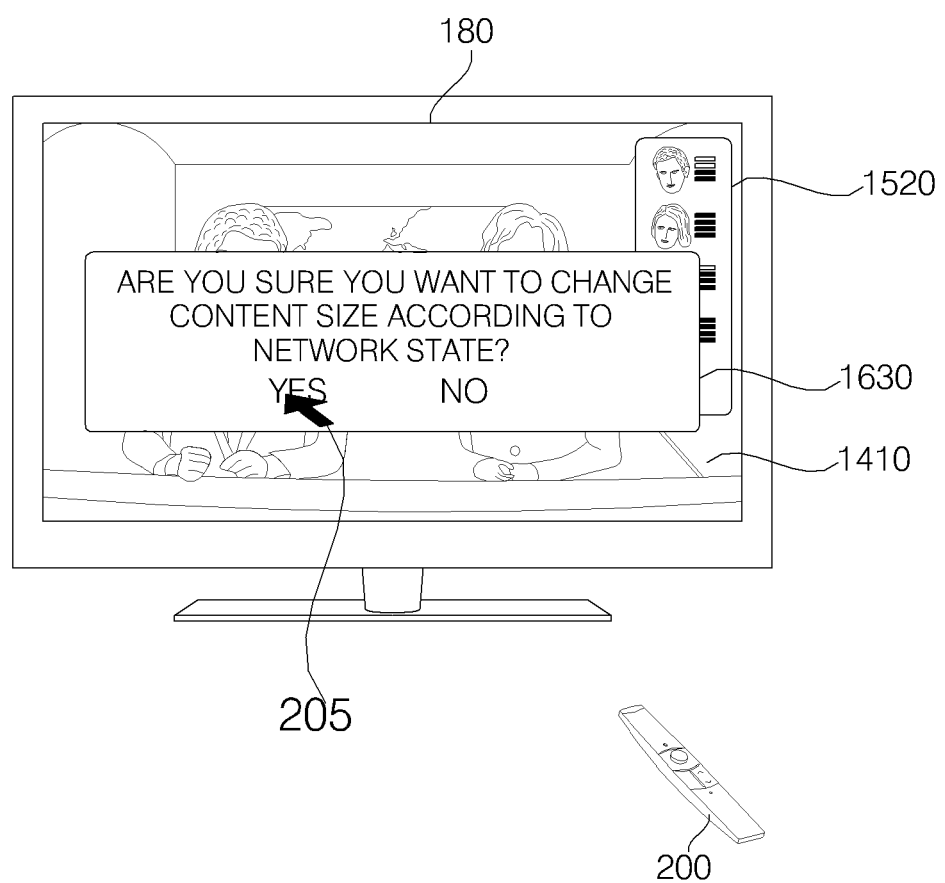

Referring to FIG. 24C, upon selection of the first user represented by the user object 1625 in the poorest network connection state, the controller 170 may display an object 1630 asking whether to change the size of the content to be transmitted according to the network connection state on the display 180.

If the user selects to change the data size using the pointer 205 of the remote controller 200, the content may be scaled down and then transmitted to the selected user or electronic device. Accordingly, the content data can be transmitted efficiently.

Figure 24D:
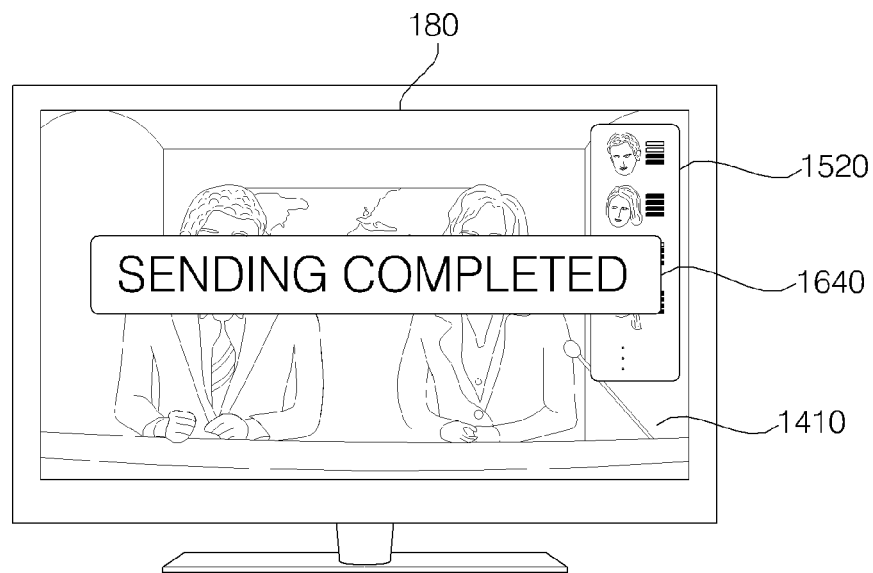

FIG. 24D illustrates exemplary display of an object 1640 indicating completion of content transmission. Hence, the user can easily notice the completion of content transmission.

As another embodiment of the present invention, the content may be scaled automatically according to the network connection state of a selected user or electronic device, prior to transmission, without user interaction.

FIG. 21 is a detailed flowchart illustrating the transmission step S1155 in the method of FIG. 19 according to another embodiment of the present invention.

Referring to FIG. 21, the controller 170 generates a thumbnail image for the stored content. For instance, the thumbnail image may be created by extracting some of the video frames of the stored content and scaling (e.g. scaling down) the extracted video frames. One or more thumbnail images may be generated for the stored content. For example, a plurality of thumbnail images may be extracted from video frames in different parts of the stored content.

The thumbnail image is transmitted to the selected user or electronic device (S1310).

Figure 26:
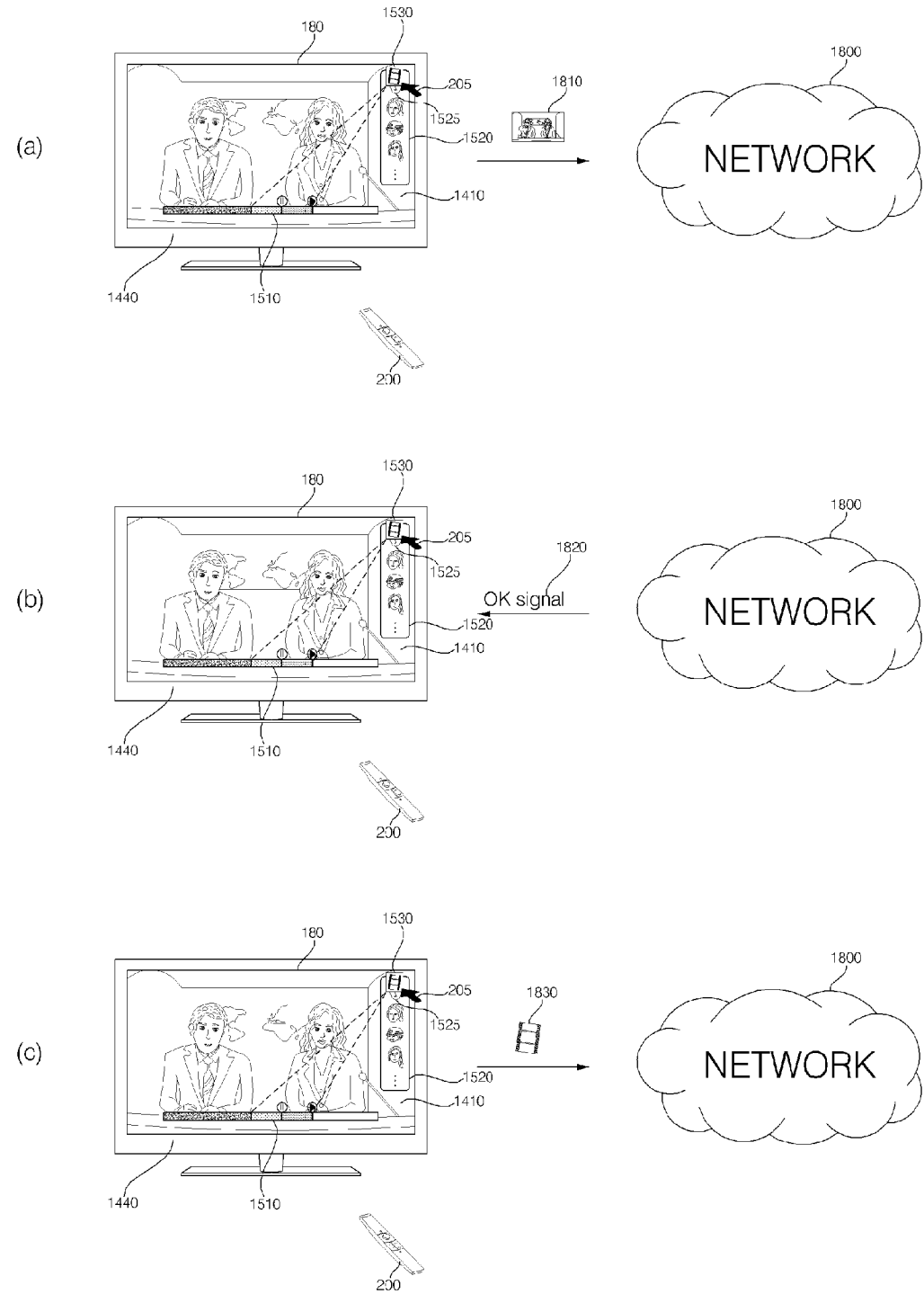

FIG. 26(*a*) illustrates an exemplary operation of dropping the object 1530 on the object 1525 representing a user connected to the network in the object 1520. Upon detection of the drop, a thumbnail image 1810 of the content to be transmitted is transmitted to the selected user or the electronic device of the selected user over a network 1800.

Then a content send request for the content is received from the selected user or electronic device (S1320).

More specifically, the controller 170 receives a content send request signal 1820 from the selected user or the electronic device of the selected user over the network 1800 as illustrated in FIG. 26(*b*). While the content send request signal is an 'OK signal' in FIG. 26(*b*), this is purely exemplary.

The stored content is transmitted to the selected user or electronic device in response to the content send request (S1330).

More specifically, after receiving the content send request signal 1820, the controller 170 eventually transmits the content to the selected user or the electronic device of the selected user over the network 1800. In this manner, the content can be transmitted according to the intention of the other party.

Apart from storing content during content reproduction and then transmitting the stored content to another user or electronic device over a network, content selected from a pre-stored content list may be transmitted to another user or electronic device.

Figure 25A:
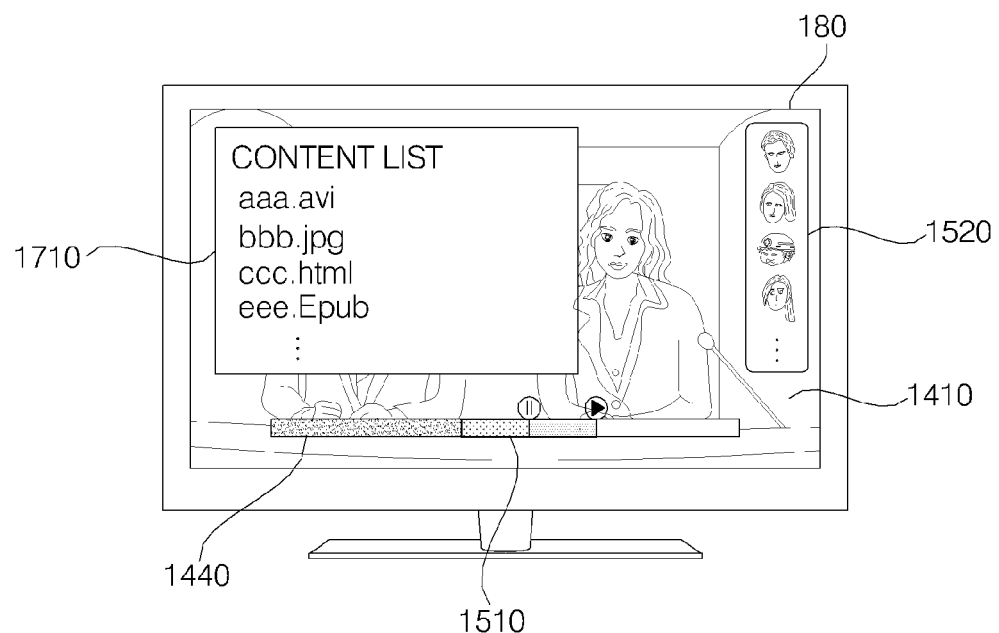

FIG. 25A illustrates exemplary display of a content list 1710, while the broadcast image 1410 is displayed and the objects 1440 and 1510 appear along with saving of part of the broadcast image 1410 on the display 180. Upon receipt of a content list display command from the user, the content list 1710 may be displayed.

The content list 1710 may include a video file (having an 'avi' extension), a still image file (having a 'jpg' extension), a Web text file (having an 'html' extension), and an e-book file (having an 'Epub' extension). The content list 1710 may list content available in an external device connected to the image display apparatus 100 or content available in a specific network linked to the connected network.

The object 1520 representing users connected to the network may further be displayed on the display 180.

Figure 25B:
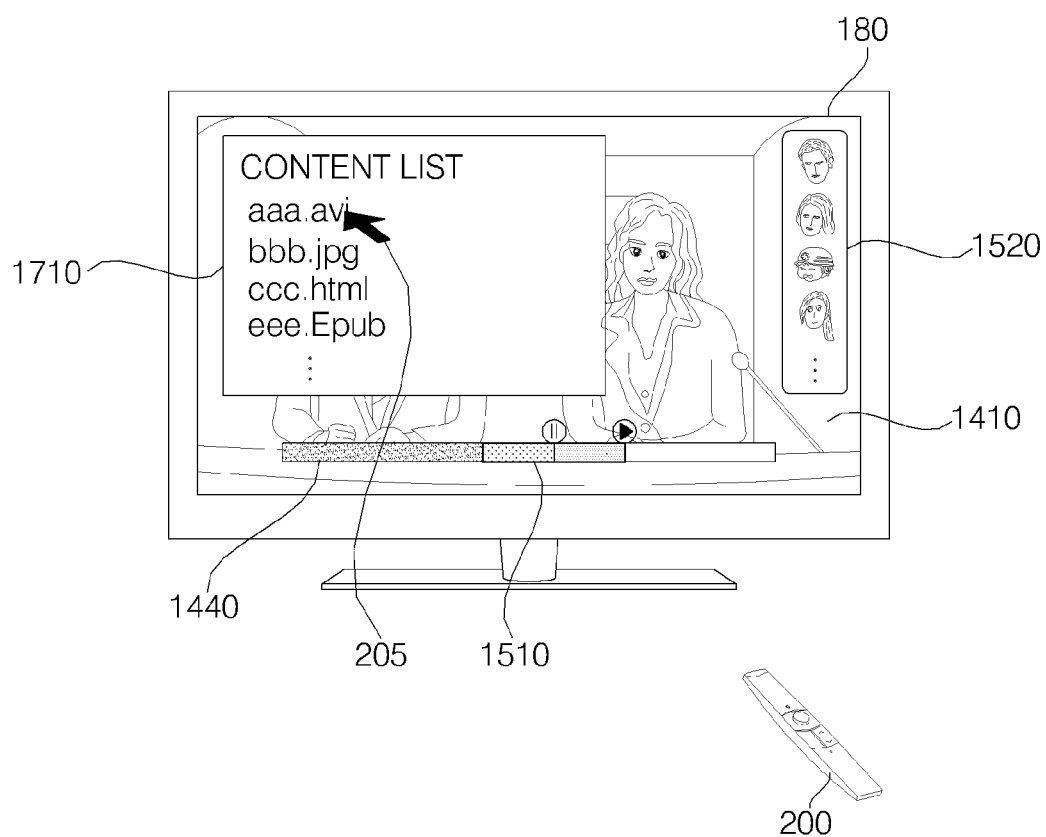

Referring to FIG. 25B, the user may select specific content from the content list 1710 using the pointer 205 of the remote controller 200.

Figure 25C:
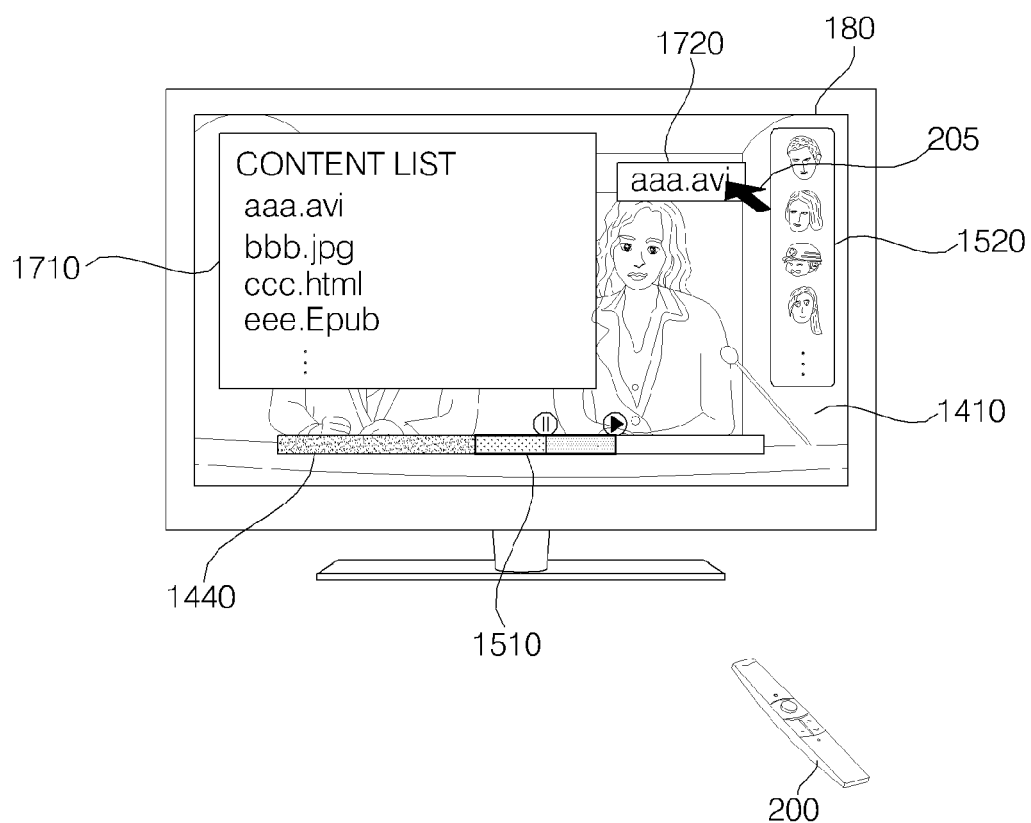

FIG. 25C illustrates an exemplary operation of dragging the selected content using the pointer 205 of the remote controller 200. During the drag, a new object 1720 representing the selected content may appear. While the object 1720 represents a file name in FIG. 25C, many other configurations are possible according to file type.

Figure 25D:
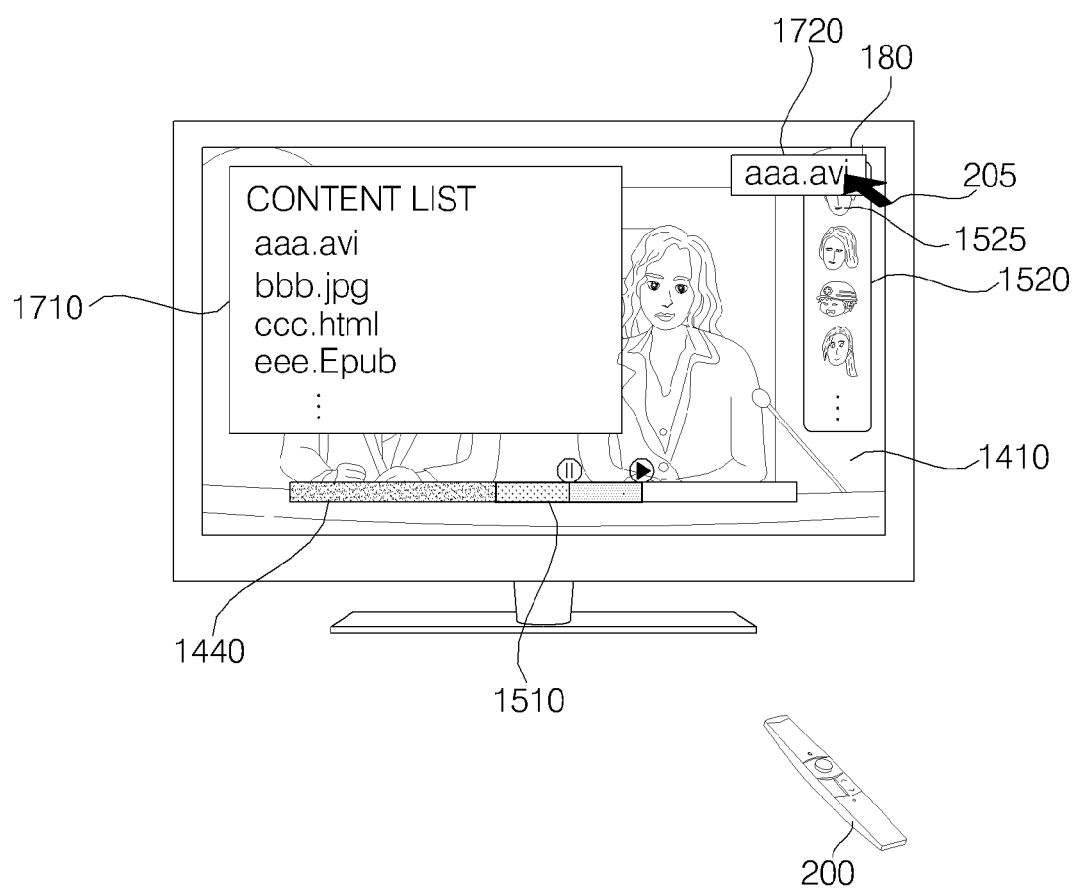

FIG. 25D illustrates an exemplary operation of dropping the object 1720 on the user object 1525 in the object 1520 using the pointer 205 of the remote controller 200. The specific user represented by the user object 1525 can be selected by the drop of the object 1720 and thus the selected content (aaa.avi) is transmitted to the selected user or the electronic device of the selected user.

Figure 25E:
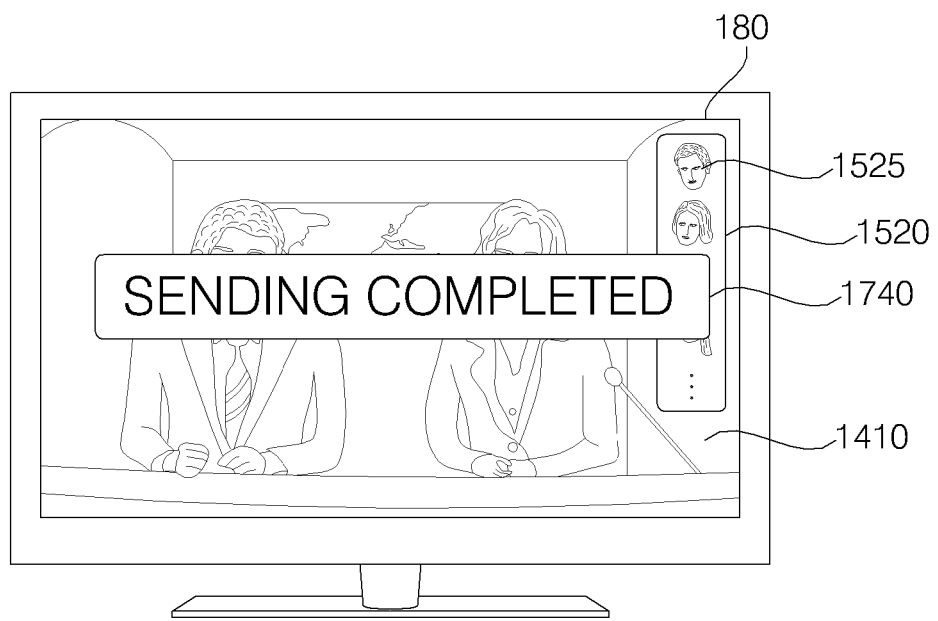

FIG. 25E illustrates exemplary display of an object 1740 indicating completion of transmission of the selected content (aaa.avi). Thus, the user can easily be aware of transmission completion.

In the case where content selected from a content list is transmitted to another user, the data size of the content may be changed according to the network connection state of the user in the same manner as in FIG. 24.

The transmitted content may be any of many other types of content as well as a video such as a broadcast video. For instance, during playback of an audio file, a Web document, or an e-book, the audio file, Web document or e-book may be partially stored and then transmitted to a connected user or electronic device over a network. Now a description will be given of storing and transmitting an audio file, a Web document, and an e-book, during playback.

FIG. 27A illustrates an example in which an audio file is played back and the screen 1910 indicating audio playback is displayed on the display 180. As described before, an object 1905 indicating partial saving of the audio file during audio playback may be displayed. Particularly, an object 1915 representing the stored audio data may be displayed. The object 1915 may include an object indicating the amount of audio data stored from the time of receiving a content save command to the time of receiving a content saving stop command and an object indicating saving of audio data already played a predetermined time before the content save command. This is an automatic save function for storing a predetermined previous time of content before a content save command is issued, for the case where the user might miss a desired save time. The automatic save function is optional.

Referring to FIG. 27A, the object 1520 representing users connected to the network may further be displayed on the display 180.

The user may drag the object 1915 representing the stored audio data using the pointer 205 of the remote controller 200. During the drag, a new object 1930 representing the stored audio data may be additionally displayed on the display 180. While the object 1930 represents a musical note to indicate the stored audio data in FIG. 27A, many other object configurations can be considered.

Figure 27B:
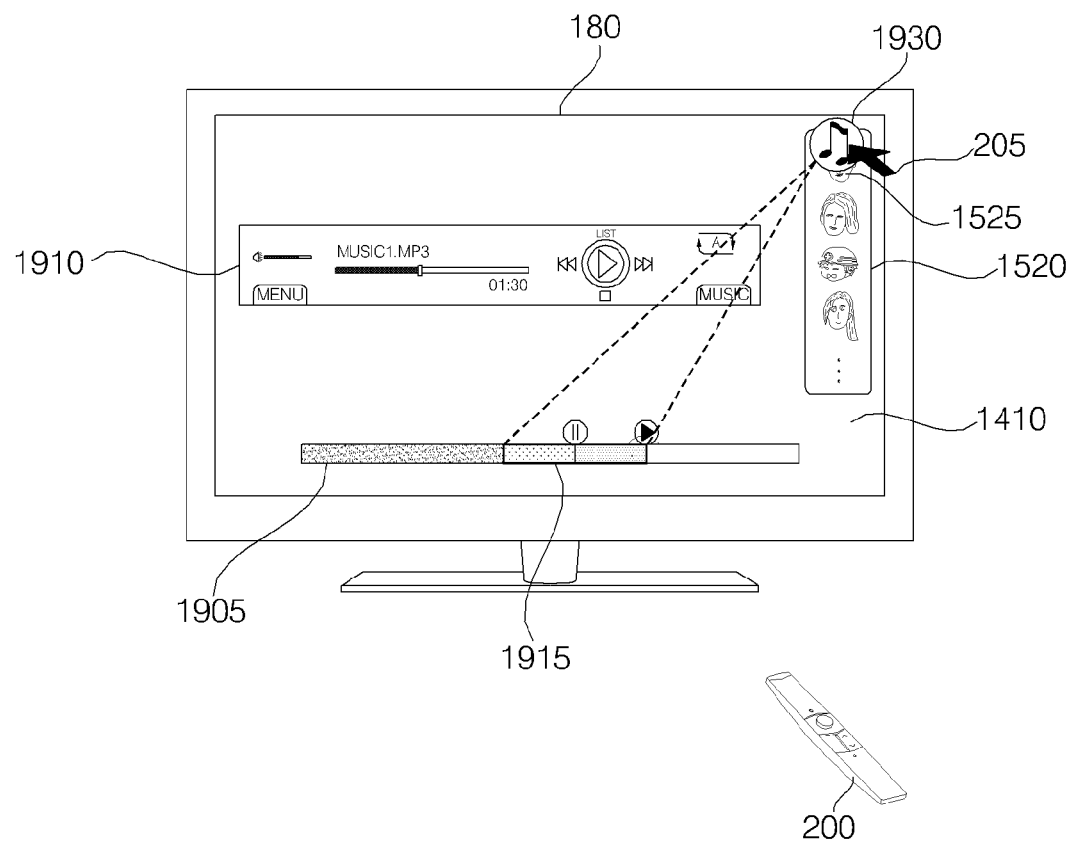

FIG. 27B illustrates an exemplary operation of dropping the object 1930 on the user object 1525 in the object 1520. Thus the specific user represented by the user object 1525 is selected from among other users connected to the network and the stored audio data is transmitted to the selected user or the electronic device of the selected user.

Figure 28B:
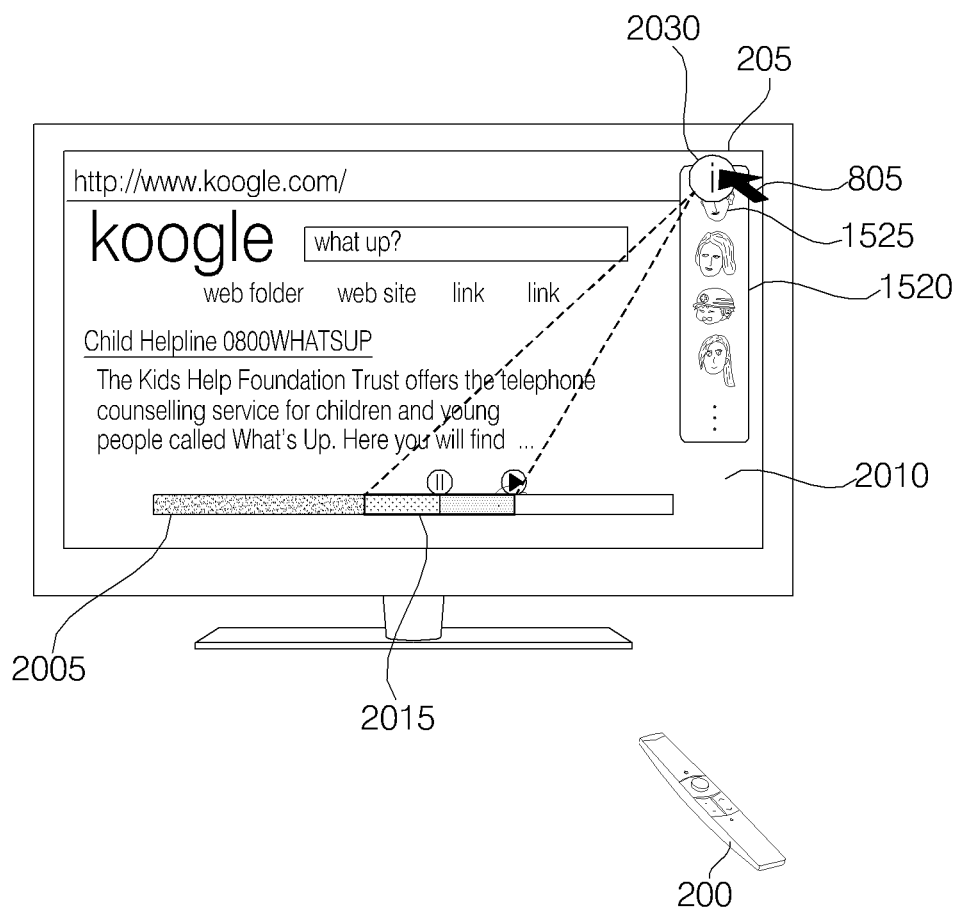

The operations illustrated in FIGS. 28A and 28B are similar to those illustrated in FIGS. 27A and 27B, except that a Web page is stored and transmitted, instead of an audio file. The following description will focus on such differences.

Referring to 28A, while the screen 2010 including a connected Web page is displayed on the display 180, the object 1520 representing users connected to the network may additionally be displayed. If the user is browsing a plurality of Web pages in addition to the specific Web page, an object 2005 indicating saving of part of the Web pages during Web browsing may be displayed. Particularly, an object 2015 representing the stored Web pages may be displayed. The object 2015 may include an object indicating the data size of the Web pages stored from the time of receiving a content save command to the time of receiving a content saving stop command and an object indicating saving of Web pages already browsed a predetermined time before the content save command. This is an automatic save function for storing a predetermined previous time of content before a content save command is issued, for the case where the user might miss a desired save time. The automatic save function is optional.

Referring to FIG. 28A, the user may drag the object 2015 representing the stored Web pages using the pointer 205 of the remote controller 200. During the drag, a new object 2030 representing the stored Web pages may be additionally displayed on the display 180. While the object 2030 represents the Internet to indicate the stored Web pages in FIG. 28A, many other object configurations can be considered.

FIG. 28B illustrates an exemplary operation of dropping the object 2030 on the user object 1525 in the object 1520. Thus the specific user represented by the user object 1525 is selected from among other users connected to the network and the stored data of the Web pages is transmitted to the selected user or the electronic device of the selected user.

The operations illustrated in FIGS. 29A and 29B are similar to those illustrated in FIGS. 27A and 27B, except that an electronic document file, for example, an e-book file is stored and transmitted, instead of an audio file. The following description will focus on such differences.

Referring to 29A, while the screen 2110 including an e-book page is displayed on the display 180, the object 1520 representing users connected to the network may additionally be displayed. If the user is reading a plurality of e-book pages in addition to the specific e-book page, an object 2105 indicating saving of part of the e-book pages during e-book reading may be displayed. Particularly, an object 2115 representing the stored e-book pages may be displayed. The object 2115 may include an object indicating the data size of the e-book pages stored from the time of receiving a content save command to the time of receiving a content saving stop command and an object indicating saving of e-book pages already read a predetermined time before the content save command. This is an automatic save function for storing a predetermined previous time of content before a content save command is issued, for the case where the user might miss a desired save time. The automatic save function is optional.

Referring to FIG. 29A, the user may drag the object 2115 representing the stored e-book pages using the pointer 205 of the remote controller 200. During the drag, a new object 2130 representing the stored e-book pages may be additionally displayed on the display 180. While the object 2130 represents a book to indicate the stored e-book pages in FIG. 29A, many other object configurations can be considered.

FIG. 29B illustrates an exemplary operation of dropping the object 2130 on the user object 1525 in the object 1520. Thus the specific user represented by the user object 1525 is selected from among other users connected to the network and the stored data of the e-book pages is transmitted to the selected user or the electronic device of the selected user.

Figure 30A:
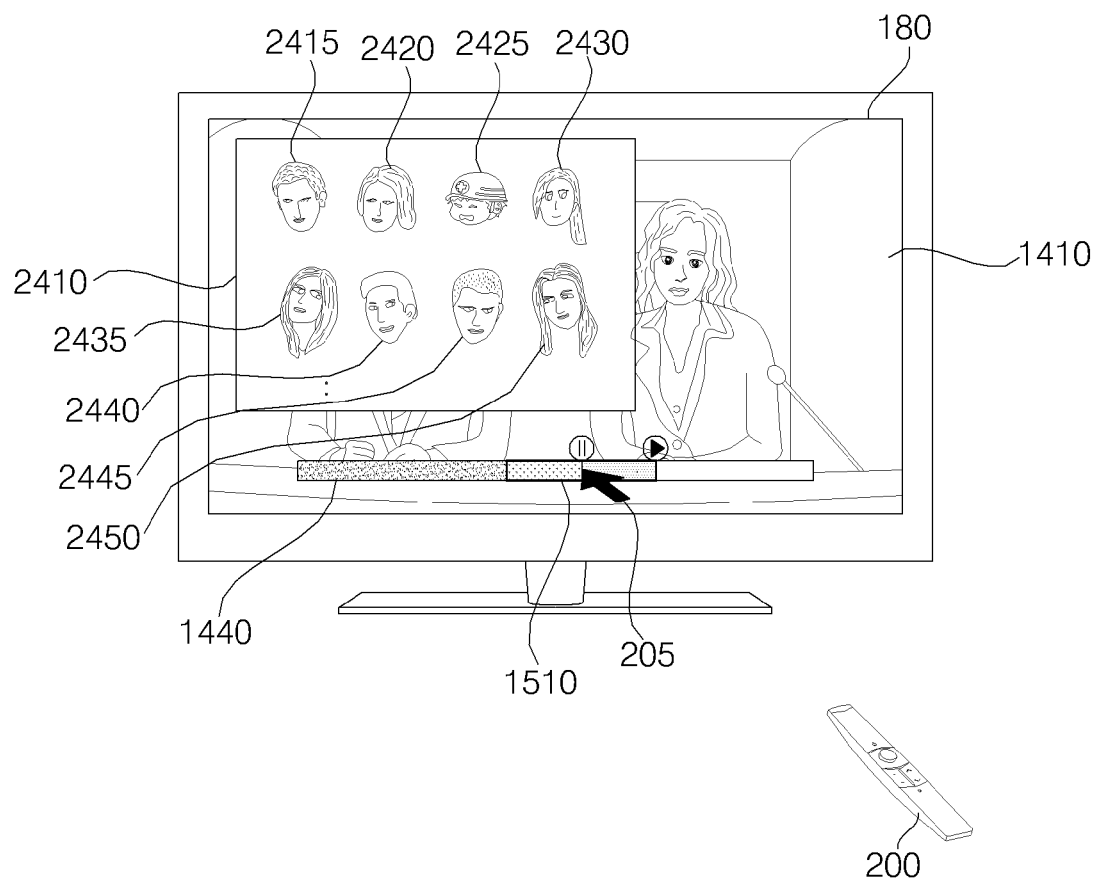

FIG. 30A illustrates exemplary display of an object 2410 representing users connected to a network, in the form of a pop-up window on the display 180. With the broadcast image 1410 displayed on the display 180, the object 2410 representing users connected to the network may be displayed in the form of a pop-up window, not on a part of the broadcast image 1410. Accordingly, the user can readily identify the users connected to the network from the object 2410.

The object 2410 taking the form of a pop-up window can represent more users than the object 1520 displayed on a part of the broadcast image 1410 in FIG. 24A. While the object 1520 contains the four user objects 1625, 1635, 1645 and 1655 in FIG. 24A, the object 2410 includes eight user objects 2415, 2420, 2425, 2430, 2435, 2440, 2445 and 2450.

While not shown, network connection state information about the users connected to the network may be displayed along with the user objects 2415, 2420, 2425, 2430, 2435, 2440, 2445 and 2450 in FIG. 30A.

Referring to FIG. 30A, the object 1510 representing the stored content is dragged from the object 1440 indicating saving of part of the broadcast image 1410, using the pointer 205 of the remote controller 200. During the drag of the object 1510, the new object 1530 may be additionally created to represent the stored content, as illustrated in FIG. 30B.

Figure 30B:
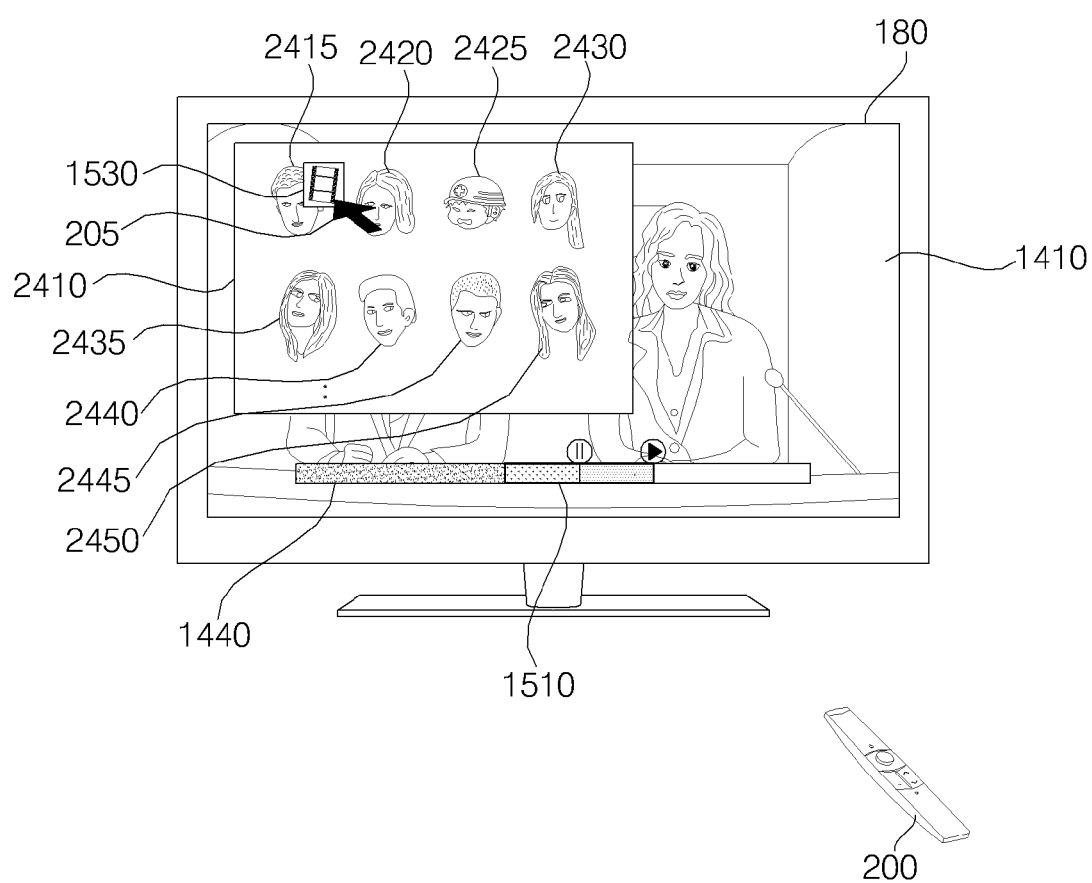

FIG. 30B illustrates an exemplary operation of dropping the object 1530 on the object 2415 representing a user connected to the network, using the pointer 205 of the remote controller 200. Therefore, the stored content can be transmitted to the user or the electronic device of the user. Further, it is possible to change the data size of the content according to the network connection state of the user, prior to transmission.

Compared to FIGS. 22A to 30B in which a specific item is selected using the pointer 205 corresponding to movement of the remote controller 200, FIGS. 31A to 35B illustrate selection of a specific item by manipulating directional keys, numeral keys, an OK key or a touch pad of a remote controller.

FIG. 31 illustrates an exemplary selection of an item using directional keys 2510 of a remote controller 2500.

Figure 31A:
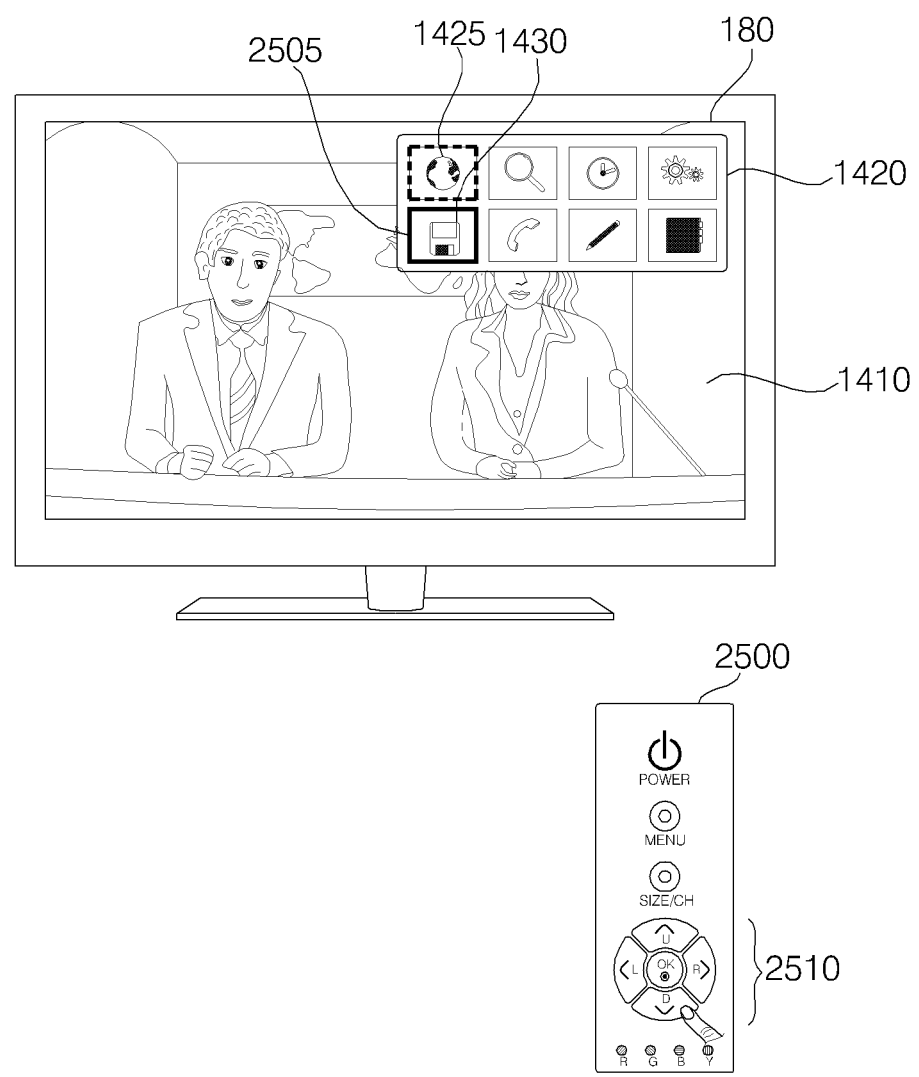

Referring to FIG. 31A, the broadcast image 1410 and the application menu object 1420 are displayed on the display 180. A cursor 2505 moves from an Internet application object 1425 to the content save application object 1430 through input of a down directional key among the directional keys 2510 of the remote controller 2500.

Figure 31B:
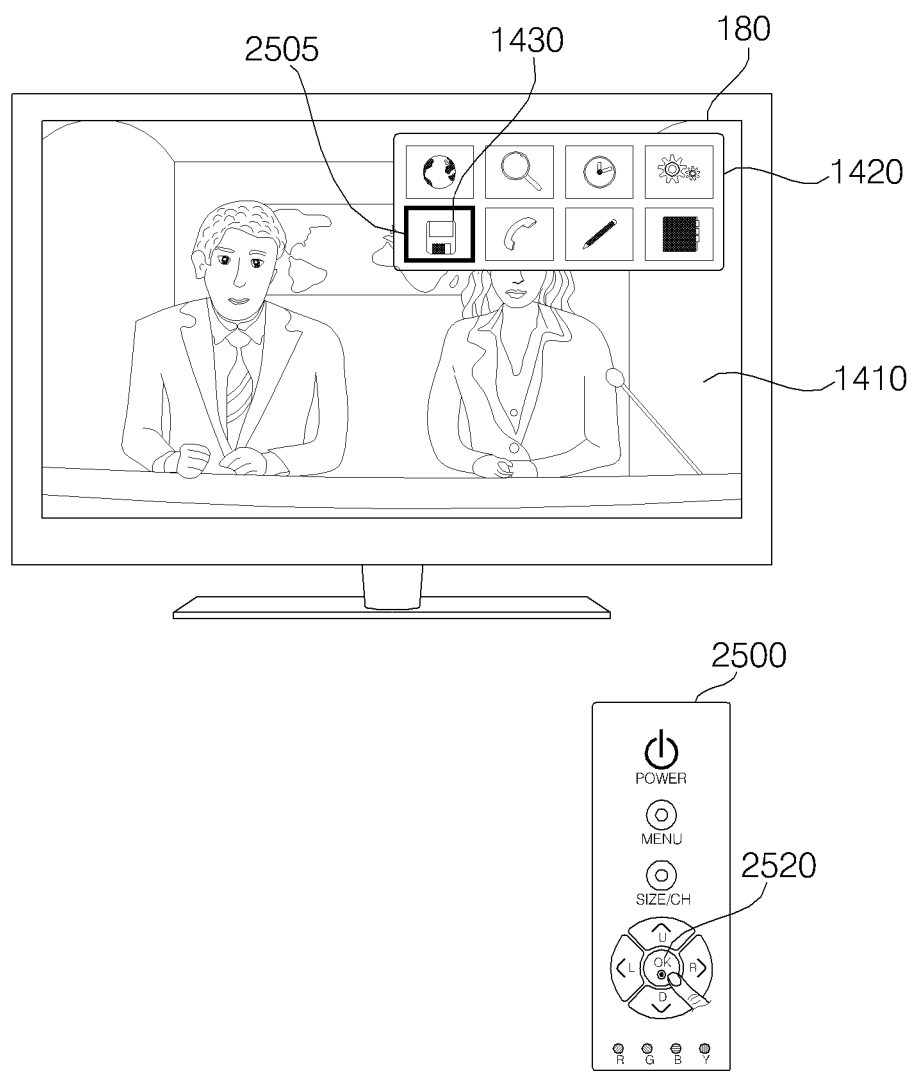

Referring to FIG. 31B, with the cursor 2505 positioned on the content save application object 1430, the content save application object 1430 is selected through input of an OK key 2520 of the remote controller 2500. Thus the user can select a desired item using the directional keys 2510 and the OK key 2520 of the remote controller 2500.

FIG. 32 illustrates an exemplary selection of an item using numeral keys 2610 of a remote controller 2600.

Referring to FIG. 32A, the broadcast image 1410 and the application menu object 1420 are displayed on the display 180. Especially, each application object is numbered in the application menu object 1420.

The cursor 2505 moves from the Internet application object 1425 to the content save application object 1430 through input of a numeral key '5' among the numeral keys 2610 of the remote controller 2600, by way of example.

Referring to FIG. 32B, with the cursor 2505 positioned on the content save application object 1430, the content save application object 1430 is selected through input of the OK key 2620 of the remote controller 2600. In this manner, the user can select an intended item using the numeral keys 2610 and the OK key 2620 of the remote controller 2600.

FIG. 33 illustrates an exemplary selection of an item through a touch pad 2710 of a remote controller 2700.

Referring to FIG. 33A, the broadcast image 1410 and the application menu object 1420 are displayed on the display 180. A pointer 2705, which moves in correspondence with touch and drag on the touch pad 2710, is shifted from the Internet application object 1425 to the content save application object 1430 according to a touch and drag on the touch pad 2710.

Referring to FIG. 33B, with the pointer 2705 positioned on the content save application object 1430, the content save application object 1430 is selected by touching the touch pad 2710 of the remote controller 2600, for example, twice. In this manner, the user can select an intended item using the touch pad 2710 of the remote controller 2700.

The remote controller 2700 may include function keys, letter keys, and directional keys in addition to the touch pad 2710. Instead of the touch pad 2710, the remote controller 2700 may be provided with a touch screen capable of displaying an image and allowing a touch.

FIG. 34 illustrates exemplary transmission of stored content to a user connected to a network using the directional keys 2510 of the remote controller 2500.

Referring to FIG. 34A, with the broadcast image 1410 and the object 1520 representing users connected to the network displayed on the display 180, the object 1510 representing the stored content is selected from the object 1440 indicating partial saving of the broadcast image 1410. Therefore, the cursor 2505 is positioned on the object 1510.

Referring to FIG. 34B, the cursor 2505 moves from the object 1510 to the object 1525 representing a specific user in the object 1520 through manipulation of the directional keys 2510, for example, right and up directional keys of the remote controller 2500.

Then, the object 1525 representing the user is selected through input of the OK key 2520 of the remote controller 2500. Therefore, the stored content can be transmitted to the user or the electronic device used by the user. Meanwhile, it is also possible to change the data size of the content according to the network connection state of the user, prior to transmission.

FIG. 35 illustrates exemplary transmission of stored content to a user connected to the network through manipulation of the directional keys 2510 of the remote controller 2500.

Referring to FIG. 35A, with the broadcast image 1410 and the objects 1440 and 1510 displayed on the display 180, the content list 1710 is additionally displayed. Upon receipt of a content list display command from the user, the content list 1710 may be displayed.

The cursor 2505 moves from the video file (aaa.avi) to the e-book file (eee.Epub) through input of the down directional key among the directional keys 2510 of the remote controller 2500. With the cursor 2505 positioned on the e-book file (eee.Epub), the content save application object 1430 is selected through input of the OK key 2520 of the remote controller 2500. Therefore, the user can simply select desired content using the directional keys 2510 and the OK key 2520 of the remote controller 2500.

Referring to FIG. 35B, the cursor 2505 moves from the e-book file (eee.Epub) to the object 1525 representing a specific user in the object 1510 representing users connected to the network, through manipulation of the directional keys 2510, for example, the right and up directional keys.

The object 1525 is selected through input of the OK key of the remote controller 2500. In this manner, the content of the e-book file (eee.Epub) may be transmitted to the user represented by the object 1525 or the electronic device of the user. In addition, the data size of the content can be changed according to the network connection state of the user, prior to transmission.

Figure 36:
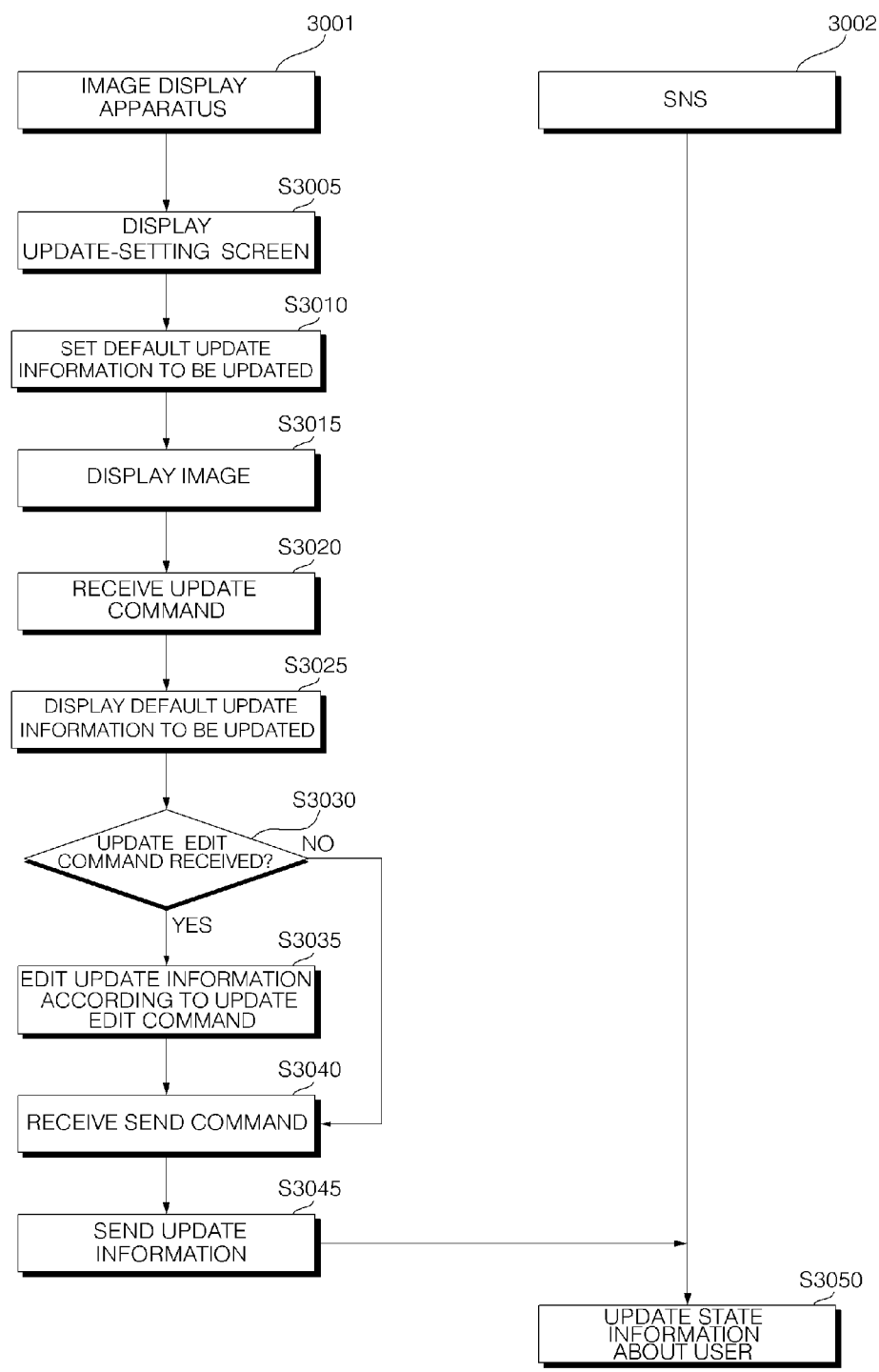
FIG. 36 is a flowchart illustrating a method for operating an image display apparatus according to another embodiment of the present invention.

FIG. 36 is a flowchart illustrating a method for operating an image display apparatus according to another embodiment of the present invention.

An image display apparatus 3001 according to an embodiment of the present invention is an electronic device capable of providing a Social Networking Service (SNS). The SNS is a kind of networking service provided over the Internet or a private network. The SNS allows users to read status information about other users or share their information on a social networking site of the SNS or using an application such as a messenger. After subscribing to an SNS, a user may update his or her status information and read status information about other users subscribed to the SNS.

A user of the image display apparatus 3001 may set information to be updated to a social networking site. Hereinafter, information to be updated to a social networking site will be referred to as 'update information'. Herein, the term 'update' is used interchangeably with 'post'. Specifically, the image display apparatus 3001 may display a screen on which update information can be set (referred to as an update-setting screen) (S3005). The update information may include information about a currently displayed image or the name or mood of the user of the image display apparatus 3001. The image display apparatus 3001 may display the update-setting screen in the form of a pop-up window on the display.

The user may set default update information on the update-setting screen (S3010). The default update information refers to information to be automatically updated to a social networking server in response to an update command received from the user. As described before, the default update information may include information about a currently displayed image, the name of the user, or the basic status of the user.

In another example, the user may set the type of an SNS for which the default update information will be transmitted or the type of an electronic device that provides the SNS. In an embodiment of the present invention, the user of the image display apparatus 3001 may subscribe to one or more SNSs. In this case, the user may set the type of an SNS for which his or her information is updated. In addition, the user may set the type of an electronic device that provides the SNS.

For example, the user may set an environment of the image display apparatus 3001 so as to transmit a signal carrying the update information to a social networking server or another image display apparatus, as an electronic device that provides the SNS.

After setting the default update information, the user reproduces an image using the image display apparatus 3001 (S3015). The image display apparatus 3001 may reproduce the image based on an input video signal. More specifically, the image display apparatus 3001 may reproduce the image based on a video signal included in a broadcast signal received from a broadcasting station or a video signal received from a connected external input device.

While viewing the image on the image display apparatus 3001, the user may enter an update command to the image display apparatus 3001 through a remote controller. For example, upon user manipulation of a predetermined button or key of the remote controller, the image display apparatus 3001 receives the update command (S3020).

Upon receipt of the update command, the image display apparatus 3001 displays the default update information in the form of a pop-up window or the like on the display (S3025). The default update information is set in step S3010.

The user may confirm the default update information on the display of the image display apparatus 3001. The user may also enter an update edit command for editing the default update information to the image display apparatus 3001 (S3030).

Upon receipt of the update edit command, the image display apparatus 3010 may display a keyboard object on the display in order to allow the user to edit the default update information. The user may edit the update information on the keyboard object displayed on the display or a keyboard of the remote controller. The image display apparatus 3001 edits the default update information according to the received edit command (S3035).

After completing editing, the user may enter an update send command to the image display apparatus 3001 (S3040). Upon receipt of the update send command, the image display apparatus 3001 transmits a signal including the edited update information to an electronic device that provides the SNS (S3045). In this embodiment, the electronic device that provides the SNS may be a social networking server.

The social networking server receives the signal from the image display apparatus 3001 and updates status information about the user based on the received signal (S3050). Thus, other users subscribed to the SNS may recognize the update of the status information about the user. More specifically, other users subscribed to the SNS are users of other terminals or image display apparatuses capable of providing the SNS. Hence, the users may view the update information of the image display apparatus 3001 on their terminals or image display apparatuses.

FIGS. 37 and 38 are views referred to for describing the method for operating an image display apparatus, illustrated in FIG. 36.

Referring to FIG. 37, the image display apparatus 3001 may display a pop-up window 3100 for setting default update information on the display. The default update information may contain information about a broadcast program or content that the user is currently viewing. The information about the broadcast program or content may include information about at least one of the title, genre, or channel of the broadcast program, the title or genre of the content, or the cast or producer of the broadcast program or the content. The default update information may include product information about the image display apparatus 3001, the name of the user of the image display apparatus 3001, the ID of a social networking site, or information about the current mood of the user. The user of the image display apparatus 3001 may set an environment of the image display apparatus 3001 such that the default update information includes predetermined information.

The user may enter an update setting command to the image display apparatus 3001. More specifically, the user may enter a command to set information to be updated to the social networking site, among setting commands necessary to set an environment of the image display apparatus 3001.

In FIG. 37A, the image display apparatus 3001 displays a social networking site list 3101 to which update information may be transmitted. Social networking site items listed in the social networking site list 3101 may be edited. That is, the user may add a new social networking site to or delete an existing social networking site from the social networking site list 3101.

Figure 37B:
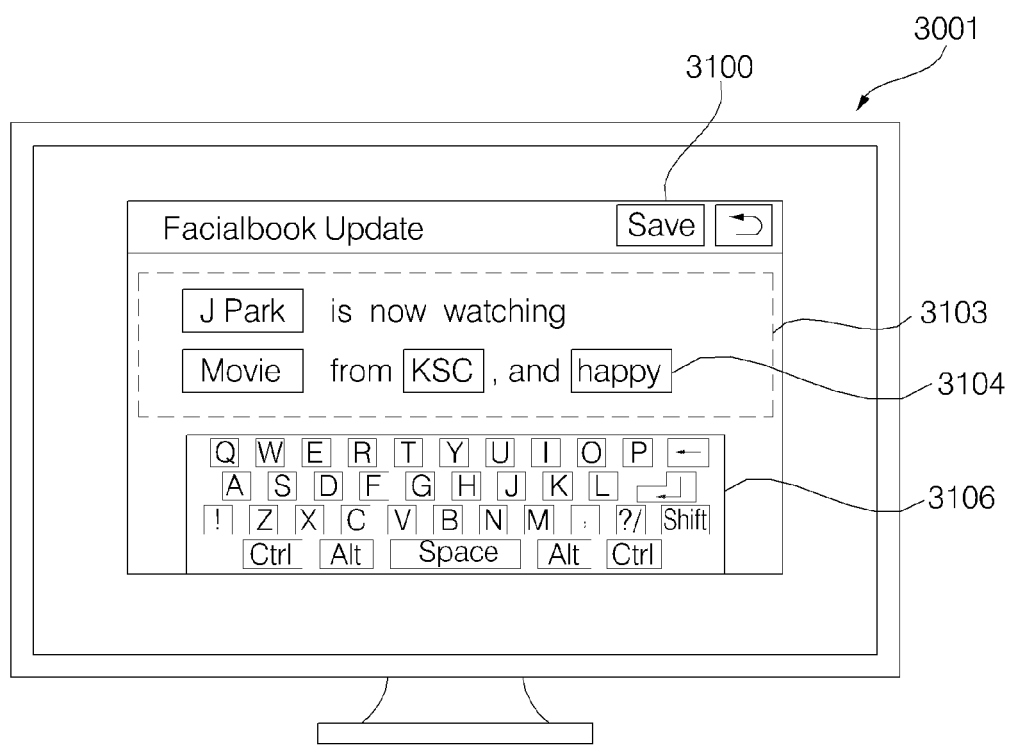
FIGS. 37 and 38 are views referred to for describing the method for operating an image display apparatus, illustrated in FIG. 36.

In FIG. 37B, the image display apparatus 3001 may display an update display window 3103 and a keyboard object 3106 on the display.

In accordance with the embodiment of the present invention, information written in boxes 3104 on the update display window 3103 includes information about a currently viewed image and/or information about the user of the image display apparatus 3001. The user may edit the update information using the keyboard object 3106.

Figure 38A:
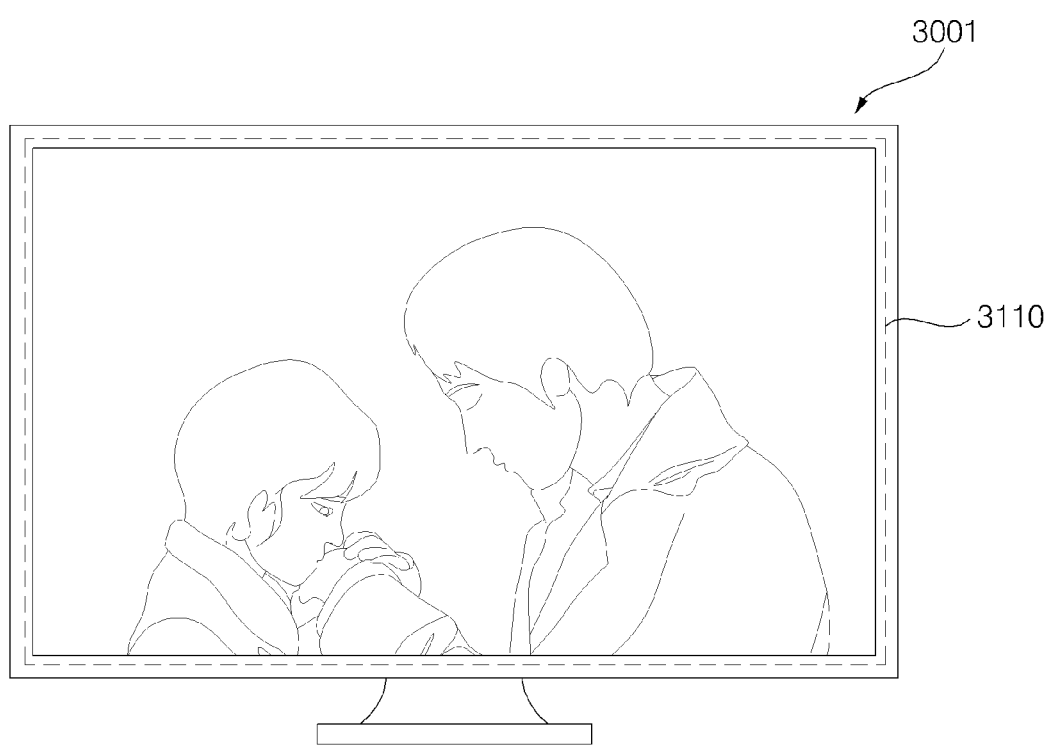

Referring to FIG. 38A, the image display apparatus 3001 may display an image 3110 related to a currently reproduced broadcast program or content. While viewing the image 3110, the user may enter an update command to the image display apparatus 3001.

More specifically, the user may enter the update command to the image display apparatus 3001 using a predetermined button or key of the remote controller. In another example, if the remote controller is provided with a touch screen, the user may enter the update command to the image display apparatus 3001 by touching the touch screen in a predetermined touch pattern. If the remote controller has a motion sensor, the user may enter the update command to the image display apparatus 3001 by moving the remote controller in a predetermined pattern.

Figure 38B:
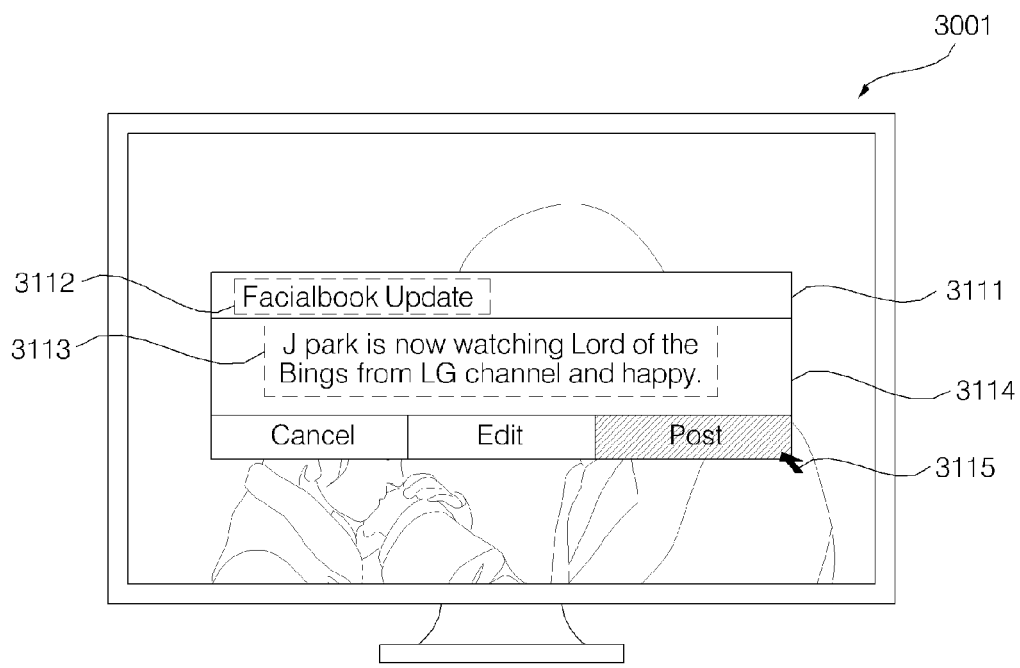

Referring to FIG. 38B, upon receipt of the update command from the user, the image display apparatus 3001 displays a pop-up window 3111 with update information on the display. The pop-up window 3111 includes update information 3113 and information 3112 about a social networking site to which the update information 3113 is to be transmitted. As the user has set the environment of the image display apparatus 3001 such that the user ID of the social networking site, the title of the currently viewed broadcast program, information about the channel of the broadcast program, and information about the mood of the user as illustrated in FIG. 37B, the update information 3113 includes 'Jpark' as the user ID, Lord of the 'Bings' as the title of the broadcast program, 'LG channel' as the channel information, and 'happy' as the mood of the user in FIG. 38B.

After confirming the update information 3113, the user may select an object 3114 corresponding to an update send command. Specifically, the user may position a pointer 3115 on the send command object 3114 by manipulating the remote controller and then input a selection command.

The image display apparatus 3001 transmits the update information 3113 to an electronic device that provides the SNS, in response to the update send command included in the signal received from the remote controller. In this embodiment, the image display apparatus 3001 transmits the update information 3113 to a server of Facial Book.

FIG. 39 is a flowchart illustrating a method for displaying status information about another user provided by an SNS to which the user of the image display apparatus 3001 has subscribed, on the image display apparatus 3001 according to an embodiment of the present invention.

The user of the image display apparatus 3001 may subscribe to a plurality of SNSs. Once the user subscribes to a specific SNS, the user can establish relationships with other users of the SNS through social networking. Then the user may receive feedback of status information about other users socially networked with the user. For example, the image display apparatus 3001 may be connected to a social networking server 3002, receive information about the statuses of other users from the social networking server 3002, and display the status information.

More specifically, the user may enter an SNS information display command to the image display apparatus 3001 (S3100). For example, the user may enter a command for displaying information about the statuses of other users provided by the SNS to the image display apparatus 3001 using the remote controller.

The image display apparatus 3001 requests information about other users with whom relationships have been established to the social networking server 3002 in response to the received command (S3105). The social networking server 3002 collects information about the statuses of the other socially networked users in response to the request (S3110).

The social networking server 3002 transmits the collected status information about the users to the image display apparatus 3001 (S3115). The image display apparatus 3001 displays the status information about the users on the display (S3120). More specifically, the image display apparatus 3001 may display status information about the users, which includes objects representing the other users or information about content or broadcast programs viewed by the other users.

The user may enter a user selection command to the image display apparatus 3001 (S3125). The image display apparatus 3001 may display an image that the selected user is viewing on the display (S3130).

More specifically, if the selected user is viewing an image based on a video signal of a specific broadcast channel, the image display apparatus 3001 determines information about the broadcast channel from the status information about the selected user and displays an image based on a video signal of the broadcast channel on the display.

Further, the image display apparatus 3001 may transmit information about the broadcast channel or information about the displayed image to the social networking server 3002. Therefore, other users subscribed to the SNS may recognize that the image viewed by the user of the image display apparatus 3001 has been changed.

FIGS. 40, 41 and 42 are views referred to for describing the method for operating the image display apparatus, illustrated in FIG. 39.

Figure 40A:
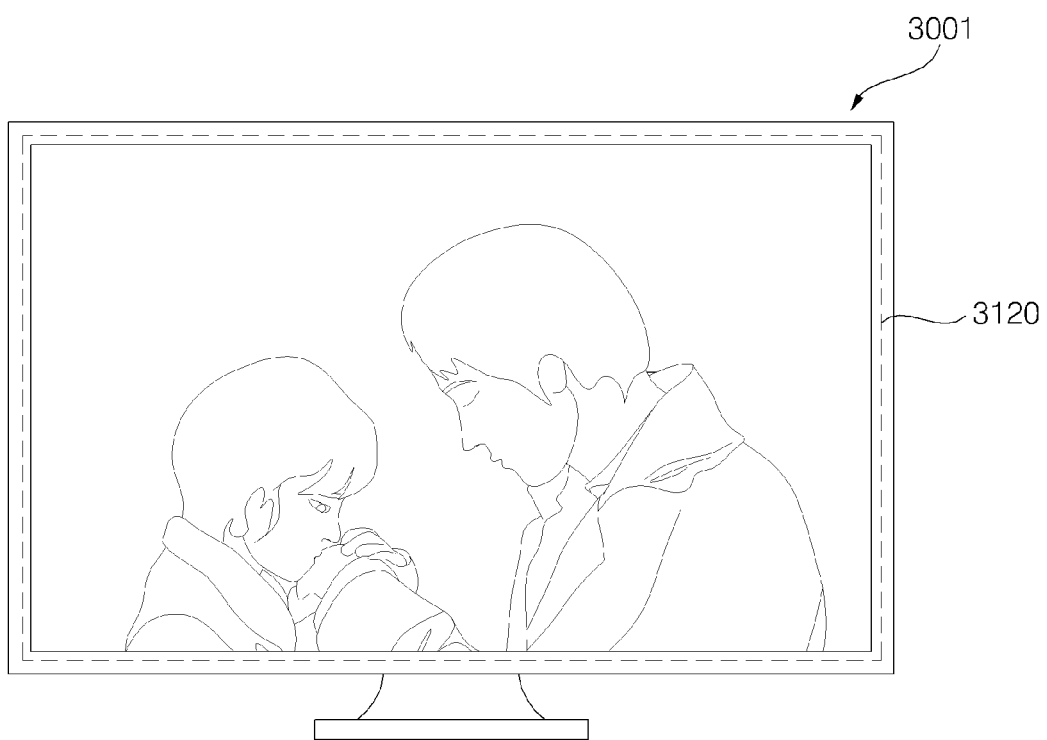
FIGS. 40, 41 and 42 are views referred to for describing the method for operating an image display apparatus, illustrated in FIG. 39.

Referring to FIG. 40A, the image display apparatus 3001 displays an image 3120 related to a currently reproduced broadcast program or content on the display. While viewing the image 3120 on the display, the user may enter a status display command to the image display apparatus 3001. Specifically, the status display command instructs the image display apparatus 3001 to display information about the statuses of other users socially networked with the user by an SNS to which the user subscribed.

The image display apparatus 3001 receives information about the socially networked users provided by the SNS in response to the received command. Specifically, the image display apparatus 3001 may receive the information about the statuses of the socially networked users from the social networking server of the SNS. If the image display apparatus 3001 is connected to a terminal capable of providing the SNS or another image display apparatus in a peer-to-peer (P2P) manner, the image display apparatus 3001 may receive information about the user of the terminal or image display apparatus from the terminal or image display apparatus.

Figure 40B:
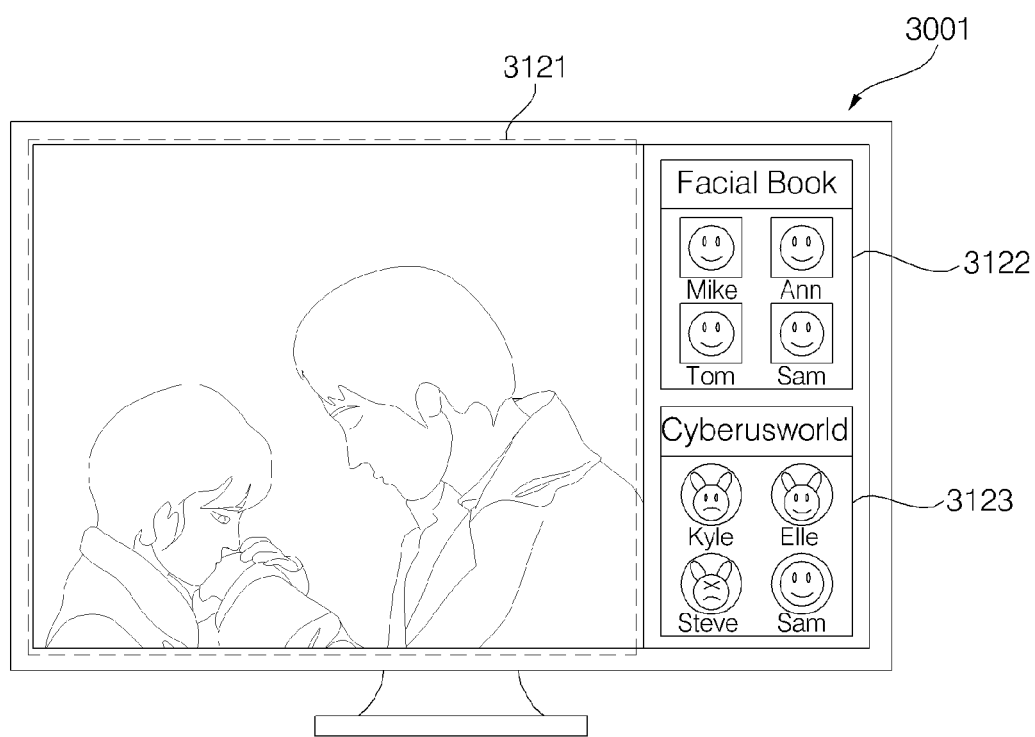

FIG. 40B illustrates a screen with information about the statuses of other users, displayed on the display. Referring to FIG. 40B, the image display apparatus 3001 displays a currently reproduced image 3121 and status information 3122 and 3123 about other socially networked users on the display. In the illustrated case of FIG. 40B, the user of the image display apparatus 3001 is registered with 'Facial Book' and 'Cyberusworld' as SNSs. Accordingly, the image display apparatus 3001 may display the status information 3122 and 3123 about users provided by both SNSs on the display.

Figure 41A:
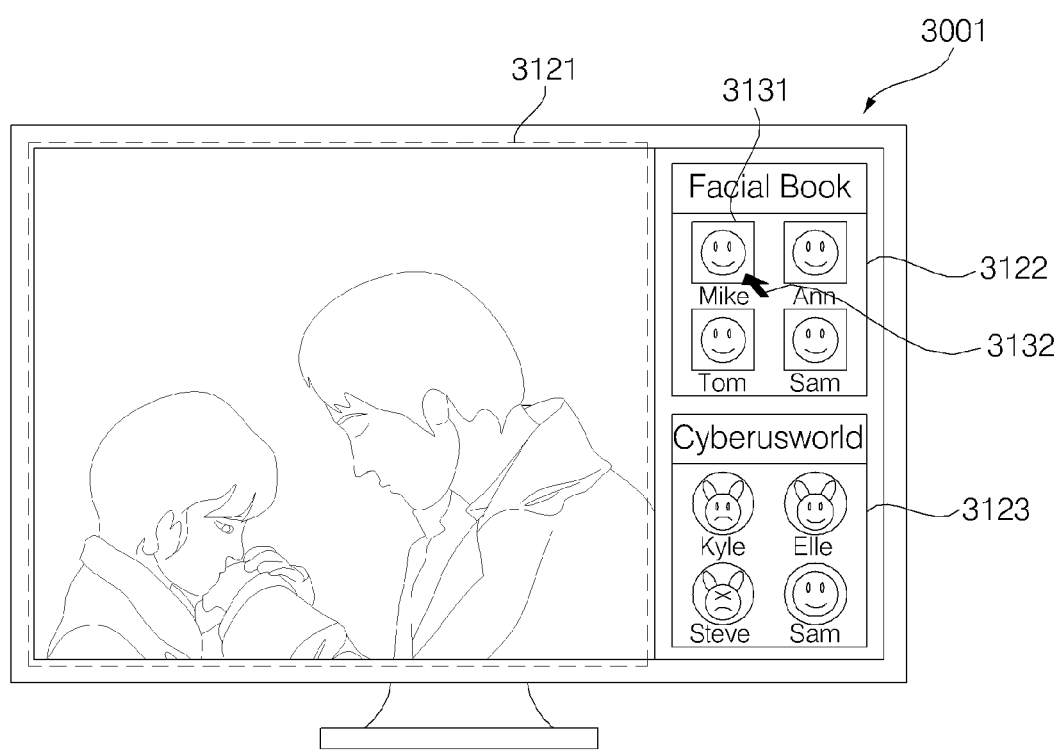

Referring to FIG. 41A, the user of the image display apparatus 3001 may enter an object selection command to the image display apparatus 3001. The object selection command instructs selection of an object 3131 representing a user whose status information 3122 is to be read. The user of the image display apparatus 3001 may position a pointer 3132 on the object 3131 using the remote controller and then input the Enter key of the remote controller.

Figure 41B:
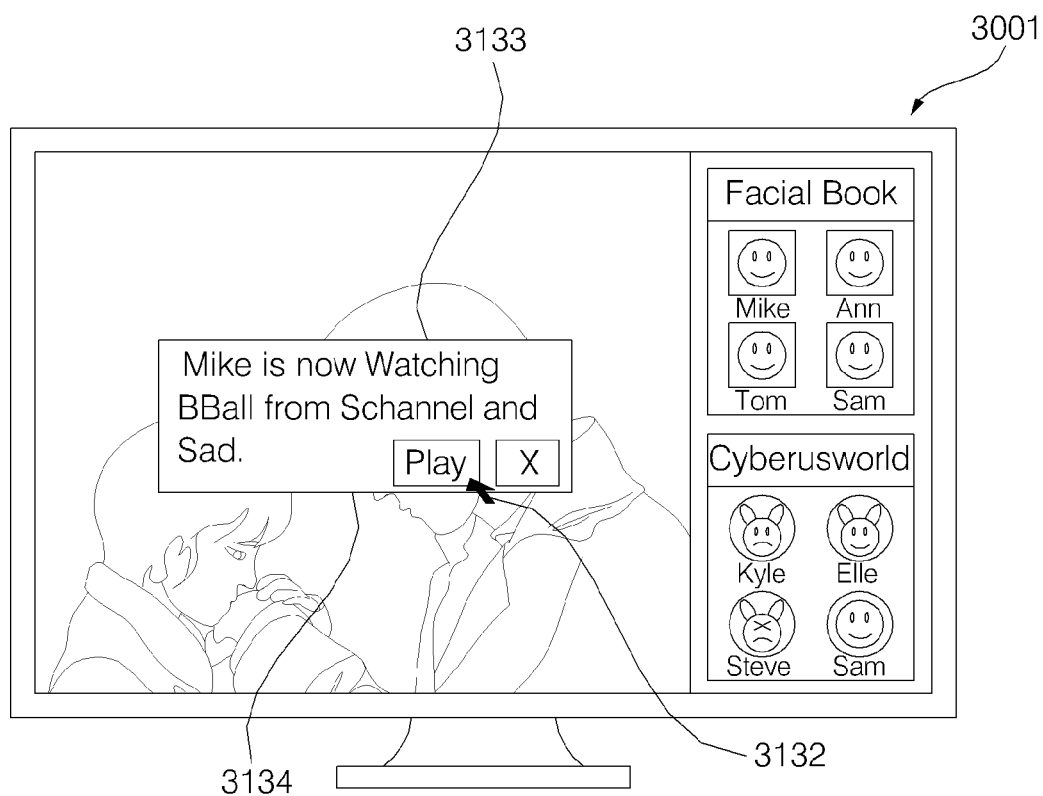

The image display apparatus 3001 displays status information about the selected user on the display in response to the received command. More specifically, the image display apparatus 3001 displays a pop-up window 3133 containing information about an image that the selected user is viewing, as illustrated in FIG. 41B. The user may position the pointer 3132 on a play command object 3134 using the remote controller and input the Enter key of the remote controller.

Figure 41C:
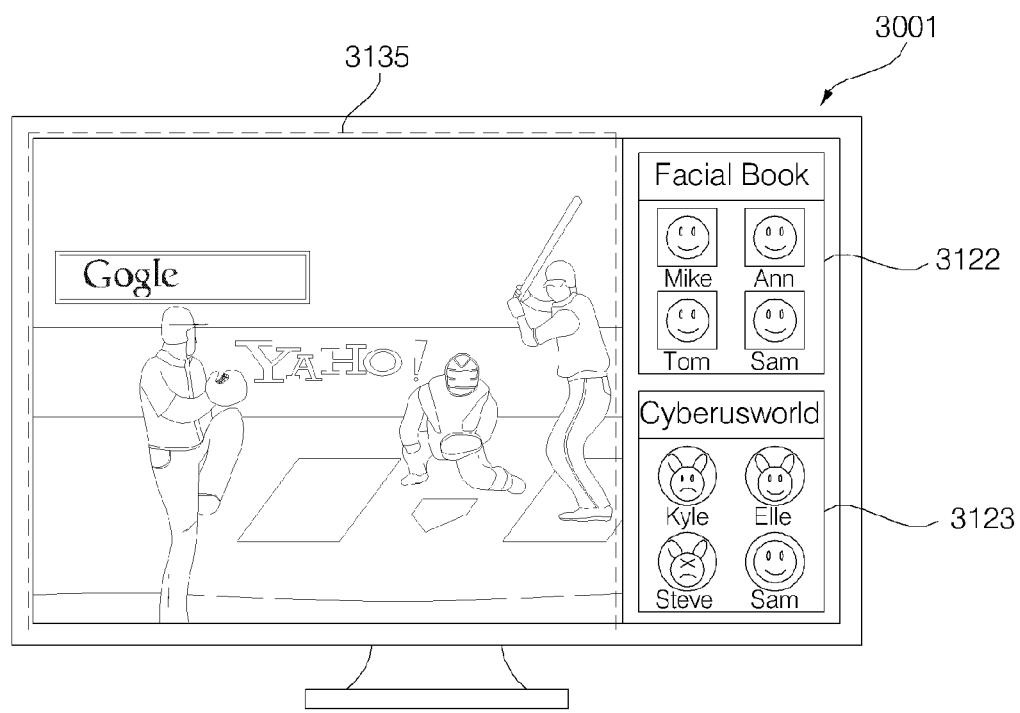

FIG. 41C illustrates a screen that the image display apparatus 3001 displays on the display in response to the Enter key input. Referring to FIG. 41C, the image display apparatus 3001 may display a broadcast image 3135 that the selected user is viewing along with the status information 3122 and 3133.

More specifically, the image display apparatus 3001 displays an image based on a video signal of a channel corresponding to a broadcast program that the selected user is viewing, on the display. Accordingly, the user of the image display apparatus 3001 can view the same image as the selected user.

FIG. 42 illustrates a screen displayed on the image display apparatus 3001 according to another embodiment of the present invention.

Figure 42A:
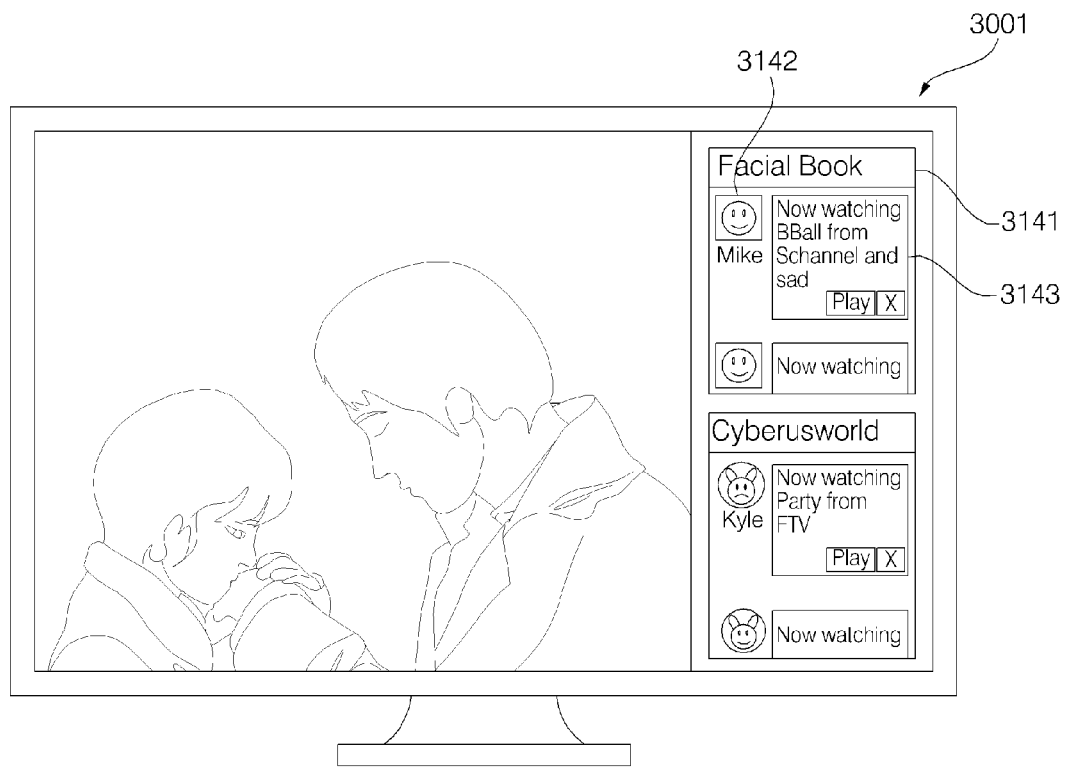

Referring to FIG. 42A, the image display apparatus 3001 may display status information 3141 on a part of the display. The status information 3141 contains objects 3142 representing other users socially networked with the user of the image display apparatus 3001 through SNSs and information 3143 about images that the socially networked users are viewing. Thus the user of the image display apparatus 3001 can identify the images that the socially networked users are viewing without the need for selecting the objects 3142.

Figure 42B:
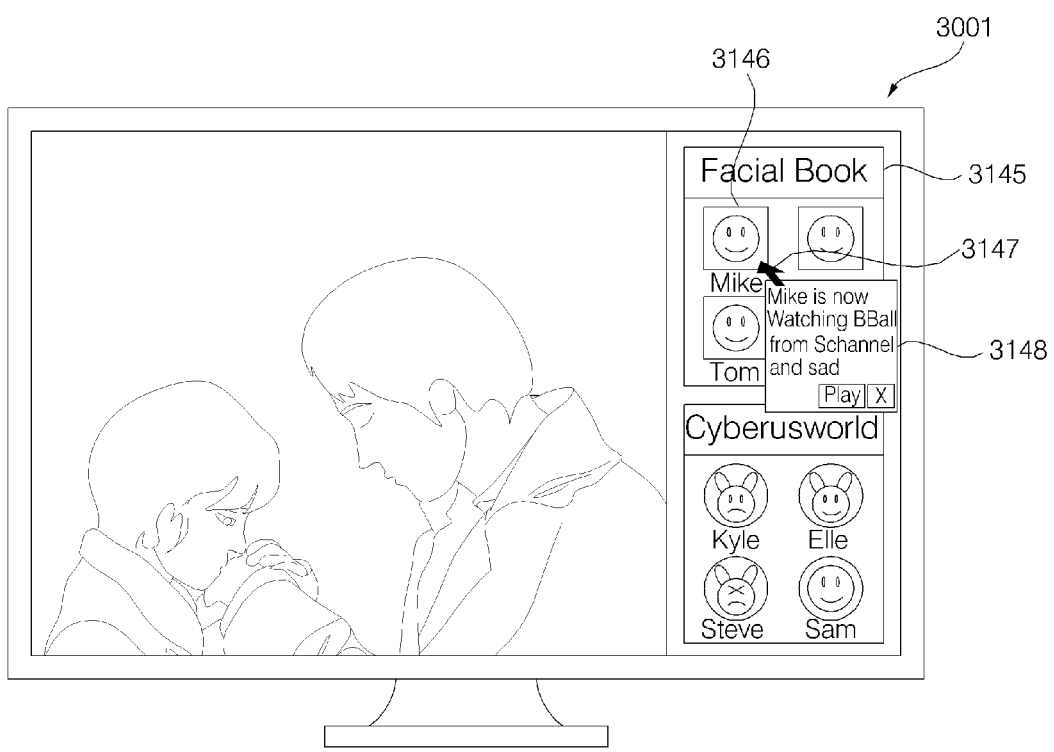

Referring to FIG. 42B, in another example, upon user selection of an object 3146 representing another user socially networked with the user of the image display apparatus 3001 using a pointer 3147, the image display apparatus 3001 may display status information 3145 including information 3148 about an image that the selected user is viewing. Specifically, the user of the image display apparatus 3001 may select the object 3146 representing an intended user. Then the image display apparatus 3001 may display the information 3148 about the image currently viewed by the selected user in a pop-up window 3148.

FIGS. 41 and 42 are merely exemplary applications of a method for displaying status information about other users subscribed to the same SNS as the user of the image display apparatus 3001. Therefore, FIGS. 41 and 42 should not be interpreted as limiting the present invention.

As is apparent from the above description of the embodiments of the present invention, during content reproduction, part of content can be easily stored and transmitted to another user or electronic device connected to a network. Therefore, user convenience is increased.

Especially the reproduced content can be simply stored by executing a content save application.

Since content data reproduced before generation of a content save command as well as content data reproduced from the time of receiving the content save command to the time of receiving a content saving stop command is stored, the user does not have to worry about missing an intended content save time.

As an object indicating partial saving of the reproduced content or an object indicating the data size of stored content is displayed, the user can readily identify the saved state of the content.

In addition, the network connection states of other users or electronic devices are notified on a display. Thus the user can easily identify network connection states and the size of content to be transmitted can be changed according to the network connection state of a receiving user or the size of stored content. Therefore, content transmission is efficient.

In addition to stored content, the user is allowed to select specific content from a content list, for transmission. Accordingly, the user can transmit user-intended content easily.

The user is also allowed to select an intended application from an application list displayed on an image display apparatus using a remote controller, thereby facilitating execution of the application.

The image display apparatus can transmit information about a currently reproduced broadcast program to an electronic device that provides an SNS. In addition, the user of the image display apparatus can share information about the currently reproduced broadcast program with other users through an SNS. The user of the image display apparatus can also acquire information about a broadcast program that another user is viewing through the SNS and view the same broadcast program on the image display apparatus.

Furthermore, the image display apparatus provides a variety of user interfaces, thus increasing user convenience.

The image display apparatus and the method for operating the same according to the foregoing exemplary embodiments are not restricted to the exemplary embodiments set forth herein. Therefore, variations and combinations of the exemplary embodiments set forth herein may fall within the scope of the present invention.

The method for operating an image display apparatus according to the foregoing exemplary embodiments may be implemented as code that can be written on a computer-readable recording medium and thus read by a processor. The computer-readable recording medium may be any type of recording device in which data is stored in a computer-readable manner. Examples of the computer-readable recording medium include a ROM, a RAM, a CD-ROM, a magnetic tape, a floppy disc, an optical data storage, and a carrier wave (e.g., data transmission over the Internet). The computer-readable recording medium can be distributed over a plurality of computer systems connected to a network so that computer-readable code is written thereto and executed therefrom in a decentralized manner. Programs, code, and code segments to realize the embodiments herein can be construed by one of ordinary skill in the art.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A method for operating an image display apparatus configured to receive a television broadcast from one of a landline, a satellite and another connection, the method comprising:

reproducing content, the content being at least one of a television broadcast image, another broadcast image, a text, audio or image file stored within the image display apparatus, a text, audio or image file stored remotely from the image display apparatus, and a connected Web page;

displaying a content save object for storing the reproduced content with an image related to the reproduced content during content reproduction;

storing at least a part of the reproduced content as stored content upon selection of the content save object;

simultaneously displaying 1) a content object representing the stored content, and 2) an object representing one of a user and an electronic device connected to the image display apparatus via a wired or wireless network or from a network linked to the connected wired or wireless network;

receiving a move command to move the stored content to the one of the user and the electronic device; and transmitting the stored content to the one of the user and the electronic device via the connected wired or wireless network, wherein the step of receiving a move command comprises displaying an icon representing the stored content moving between the content object and the object representing one of the user and the electronic device, wherein a shape of the icon is determined based on a type of the stored content, the type being one of a broadcast image type, an audio data type, a Web page type, and an e-book page type, and wherein the object includes user objects corresponding to users connected to the network and network connection state information for the user objects, respectively;

displaying an object asking whether to change the size of the stored content to be transmitted according to a network connection state on the display; and scaling down the stored content upon a selection for changing the size of the stored content to be transmitted, wherein the transmitting step transmits the scaled down stored content to the selected user or electronic device.

2. The method of claim 1, wherein the step of receiving a move command comprises:

dragging the icon representing the stored content in response to a user input for moving the stored content; and dropping the icon on the object representing one of the user and the electronic device.

3. The method of claim 1, wherein the step of receiving a move command comprises:

recognizing that a remote controller is pointed toward the displayed content object;

recognizing that the remote controller is pointed toward the object representing one of the user and the electronic device; and receiving a user input for transmitting the stored content to the one of the user and the electronic device.

4. The method of claim 1, wherein the content object representing the stored content comprises:

an object corresponding to content stored from a time of selection of the content save object to a time of receiving the move command or a content saving stop command; and an object corresponding to a predetermined amount of the content stored before the content save commend is received.

5. The method of claim 1, wherein the user objects include at least one of an icon, nickname or name of each of the users connected to the network.

6. The method of claim 1, wherein at least one of a color, brightness or outline of the content save object is changed according to a number of selections of the content save object.

7. An image display apparatus configured to receive a television broadcast from one of a landline, a satellite and another connection, the image display apparatus comprising:

a network interface unit;

a display;

a memory; and a controller operatively connected to the display and the memory, the controller configured to reproduce content, the content being at least one of a television broadcast image, another broadcast image, a text, audio or image file stored within the image display apparatus, a text, audio or image file stored remotely from the image display apparatus, and a connected Web page, display a content save object for storing the reproduced content with an image related to the reproduced content during content reproduction, store at least a part of the reproduced content as stored content upon selection of the content save object, simultaneously display 1) a content object representing the stored content, and 2) an object representing one of a user and an electronic device connected to the image display apparatus via a wired or wireless network or from a network linked to the connected wired or wireless network, receive a move command to move the stored content to the one of the user and the electronic device, and transmit the stored content to the one of the user and the electronic device via the connected wired or wireless network through the network interface unit, wherein the controller is configured to display an icon representing the stored content moving between the content object and the object representing one of the user and the electronic device, wherein a shape of the icon is determined based on a type of the stored content, the type being one of a broadcast image type, an audio data type, a Web page type, and an e-book page type, and wherein the object includes user objects corresponding to users connected to the network and network connection state information for the user objects, respectively;

display an object asking whether to change the size of the stored content to be transmitted according to a network connection state on the display; and scale down the stored content upon a selection for changing the size of the stored content to be transmitted, wherein the transmit step transmits the scaled down stored content to the selected user or electronic device.

8. The image display apparatus of claim 7, wherein the controller is configured to:

drag the icon representing the stored content in response to a user input for moving the stored content, and drop the icon on the object representing one of the user and the electronic device.

9. The image display apparatus of claim 7, wherein the controller is configured to:

recognize that a remote controller is pointed toward the displayed content object, recognize that the remote controller is pointed toward the object representing one of the user and the electronic device, and receive a user input for transmitting the stored content to the one of the user and the electronic device.

10. The image display apparatus of claim 7, wherein the content object representing the stored content, comprises:

an object corresponding to content stored from a time of selection of the content save object to a time of receiving the move command; and an object corresponding to a predetermined amount of the content stored before the content save commend is received.

11. The image display apparatus of claim 7, wherein the user objects include at least one of an icon, nickname or name of each of the users connected to the network.

12. The image display apparatus of claim 7, wherein at least one of a color, brightness or outline of the content save object is changed according to a number of selections of the content save object.

13. A non-transitory computer readable medium including instructions configured to cause an image display apparatus configured to receive a television broadcast from one of a landline, a satellite and another connection to perform the following steps:

reproducing content, the content being at least one of a television broadcast image, another broadcast image, a text, audio or image file stored within the image display apparatus, a text, audio or image file stored remotely from the image display apparatus, and a connected Web page;

displaying a content save object for storing the reproduced content with an image related to the reproduced content during content reproduction;

storing at least a part of the reproduced content as stored content upon selection of the content save object;

simultaneously displaying 1) a content object representing the content, including the stored content, and 2) an object representing one of a user and an electronic device connected to the image display apparatus via a wired or wireless network or from a network linked to the connected wired or wireless network;

receiving a move command to move the stored content to the one of the user and the electronic device; and transmitting the stored content to the one of the user and the electronic device via the connected wired or wireless network, wherein the step of receiving a move command comprises displaying an icon representing the stored content moving between the content object and the object representing one of the user and the electronic device, wherein a shape of the icon is determined based on a type of the stored content, the type being one of a broadcast image type, an audio data type, a Web page type, and an e-book page type, and wherein the object includes user objects corresponding to users connected to the network and network connection state information for the user objects, respectively, displaying an object asking whether to change the size of the stored content to be transmitted according to a network connection state on the display; and scaling down the stored content upon a selection for changing the size of the stored content to be transmitted, wherein the transmitting step transmits the scaled down stored content to the selected user or electronic device.

14. The method of claim 1, wherein the transmitting step includes:

transmitting a thumbnail image of the stored content to the selected user or the electronic device of the selected user over a network;

receiving a content send request signal from the selected user or the electronic device of the selected user over the network; and transmitting the stored content to the selected user or electronic device in response to the content send request.

15. The method of claim 1, further comprising:

receiving movement information corresponding to movement of a remote controller from the remote controller; and displaying a pointer representing movement of the remote controller based on the movement information.

16. The image display apparatus of claim 7, wherein the network interface unit is configured to:
    transmit a thumbnail image of the stored content to the selected user or the electronic device of the selected user over a network,
    receive a content send request signal from the selected user or the electronic device of the selected user over the network, and
    transmit the stored content to the selected user or electronic device in response to the content send request.

17. The image display apparatus of claim 7, further comprising:
    a user input interface unit to receive movement information corresponding to movement of a remote controller from the remote controller,
    wherein the controller is configured to display a pointer representing movement of the remote controller based on the movement information.

* * * * *